US012670868B2

(12) United States Patent
Byun et al.

(10) Patent No.: US 12,670,868 B2
(45) Date of Patent: Jun. 30, 2026

(54) DRIVER, DISPLAY PANEL AND DISPLAY DEVICE CAPABLE OF DISCHARGING A QB NODE IN A POWER-OFF PERIOD

(71) Applicant: Samsung Display Co., LTD., Yongin-si (KR)

(72) Inventors: Minwoo Byun, Yongin-si (KR); Minjoo Kim, Yongin-si (KR); Seoni Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/959,381

(22) Filed: Nov. 25, 2024

(65) Prior Publication Data

US 2025/0252927 A1 Aug. 7, 2025

(30) Foreign Application Priority Data

Feb. 6, 2024 (KR) ........................ 10-2024-0017956

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2320/045* (2013.01)

(58) Field of Classification Search
CPC ............... G09G 3/3266; G09G 3/3233; G09G 2300/0819; G09G 2300/0852; G09G 2300/0861; G09G 2310/0286; G09G 2310/08; G09G 2320/045
See application file for complete search history.

(56) References Cited

U.S. PATENT DOCUMENTS

2014/0321599 A1* 10/2014 Cho ....................... G11C 19/28 377/64
2017/0372654 A1* 12/2017 So ....................... G09G 3/3266
2019/0378448 A1* 12/2019 Park ..................... G09G 3/3266
(Continued)

FOREIGN PATENT DOCUMENTS

KR 20070118447 A * 12/2007 ........... G09G 3/3677
KR 100848961 B1 * 7/2008 ........... G09G 3/3696
KR 20110000470 A * 1/2011 ........... G09G 3/3655
(Continued)

*Primary Examiner* — Stephen G Sherman
(74) *Attorney, Agent, or Firm* — CANTOR COLBURN LLP

(57) ABSTRACT

A driver includes a plurality of stages. At least one stage includes: an input circuit configured to transfer an input signal to a Q node in response to a first clock signal, where the Q node includes a first Q node and a second Q node; a QB node controlling circuit configured to control a voltage of a QB node based on a voltage of the first Q node and a QB control signal; an output circuit configured to output an output signal, which has a high gate voltage, based on a voltage of the second Q node, and configured to output the output signal, which has a low gate voltage, based on the voltage of the QB node; and a QB node discharging circuit configured to discharge the QB node when the high gate voltage and the low gate voltage are deactivated.

37 Claims, 29 Drawing Sheets

(56) References Cited

U.S. PATENT DOCUMENTS

2023/0014107 A1* 1/2023 Kitsomboonloha .......................... G09G 3/3266

FOREIGN PATENT DOCUMENTS

| | | | | | |
|---|---|---|---|---|---|
| KR | 20220096845 | A | * | 7/2022 | ........... G09G 3/3266 |
| KR | 20230004040 | A | * | 1/2023 | ........... G09G 3/3674 |
| KR | 20230094331 | A | * | 6/2023 | ........... G09G 3/3225 |
| KR | 102601837 | B1 | | 11/2023 | |
| TW | 201413352 | A | * | 4/2014 | ........... G09G 3/3677 |

* cited by examiner

TP1

TP2

TP3

TP4

POFF

DRIVER, DISPLAY PANEL AND DISPLAY DEVICE CAPABLE OF DISCHARGING A QB NODE IN A POWER-OFF PERIOD

This application claims priority to Korean Patent Application No. 10-2024-0017956, filed on Feb. 6, 2024, and all the benefits accruing therefrom under 35 U.S.C. § 119, the content of which in its entirety is herein incorporated by reference.

BACKGROUND

1. Field

Embodiments of the present invention relate to a display device, and more particularly to a driver, a display panel and a display device.

2. Description of the Related Art

A display device may include a display panel that includes a plurality of pixels, a data driver that provides data signals to the plurality of pixels, a gate driver providing gate signals to the plurality of pixels, an emission driver that provides emission signals to the plurality of pixels, and a controller that controls the data driver, the gate driver and the emission driver.

The display device may perform a power-off sequence in response to a power-off signal. If the power-off sequence is performed, signals and voltages provided to the gate driver and/or the emission driver may be deactivated. However, even if the signals and voltages provided to the gate driver and/or the emission driver are deactivated, internal nodes (e.g., QB nodes) of the gate driver and/or the emission driver may be maintained at previous voltages.

SUMMARY

Some embodiments provide a driver capable of discharging a QB node in a power-off period.

Some embodiments provide a display panel capable of discharging a QB node in a power-off period.

Some embodiments provide a display device including a driver capable of discharging a QB node in a power-off period.

According to embodiments, there is provided a driver including a plurality of stages. At least one stage of the plurality of stages includes: an input circuit configured to transfer an input signal to a Q node in response to a first clock signal, where the Q node includes a first Q node and a second Q node; a first QB node controlling circuit configured to control a voltage of a first QB node based on a voltage of the first Q node and a first QB control signal; an output circuit configured to output an output signal, which has a high gate voltage, based on a voltage of the second Q node, and configured to output the output signal, which has a low gate voltage based on the voltage of the first QB node; and a first QB node discharging circuit configured to discharge the first QB node when the high gate voltage and the first low gate voltage are deactivated.

In embodiments, when a display device including the driver is powered off, the high gate voltage and the first low gate voltage may be deactivated to a ground voltage, and the first QB node discharging circuit may discharge the first QB node to the ground voltage.

In embodiments, the at least one stage may further include a reset circuit configured to reset the first Q node in response to a reset signal. The first QB node discharging circuit may include a first transistor including a gate which receives the reset signal, a first terminal connected to a line, which transfers the first QB control signal, and a second terminal connected to the first QB node.

In embodiments, the at least one stage may further include a reset circuit configured to reset the first Q node in response to a reset signal. The first QB node discharging circuit may include a first transistor including a gate which receives the reset signal, a first terminal connected to a line, which transfers the high gate voltage, and a second terminal connected to the first QB node.

In embodiments, the first QB node discharging circuit may include a first transistor including a gate connected to a line which transfers a second low gate voltage lower than the first low gate voltage, a first terminal connected to a line, which transfers the first QB control signal, and a second terminal connected to the first QB node.

In embodiments, the first QB node discharging circuit may include a first transistor including a gate connected to a line which transfers a second low gate voltage lower than the first low gate voltage, a first terminal connected to a line which transfers the high gate voltage, and a second terminal connected to the first QB node.

In embodiments, the input circuit may include a second transistor including a gate, which receives the first clock signal, a first terminal which receives the input signal, and a second terminal connected to the first Q node.

In embodiments, the first QB node controlling circuit may provide a second low gate voltage lower than the first low gate voltage to the first QB node when the voltage of the first Q node has a high level, and may provide the first QB control signal when the voltage of the first Q node has a low level.

In embodiments, the first QB node controlling circuit may include a third transistor including a gate which receives the first QB control signal, a first terminal which receives the first QB control signal, and a second terminal, a fourth transistor including a gate connected to the second terminal of the third transistor, a first terminal which receives the first QB control signal, and a second terminal connected to the first QB node, a first capacitor including a first electrode connected to the gate of the fourth transistor, and a second electrode connected to the first QB node, a fifth transistor including a gate connected to the first Q node, a first terminal connected to the gate of the fourth transistor, and a second terminal connected to a line which transfers the first low gate voltage, and a sixth transistor including a gate connected to the first Q node, a first terminal connected to the first QB node, and a second terminal connected to a line which transfers a second low gate voltage lower than the first low gate voltage.

In embodiments, the first QB node controlling circuit may further include a seventh transistor connected between the second terminal of the fourth transistor and the first QB node. The seventh transistor may include a gate which receives a second clock signal different from the first clock signal, a first terminal connected to the second terminal of the fourth transistor, and a second terminal connected to the first QB node.

In embodiments, the output circuit may include an eighth transistor including a gate connected to the second Q node, a first terminal connected to a line which transfers the high gate voltage, and a second terminal connected to an output node at which the output signal is output, a second capacitor including a first electrode connected to the second Q node, and a second electrode connected to the output node, and a ninth transistor including a gate connected to the first QB node, a first terminal connected to the output node, and a second terminal connected to a line which transfers the first low gate voltage.

In embodiments, the output circuit may include an eighth transistor including a gate connected to the Q node, a first terminal which receives a second clock signal different from the first clock signal, and a second terminal connected to an output node at which the output signal is output, and a ninth transistor including a gate connected to the first QB node, a first terminal connected to the output node, and a second terminal connected to a line which transfers the first low gate voltage.

In embodiments, the at least one stage may further include a node separating circuit disposed at the Q node, and configured to divide the Q node into the first Q node and the second Q node.

In embodiments, the node separating circuit may include a tenth transistor including a gate connected to a line which transfers the high gate voltage, a first terminal connected to the first Q node, and a second terminal connected to the second Q node.

In embodiments, the at least one stage may further include a boosting circuit configured to boost a voltage of the second Q node in response to a second clock signal different from the first clock signal.

In embodiments, the boosting circuit may include an eleventh transistor including a gate connected to the second Q node, a first terminal which receives the second clock signal, and a second terminal, and a third capacitor including a first electrode connected to the second Q node, and a second electrode connected to the second terminal of the eleventh transistor.

In embodiments, the at least one stage may further include a carry circuit configured to output a carry signal, which has the high gate voltage based on the voltage of the second Q node, and to output the carry signal, which has a second low gate voltage lower than the first low gate voltage based on the voltage of the first QB node.

In embodiments, the carry circuit may include a twelfth transistor including a gate connected to the second Q node, a first terminal connected to a line which transfers the high gate voltage, and a second terminal connected to a carry node at which the carry signal is output, and a thirteenth transistor including a gate connected to the first QB node, a first terminal connected to the carry node, and a second terminal connected to a line which transfers the second low gate voltage.

In embodiments, the carry circuit may include a twelfth transistor including a gate connected to the Q node, a first terminal which receives a second clock signal different from the first clock signal, and a second terminal connected to a carry node at which the carry signal is output, a fourth capacitor including a first electrode connected to the Q node, and a second electrode connected to the carry node, and a thirteenth transistor including a gate connected to the first QB node, a first terminal connected to the carry node, and a second terminal connected to a line which transfers the second low gate voltage.

In embodiments, the at least one stage may further include a reset circuit configured to provide the first low gate voltage to the first Q node in response to a reset signal.

In embodiments, the reset circuit may include a fourteenth transistor including a gate which receives the reset signal, a first terminal connected to the first Q node, and a second terminal connected to a line which transfers the first low gate voltage.

In embodiments, the at least one stage may further include a reset circuit configured to provide a second low gate voltage lower than the first low gate voltage to the first Q node in response to a reset signal.

In embodiments, the reset circuit may include a fourteenth transistor including a gate which receives the reset signal, a first terminal connected to the first Q node, and a second terminal connected to a line which transfers the second low gate voltage.

In embodiments, a second transistor included in the input circuit may include a first sub-transistor and a second sub-transistor connected in series. The at least one stage may further include a leakage preventing circuit configured to provide the high gate voltage to a node between the first sub-transistor and the second sub-transistor in response to the voltage of the first Q node.

In embodiments, the leakage preventing circuit may include a fifteenth transistor including a gate connected to the first Q node, a first terminal connected to a line which transfers the high gate voltage, and a second terminal connected to the node between the first sub-transistor and the second sub-transistor.

In embodiments, the at least one stage may further include a first stabilizing circuit configured to provide a second low gate voltage lower than the first low gate voltage to the first Q node when the voltage of the first QB node has a high level.

In embodiments, the first stabilizing circuit may include a sixteenth transistor including a gate connected to the first QB node, a first terminal connected to the first Q node, and a second terminal connected to a line which transfers the second low gate voltage.

In embodiments, the first stabilizing circuit may include a seventeenth transistor including a gate which receives a second clock signal different from the first clock signal, a first terminal connected to the Q node, and a second terminal, and an eighteenth transistor including a gate connected to the first QB node, a first terminal connected to the second terminal of the seventeenth transistor, and a second terminal connected to a carry node at which a carry signal is output.

In embodiments, transistors included in the at least one stage may be n-type metal oxide semiconductor (NMOS) transistors.

In embodiments, at least one of transistors included in the at least one stage may have a double gate structure including a top gate and a bottom gate, and the bottom gate may be connected to the top gate.

In embodiments, the at least one stage may further include a second QB node controlling circuit configured to control the voltage of a second QB node based on the voltage of the first Q node and a second QB control signal, and a second QB node discharging circuit configured to discharge the second QB node when the high gate voltage and the first low gate voltage are deactivated. The output circuit may output the output signal, which has the first low gate voltage when the voltage of the first QB node has a high level or when the voltage of the second QB node has a high level.

In embodiments, in a first frame period, the first QB control signal may have the high gate voltage, the second QB control signal may have a second low gate voltage lower than the first low gate voltage, and the output circuit may output the output signal, which has the first low gate voltage when the voltage of the first QB node has a high level. In a second frame period, the first QB control signal may have the second low gate voltage, the second QB control signal may have the high gate voltage, and the output circuit may output the output signal, which has the first low gate voltage when the voltage of the second first QB node has a high level.

In embodiments, the at least one stage may further include a first stabilizing circuit configured to provide a second low gate voltage lower than the first low gate voltage to the first Q node when the voltage of the first QB node has a high level, and a second stabilizing circuit configured to provide the second low gate voltage to the first Q node when the voltage of the second QB node has a high level.

According to embodiments, there is provided a display panel included in a display device. The display panel includes a first pixel transistor including a gate connected to a first node, a first terminal connected to a line which transfers a first power supply voltage, and a second terminal connected to a second node, a storage capacitor connected between the first node and the second node, a second pixel transistor including a gate which receives a write signal, a first terminal connected to a data line, and a second terminal connected to the first node, a third pixel transistor including a gate which receives a reference signal, a first terminal which receives a reference voltage, and a second terminal connected to the first node, a fourth pixel transistor including a gate which receives an initialization signal, a first terminal connected to an anode of a light emitting element, and a second terminal which receives an initialization voltage, a light emitting element including the anode, and a cathode connected to a line which transfers a second power supply voltage, a first transistor including a gate which receives a reset signal, a first terminal connected to a line which transfers a QB control signal, and a second terminal connected to a QB node, a second transistor including a gate which receives a first clock signal, a first terminal which receives an input signal, and a second terminal connected to a Q node, a third transistor including a gate which receives the QB control signal, a first terminal which receives the QB control signal, and a second terminal, a fourth transistor including a gate connected to the second terminal of the third transistor, a first terminal which receives the QB control signal, and a second terminal connected to the QB node, a first capacitor including a first electrode connected to the gate of the fourth transistor, and a second electrode connected to the QB node, a fifth transistor including a gate connected to the Q node, a first terminal connected to the gate of the fourth transistor, and a second terminal connected to a line which transfers a first low gate voltage, a sixth transistor including a gate connected to the Q node, a first terminal connected to the QB node, and a second terminal connected to a line which transfers a second low gate voltage lower than the first low gate voltage, a seventh transistor including a gate which receives a second clock signal different from the first clock signal, a first terminal connected to the second terminal of the fourth transistor, and a second terminal connected to the QB node, an eighth transistor including a gate connected to the Q node, a first terminal connected to a line which transfers a high gate voltage, and a second terminal connected to an output node at which an output signal is output, a second capacitor including a first electrode connected to the Q node, and a second electrode connected to the output node, and a ninth transistor including a gate connected to the QB node, a first terminal connected to the output node, and a second terminal connected to the line which transfers the first low gate voltage. The output signal is the write signal, the reference signal or the initialization signal.

In embodiments, the first pixel transistor, the second pixel transistor, the third pixel transistor, the fourth pixel transistor and the light emitting element may form a pixel, and the first transistor, the second transistor, the third transistor, the fourth transistor, the first capacitor, the fifth transistor, the sixth transistor, the seventh transistor, the eighth transistor, the second capacitor and the ninth transistor may form a stage of a driver.

According to embodiments, there is provided a display device including a display panel including a plurality of pixels, a data driver configured to provide data signals to the plurality of pixels, a gate driver configured to provide gate signals to the plurality of pixels, an emission driver configured to provide emission signals to the plurality of pixels, a power management circuit configured to provide a high gate voltage, a first low gate voltage and a second low gate voltage to at least one driver of the gate driver and the emission driver, and a controller configured to control the data driver, the gate driver, the emission driver and the power management circuit. The controller receives a power-off signal. In at least one first frame period after the power-off signal is received, a black data voltages is provided as the data signals to the plurality of pixels. In at least one second frame period after the first frame period, a start signal provided to the at least one driver is maintained at the second low gate voltage, first and second clock signals and a QB control signal are maintained at the high gate voltage, and a reset signal provided to the at least one driver is deactivated to a ground voltage. In a power-off period after the second frame period, the high gate voltage, the first low gate voltage, the second low gate voltage, the start signal, the first and second clock signals and the QB control signal are deactivated to the ground voltage, and a stage of the at least one driver discharges a QB node through a path from the QB node of the stage to a line which transfers the QB control signal in response to the reset signal.

In embodiments, the controller may receive a power-on signal. In at least one third frame period after the power-on signal is received, the high gate voltage, the first low gate voltage and the second low gate voltage may be activated, and the reset signal may be maintained at the high gate voltage. In at least one fourth frame period after the third frame period, the start signal may be maintained at the second low gate voltage, and the first and second clock signals may toggle periodically. In at least one fifth frame period after the fourth frame period, the start signal having the high gate voltage may be applied to the at least one driver, the first and second clock signals may toggle periodically, and the black data voltage may be provided as the data signals to the plurality of pixels.

According to embodiments, there is provided a display device including a display panel including a plurality of pixels, a data driver configured to provide data signals to the plurality of pixels, a gate driver configured to provide gate signals to the plurality of pixels, an emission driver configured to provide emission signals to the plurality of pixels, and a controller configured to control the data driver, the gate driver and the emission driver. At least one of the gate driver and the emission driver includes a plurality of stages. At least one stage of the plurality of stages includes an input circuit configured to transfer an input signal to a Q node in response to a first clock signal, a QB node controlling circuit configured to control a voltage of a QB node based on a voltage of the Q node and a QB control signal, an output circuit configured to output an output signal having a high gate voltage based on the voltage of the Q node, and configured to output the output signal having a low gate voltage based on the voltage of the QB node, and a QB node discharging circuit configured to discharge the QB node when the high gate voltage and the low gate voltage are deactivated.

As described above, in a driver, a display panel and a display device according to embodiments, at least one stage may include a QB node discharging circuit that discharges a QB node when a high gate voltage and a low gate voltage are deactivated. Accordingly, in a power-off period, an internal node, or the QB node of the stage of the driver may be normally discharged.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
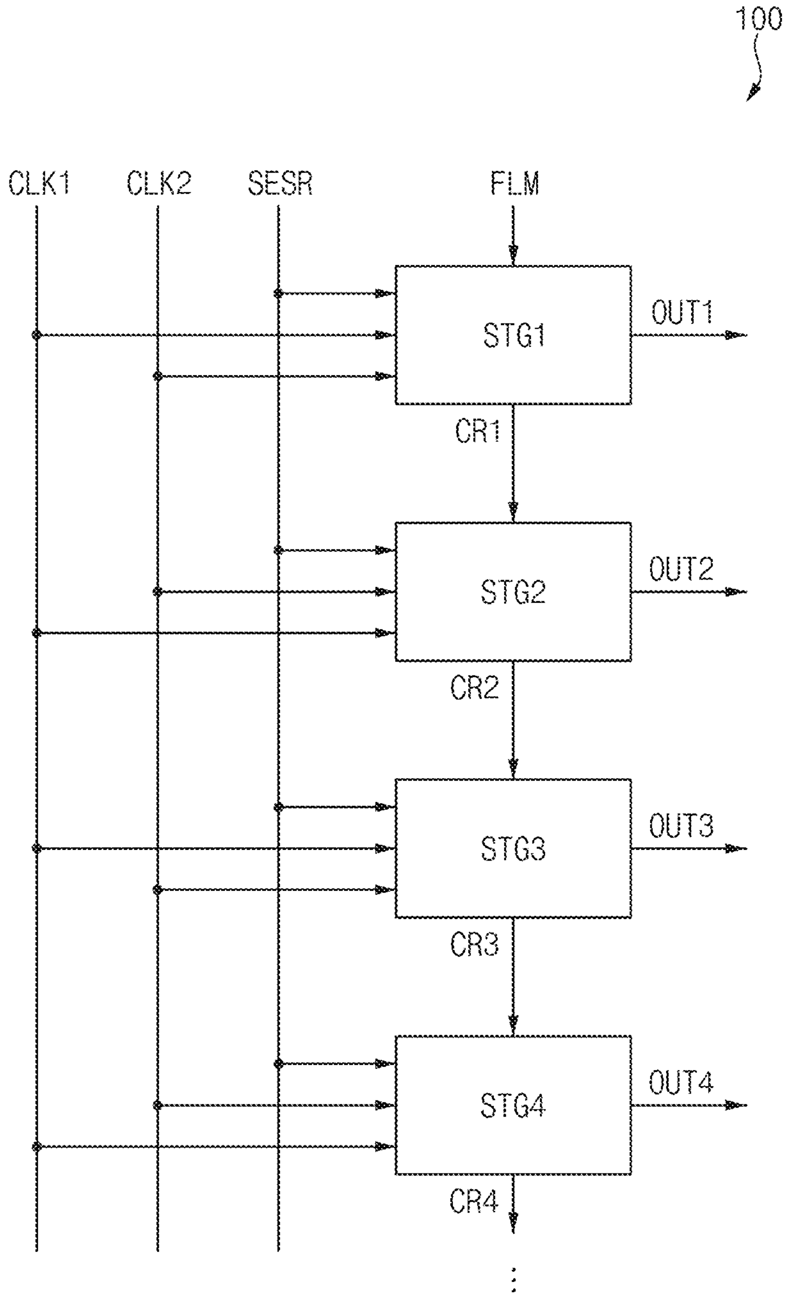
FIG. 1 is a block diagram illustrating a driver according to embodiments.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The embodiments are described more fully hereinafter with reference to the accompanying drawings. Like or similar reference numerals refer to like or similar elements throughout.

Figure 2:
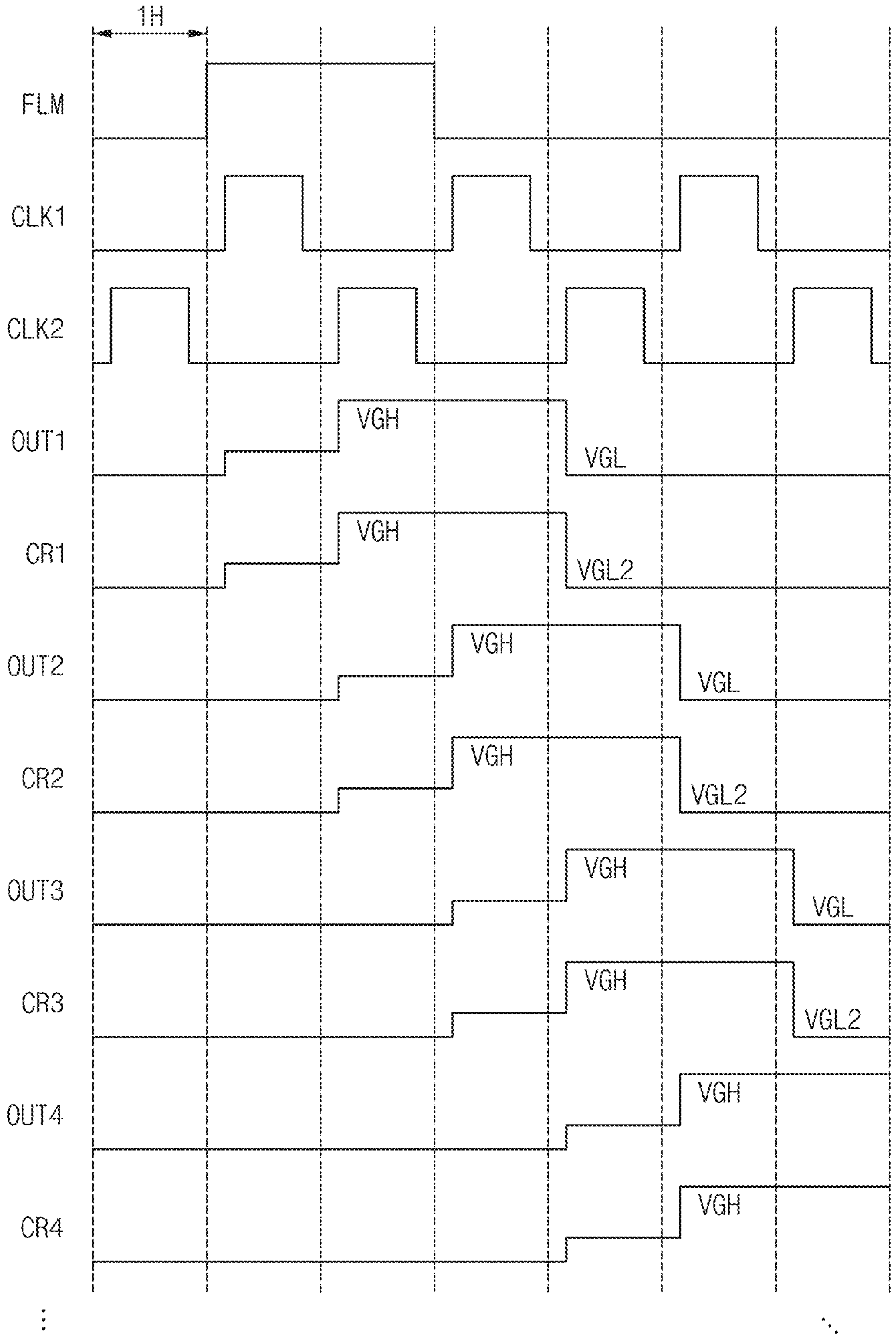
FIG. 2 is a timing diagram for describing an example of an operation of a driver of FIG. 1.

FIG. 1 is a block diagram illustrating a driver according to embodiments, and FIG. 2 is a timing diagram for describing an example of an operation of a driver of FIG. 1.

Referring to FIG. 1, a driver 100 according to embodiments may include a plurality of stages STG1, STG2, STG3, STG4, etc. The driver 100 may be implemented in the form of a shift register in which the plurality of stages STG1, STG2, STG3, STG4, etc. sequentially outputs output signals OUT1, OUT2, OUT3, OUT4, etc. In some embodiments, the driver 100 may be formed in a display panel of a display device. For example, the driver 100 may be integrated or formed on a substrate of the display panel, but is not limited thereto.

The plurality of stages STG1, STG2, STG3, STG4, etc. may sequentially output the output signals OUT1, OUT2, OUT3, OUT3, etc. based on a start signal FLM, a first clock signal CLK1 and a second clock signal CLK2. A first stage STG1 may receive the start signal FLM as an input signal, and each of subsequent stages STG2, STG3, STG4, etc. may receive a carry signal CR1, CR2, CR3, CR4, etc. of a previous stage as an input signal. For example, a second stage STG2 may receive a first carry signal CR1 of the first stage STG1 as an input signal, a third stage STG3 may receive a second carry signal CR2 of the second stage STG2 as an input signal, and a fourth stage STG4 may receive a third carry signal CR3 of the third stage STG3 as an input signal.

In some embodiments, each odd-numbered stage STG1, STG3, etc. may receive the input signal in response to the first clock signal, and may out the output signal OUT1, OUT3, etc. having a high gate voltage VGH or a low gate voltage VGL (in other words, “first low gate voltage”) and the carry signal CR1 CR3, etc. having the high gate voltage VGH or a second low gate voltage VGL2 lower than the low gate voltage VGL in response to the second clock signal CLK2. Each even-numbered stage STG2, STG4, etc. may receive the input signal in response to the second clock signal CLK2, and may out the output signal OUT2, OUT4, etc. having the high gate voltage VGH or the low gate voltage VGL and the carry signal CR2, CR4, etc. having the high gate voltage VGH or the second low gate voltage VGL2 in response to the first clock signal CLK1.

For example, as illustrated in FIGS. 1 and 2, when the start signal FLM has a high level (or the high gate voltage VGH), and the first clock signal CLK1 changes to a high level (or the high gate voltage VGH), the first stage STG1 may receive the start signal FLM having a high level. When the second clock signal CLK2 changes to a high level (or the high gate voltage VGH), the first stage STG1 may output a first output signal OUT1 having the high gate voltage VGH and the first carry signal CR1 having the high gate voltage VGH. Thereafter, when the start signal FLM has a low level (or the second low gate voltage VGL2) and the second clock signal CLK2 changes to a high level (or the high gate voltage VGH), the first stage STG1 may output the first output signal OUT1 having the low gate voltage VGL and the first carry signal CR1 having the second low gate voltage VGL2.

Further, when the first carry signal CR1 has a high level (or the high gate voltage VGH) and the second clock signal CLK2 changes to a high level, the second stage STG2 may receive the first carry signal CR1 having a high level. When the first clock signal CLK1 changes to a high level, the second stage STG2 may output a second output signal OUT2 having the high gate voltage VGH and the second carry signal CR2 having the high gate voltage VGH. Thereafter, when the first carry signal CR1 has a low level (or the second low gate voltage VGL2) and the first clock signal CLK1 changes to a high level, the second stage STG2 may output the second output signal OUT2 having the low gate voltage VGL and the second carry signal CR2 having the second low gate voltage VGL2.

Further, when the second carry signal CR2 has a high level and the first clock signal CLK1 changes to a high level, the third stage STG3 may receive the second carry signal CR2 having a high level. When the second clock signal CLK2 changes to a high level, the third stage STG3 may output a third output signal OUT3 having the high gate voltage VGH and the third carry signal CR3 having the high gate voltage VGH. Thereafter, when the second carry signal CR2 has a low level and the second clock signal CLK2 changes to a high level, the third stage STG3 may output the third output signal OUT3 having the low gate voltage VGL and the third carry signal CR3 having the second low gate voltage VGL2.

Further, when the third carry signal CR3 has a high level and the second clock signal CLK2 changes to a high level, the fourth stage STG4 may receive the third carry signal CR3 having a high level. When the first clock signal CLK1 changes to a high level, the fourth stage STG4 may output a fourth output signal OUT4 having the high gate voltage VGH and a fourth carry signal CR4 having the high gate voltage VGH. Thereafter, when the third carry signal CR3 has a low level and the first clock signal CLK1 changes to a high level, the fourth stage STG4 may output the fourth output signal OUT4 having the low gate voltage VGL and the fourth carry signal CR4 having the second low gate voltage VGL2.

In this manner, the plurality of stages STG1, STG2, STG3, STG4, etc. may sequentially output the output signals OUT1, OUT2, OUT3, OUT4, etc. and the carry signals CR1, CR2, CR3, CR4, etc. while delaying or shifting the output signals OUT1, OUT2, OUT3, OUT4, etc. and the carry signals CR1, CR2, CR3, CR4, etc. by one horizontal time 1H (or by a half of a period (or a cycle) of the first and second clock signals CLK1 and CLK2).

Although FIG. 2 illustrates an example in which an on-period (or a high period) of each of the first and second clock signals CLK1 and CLK2 is shorter than an off-period (or a low period) of each of the first and second clock signals CLK1 and CLK2, the first and second clock signals CLK1 and CLK2 provided to the driver 100 according to embodiments are not limited to the example of FIG. 2. In another example, the first and second clock signals CLK1 and CLK2 may have a duty cycle of about 50%.

In some embodiments, the plurality of stages STG1, STG2, STG3, STG4, etc. may further receive a reset signal SESR having a high level (or the high gate voltage VGH) in an initial power-on period in which the display device is powered on. The plurality of stages STG1, STG2, STG3, STG4, etc. may reset Q nodes of the plurality of stages STG1, STG2, STG3, STG4, etc. in the initial power-on period in response to the reset signal SESR.

Figure 3:
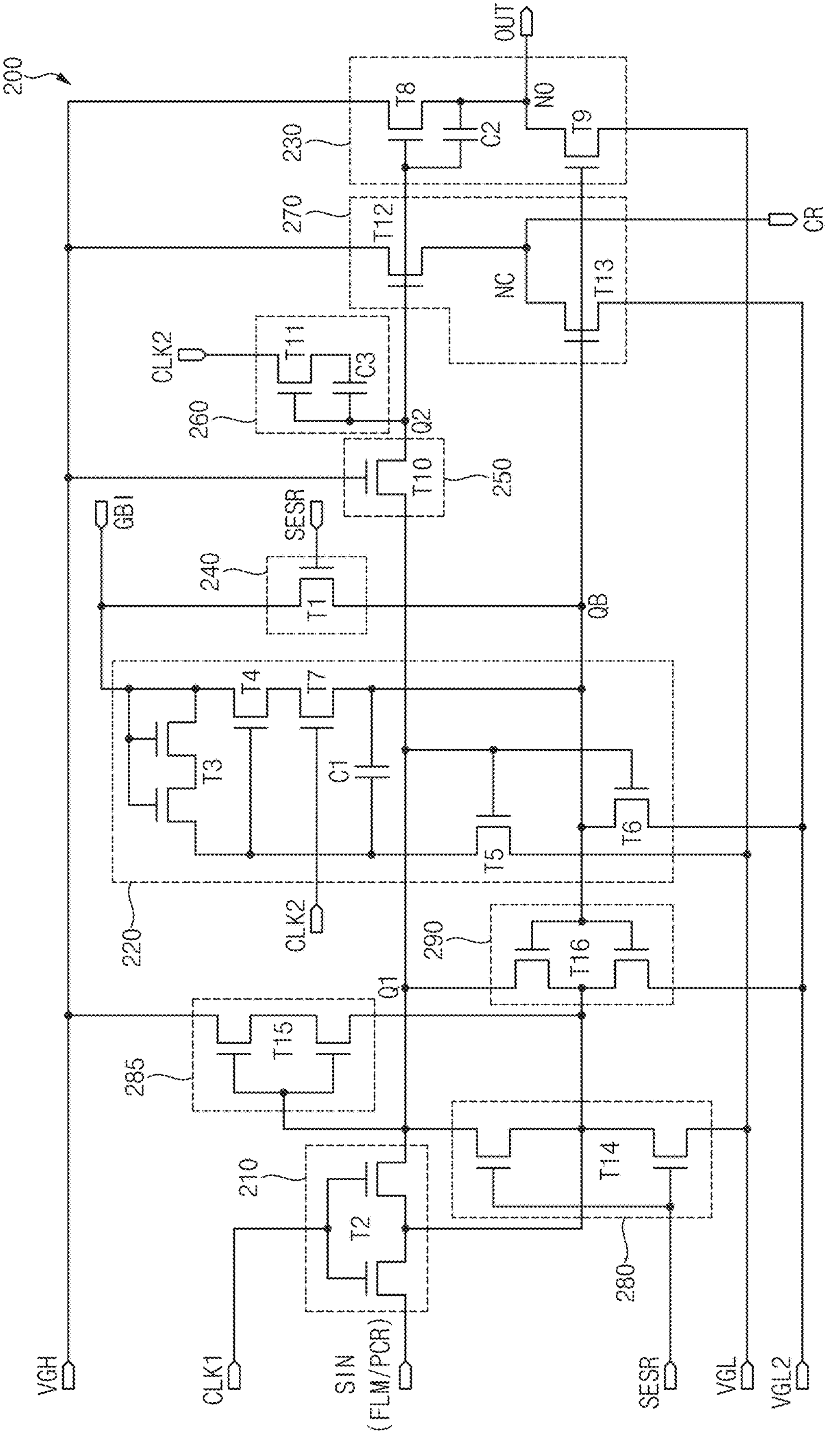
FIG. 3 is a circuit diagram illustrating a stage of a driver according to embodiments.

FIG. 3 is a circuit diagram illustrating a stage of a driver according to embodiments.

Referring to FIG. 3, at least one stage 200 of a driver according to embodiments may include an input circuit 210 that transfers an input signal SIN to a Q node Q1 and Q2, a QB node controlling circuit 220 (in other words, “first QB node controlling circuit) that controls a voltage of a QB node QB (in other words, “first QB node”), an output circuit 230 that outputs an output signal OUT, and a QB node discharging circuit 240 (in other words, “first QB node discharging circuit”) that discharges the QB node QB.

In some embodiments, the stage 200 may further include a node separating circuit 250 that divides the Q node Q1 and Q2 into a first Q node Q1 and a second Q node Q2, a boosting circuit 260 that boosts a voltage of the second Q node Q2, a carry circuit 270 that outputs a carry signal CR, a reset circuit 280 that resets the Q node Q1 and Q2 (e.g., the first Q node Q1), a leakage preventing circuit 285 that prevents a leakage current from the Q node Q1 and Q2 (e.g., the first Q node Q1), and a stabilizing circuit 290 (in other words, “first stabilizing circuit) that stabilizes a voltage of the Q node Q1 and Q2 (e.g., the first Q node Q1).

The input circuit 210 may transfer the input signal SIN to the Q node Q1 and Q2, or the first Q node Q1 in response to a first clock signal CLK1. In some embodiments, the input signal SIN may be a start signal FLM if the stage 200 is a first stage, and may be a carry signal PCR of a previous stage if the stage 200 is a subsequent stage.

In some embodiments, the input circuit 210 may include a second transistor T2. For example, the second transistor T2 may include a gate which receives the first clock signal CLK1, a first terminal which receives the input signal SIN, and a second terminal connected to the first Q node Q1.

The QB node controlling circuit 220 may control the voltage of the QB node QB based on a voltage of the first Q node Q1 and a QB control signal GBI (in other words, "first QB control signal"). For example, the QB node controlling circuit 220 may provide a second low gate voltage VGL2 to the QB node QB when the voltage of the first Q node Q1 has a high level, and may provide the QB control signal GBI to the QB node QB when the voltage of the first Q node Q1 has a low level. In some embodiments, the second low gate voltage VGL2 may be lower than a low gate voltage VGL of the output signal OUT. Further, the QB control signal GBI may have a high gate voltage VGH. In some embodiments, as illustrated in FIG. 3, a line which transfers the QB control signal GBI may be different from a line which transfers the high gate voltage VGH. In other embodiments, as described below with reference to FIG. 16, the high gate voltage VGH may be used instead of the QB control signal GBI, and the QB node controlling circuit 220 may be connected to the line which transfers the high gate voltage VGH. Further, in some embodiments, as illustrated in FIG. 3, the QB node controlling circuit 220 may receive a second clock signal CLK2. In this case, the QB node controlling circuit 220 may provide the QB control signal GBI to the QB node QB when the voltage of the first Q node Q1 has a low level and the second clock signal CLK2 has a high level.

In some embodiments, the QB node controlling circuit 220 may include a third transistor T3, a fourth transistor T4, a first capacitor C1, a fifth transistor T5 and a sixth transistor T6. For example, the third transistor T3 may include a gate which receives the QB control signal GBI, a first terminal which receives the QB control signal GBI, and a second terminal, and the fourth transistor T4 may include a gate connected to the second terminal of the third transistor T3, a first terminal which receives the QB control signal GBI, and a second terminal connected to the QB node QB, the first capacitor C1 may include a first electrode connected to the gate of the fourth transistor T4, and a second electrode connected to the QB node QB, the fifth transistor T5 may include a gate connected to the first Q node Q1, a first terminal connected to the gate of the fourth transistor T4, and a second terminal connected to a line which transfers the low gate voltage VGL, and the sixth transistor T6 may include a gate connected to the first Q node Q1, a first terminal connected to the QB node QB, and a second terminal connected to a line which transfers the second low gate voltage VGL2. In some embodiments, the QB node controlling circuit 220 may further include a seventh transistor T7 connected between the second terminal of the fourth transistor T4 and the QB node QB. For example, the seventh transistor T7 may include a gate which receives the second clock signal CLK2, a first terminal connected to the second terminal of the fourth transistor T4, and a second terminal connected to the QB node QB.

The node separating circuit 250 may be disposed at the Q node Q1 and Q2, and may the Q node Q1 and Q2 into the first Q node Q1 and the second Q node Q2. The node separating circuit 250 may connect the first Q node Q1 and the second Q node Q2 to each other in most times, but may disconnect the first Q node Q1 from the second Q node Q2 when the voltage of the second Q node Q2 is boosted. Thus, when the voltage of the second Q node Q2 has a boosted high level, the voltage of the second Q node Q2 may be prevented from being transferred to the first Q node Q1.

In some embodiments, the node separating circuit 250 may include a tenth transistor T10. For example, the tenth transistor T10 may include a gate connected to the line which transfers the high gate voltage VGH, a first terminal connected to the first Q node Q1, and a second terminal connected to the second Q node Q2.

The boosting circuit 260 may boost the voltage of the second Q node Q2 in response to the second clock signal CLK2. For example, when the second clock signal CLK2 changes from a low level to a high level, the boosting circuit 260 may boost the voltage of the node Q2 from a high level to a boosted high level by using a boosting capacitor (or a third capacitor C3).

In some embodiments, the boosting circuit 260 may include an eleventh transistor T11 and the third capacitor C3. For example, the eleventh transistor T11 may include a gate connected to the second Q node Q2, a first terminal which receives the second clock signal CLK2, and a second terminal, and a third capacitor C3 may include a first electrode connected to the second Q node Q2, and a second electrode connected to the second terminal of the eleventh transistor T11.

The output circuit 230 may output the output signal OUT having the high gate voltage VGH based on the voltage of the second Q node Q2, and may output the output signal OUT having the low gate voltage VGL based on the voltage of the QB node QB. For example, the output circuit 230 may output the output signal OUT having the high gate voltage VGH in response to the voltage of the second Q node Q2 having a boosted high level, and may output the output signal OUT having the low gate voltage VGL in response to the voltage of the QB node QB having a high level.

In some embodiments, the output circuit 230 may include an eighth transistor T8, a second capacitor C2 and a ninth transistor T9. For example, the eighth transistor T8 may include a gate connected to the second Q node Q2, a first terminal connected to the line which transfers the high gate voltage VGH, and a second terminal connected to an output node NO at which the output signal OUT is output, the second capacitor C2 may include a first electrode connected to the second Q node Q2, and a second electrode connected to the output node NO, and the ninth transistor T9 may include a gate connected to the QB node QB, a first terminal connected to the output node NO, and a second terminal connected to the line which transfers the low gate voltage VGL.

The carry circuit 270 may outputs the carry signal CR having the high gate voltage VGH based on the voltage of the second Q node Q2, and may output the carry signal CR having the second low gate voltage VGL2 based on the voltage of the QB node QB. For example, the carry circuit 270 may output the carry signal CR having the high gate voltage VGH in response to the voltage of the second Q node Q2 having a boosted high level, and may output the carry signal CR having the second low gate voltage VGL2 in response to the voltage of the QB node QB having a high level.

In some embodiments, the carry circuit 270 may include a twelfth transistor T12 and a thirteenth transistor T13. For example, the twelfth transistor T12 may include a gate connected to the second Q node Q2, a first terminal connected to the line which transfers the high gate voltage VGH, and a second terminal connected to a carry node NC at which the carry signal CR is output, and the thirteenth transistor T13 may include a gate connected to the QB node QB, a first terminal connected to the carry node NC, and a second terminal connected to the line which transfers the second low gate voltage VGL2.

The reset circuit 280 may provide the low gate voltage VGL to the first Q node Q1 in response to the reset signal SESR. In some embodiments, the reset signal SESR may have a high level (or the high gate voltage VGH) in an initial power-on period in which a display device is powered on, and the reset circuit 280 may provide the low gate voltage VGL to the first Q node Q1 in response to the reset signal SESR having a high level in the initial power-on period. Further, the low gate voltage VGL of the first Q node Q1 may be transferred to the second Q node Q2 through the tenth transistor T10. Thus, the reset circuit 280 may reset the first and second Q nodes Q1 and Q2 to the low gate voltage VGL in the initial power-on period.

In some embodiments, the reset circuit 280 may include a fourteenth transistor T14. For example, the fourteenth transistor T14 may include a gate which receives the reset signal SESR, a first terminal connected to the first Q node Q1, and a second terminal connected to the line which transfers the low gate voltage VGL.

The stabilizing circuit 290 may provide the second low gate voltage VGL2 to the first Q node Q1 when the voltage of the QB node QB has a high level. The second low gate voltage VGL2 of the first Q node Q1 may be transferred to the second Q node Q2 through the tenth transistor T10. In order that the Q node Q1 and Q2, or the first and second Q nodes Q1 and Q2 have a low level, or the second low gate voltage VGL2 in most times, the stabilizing circuit 290 may stabilize the voltages of the first and second Q nodes Q1 and Q2 by providing the second low gate voltage VGL2 to the first and second Q nodes Q1 and Q2.

In some embodiments, the stabilizing circuit 290 may include a sixteenth transistor T16. For example, the sixteenth transistor T16 may include a gate connected to the QB node QB, a first terminal connected to the first Q node Q1, and a second terminal connected to the line which transfers the second low gate voltage VGL2.

In some embodiments, as illustrated in FIG. 3, each of the second, fourteenth and sixteenth transistors T2, T14, and T16 may be implemented as a dual transistor including two sub-transistors connected in series to reduce a leakage current from the first Q node Q1. In addition, to further prevent the leakage current, the leakage preventing circuit 285 may provide the high gate voltage VGH to a node between the two sub-transistors in response to the voltage of the first Q node Q1. That is, the leakage preventing circuit 285 may provide the high gate voltage VGH to the node between the two sub-transistors while the first Q node Q1 has the high gate voltage VGH, thereby further preventing the leakage current.

In some embodiments, the leakage preventing circuit 285 may include a fifteenth transistor T15. For example, the fifteenth transistor T15 may include a gate connected to the first Q node Q1, a first terminal connected to the line which transfers the high gate voltage VGH, and a second terminal connected to the node between the two sub-transistors.

The QB node discharging circuit 240 may discharge the QB node QB in a power-off period in which the high gate voltage VGH and the low gate voltage VGL are deactivated. For example, when the display device is powered off, the high gate voltage VGH and the low gate voltage VGL may be deactivated to a ground voltage, and the QB node discharging circuit 240 may discharge the QB node QB from the high gate voltage VGH to the ground voltage. In some embodiments, as described below with reference to FIG. 10, the QB node discharging circuit 240 may form a path for a discharge current IDIS from the QB node QB to the line which transfers the QB control signal GBI in response to the reset signal SESR in the power-off period POFF.

In some embodiments, the QB node discharging circuit 240 may include a first transistor T1 that receives the reset signal SESR and that is connected between the QB node QB and the line which transfers the QB control signal GBI. For example, the first transistor T1 may include a gate which receives the reset signal SESR, a first terminal connected to the line which transfers the QB control signal GBI, and a second terminal connected to the QB node QB.

In a case where the stage 200 does not include the QB node discharging circuit 240, even if signals SIN, CLK1, CLK2, SESR and GBI and voltages VGH, VGL, and VGL2 provided to the stage 200 are deactivated to the ground voltage in the power-off period POFF, the QB node QB may not be discharged to the ground voltage, and may be maintained at the high gate voltage VGH for at least a certain time. In particular, when threshold voltages of the transistors T1 through T16 included in the stage 200 are shifted (e.g., positively shifted), the QB node QB may not be discharged to the ground voltage. However, in the stage 200 of the driver according to embodiments, the first transistor T1 may be turned off in response to the reset signal SESR having the second low gate voltage VGL2 in most periods other than the initial power-on period, and thus the threshold voltage of the first transistor T1 may not be shifted. Accordingly, in the power-off period POFF in which the reset signal SESR and the QB control signal GBI are deactivated to the ground voltage, the discharge current IDIS may flow from the QB node QB through the first transistor T1 to the line which transfers the QB control signal GBI, and the QB node QB may be discharged to the ground voltage.

In some embodiments, as illustrated in FIG. 3, the first through sixteenth transistors T1 through T16 included in the stage 200 may be N-type metal oxide semiconductor (NMOS) transistors, but are not limited thereto. Further, in some embodiments, the first through sixteenth transistors T1 through T16 included in the stage 200 may be oxide transistors having an active region including an oxide semiconductor, but are not limited thereto. In other embodiments, at least a portion of the first through sixteenth transistors T1 through T16 included in the stage 200 may be P-type metal oxide semiconductor (PMOS) transistors.

Further, in some embodiments, at least a portion of the first through sixteenth transistors T1 through T16 included in the stage 200 may be implemented as dual transistors each including two sub-transistors connected in series. For example, as illustrated in FIG. 3, each of the second, third, fourteenth, fifteenth and sixteenth transistors T2, T3, T14, T15 and T16 may include two sub-transistors connected in series.

Figure 4:
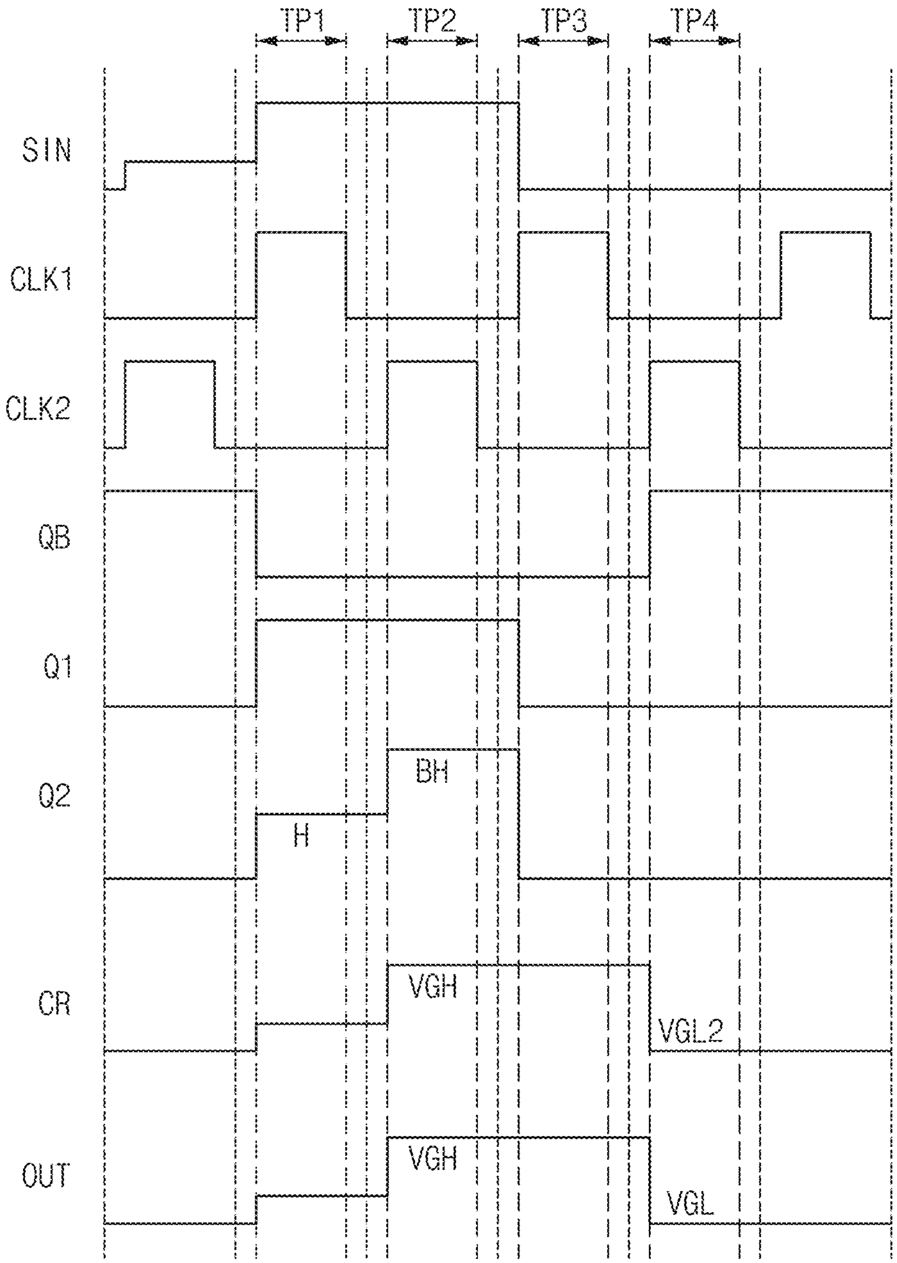
FIG. 4 is a timing diagram for describing an example of an operation of a stage of FIG. 3.
Figure 5:
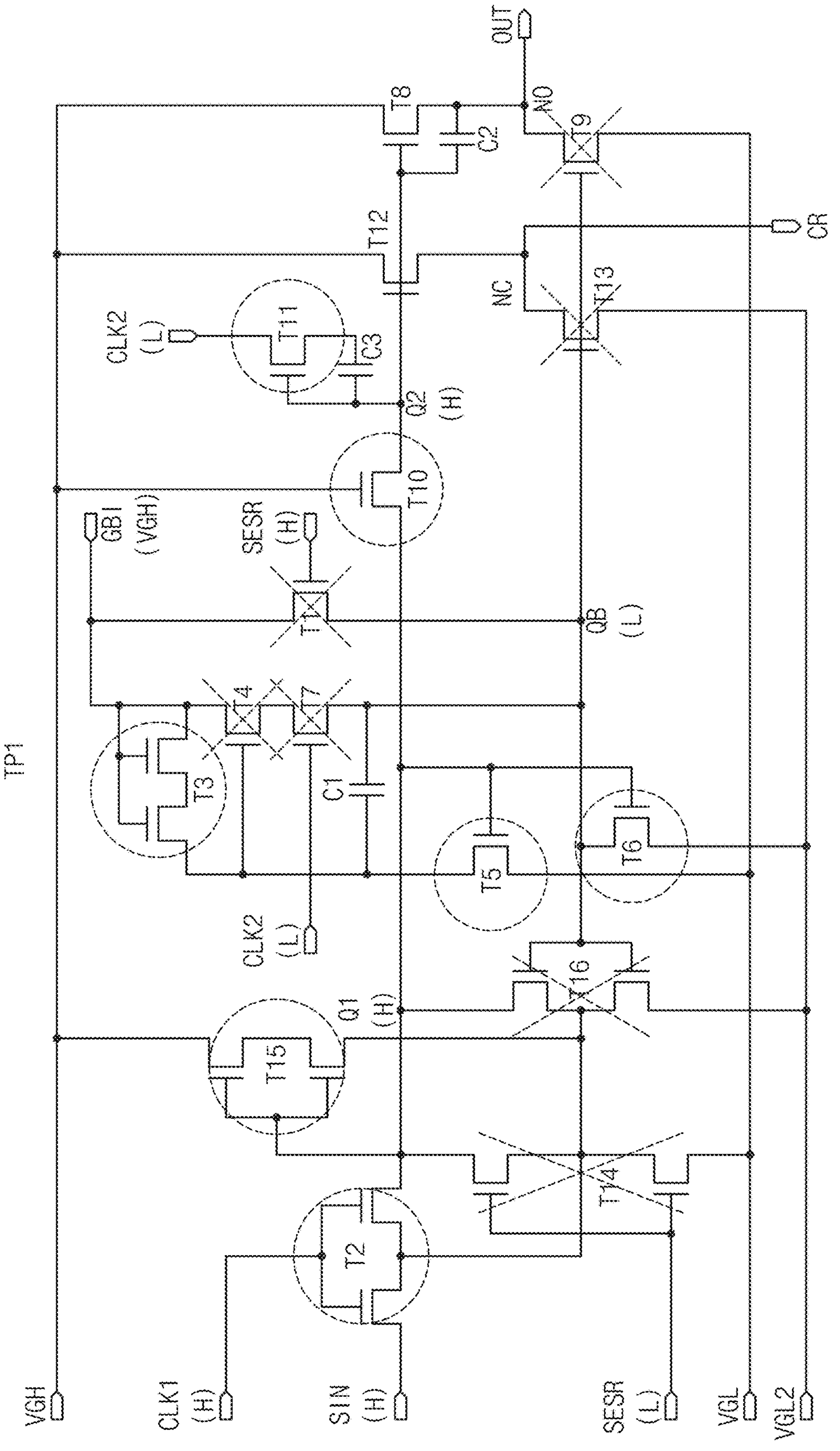
FIG. 5 is a circuit diagram for describing an example of an operation of a stage of FIG. 3 in a first time period.
Figure 6:
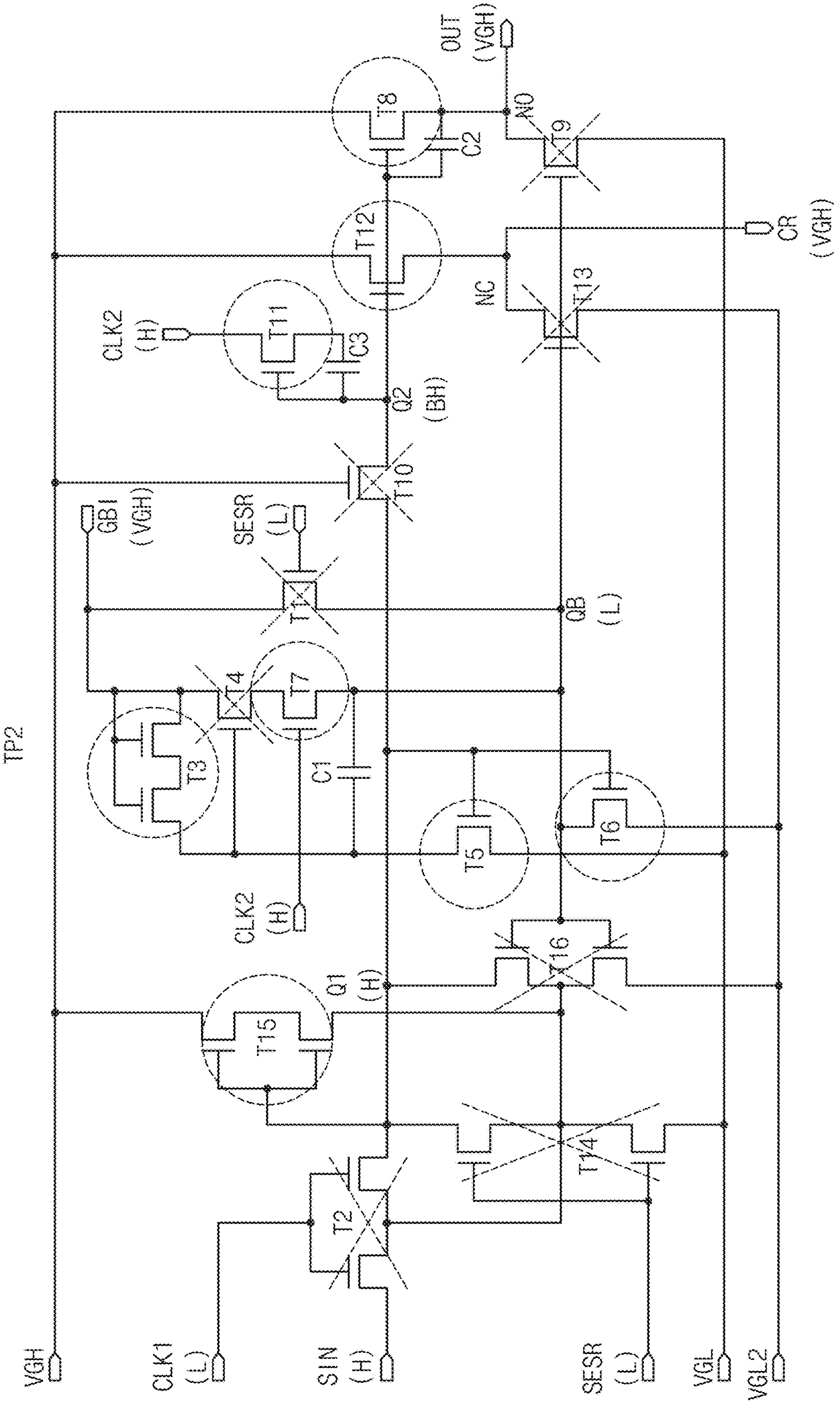
FIG. 6 is a circuit diagram for describing an example of an operation of a stage of FIG. 3 in a second time period.
Figure 7:
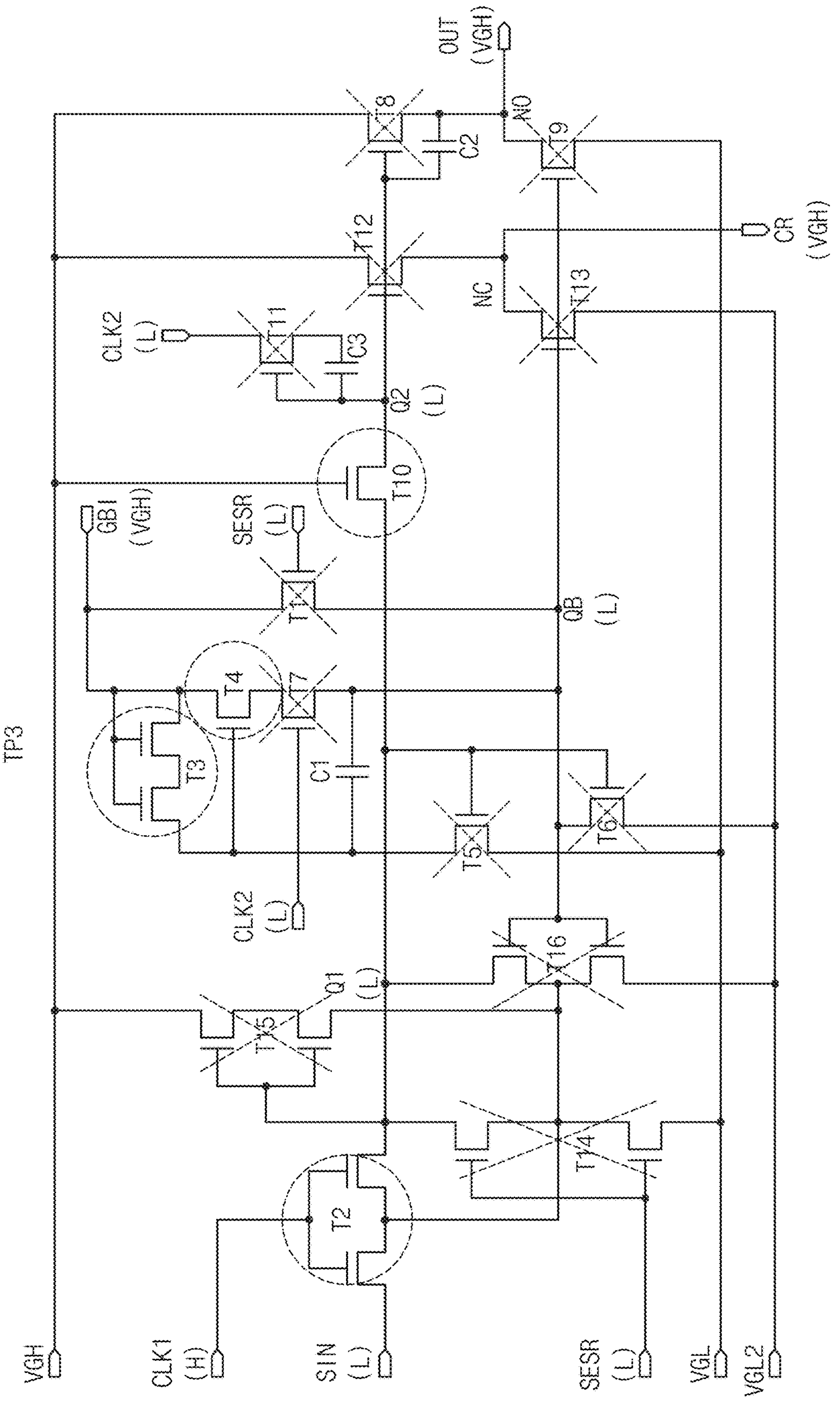
FIG. 7 is a circuit diagram for describing an example of an operation of a stage of FIG. 3 in a third time period.
Figure 8:
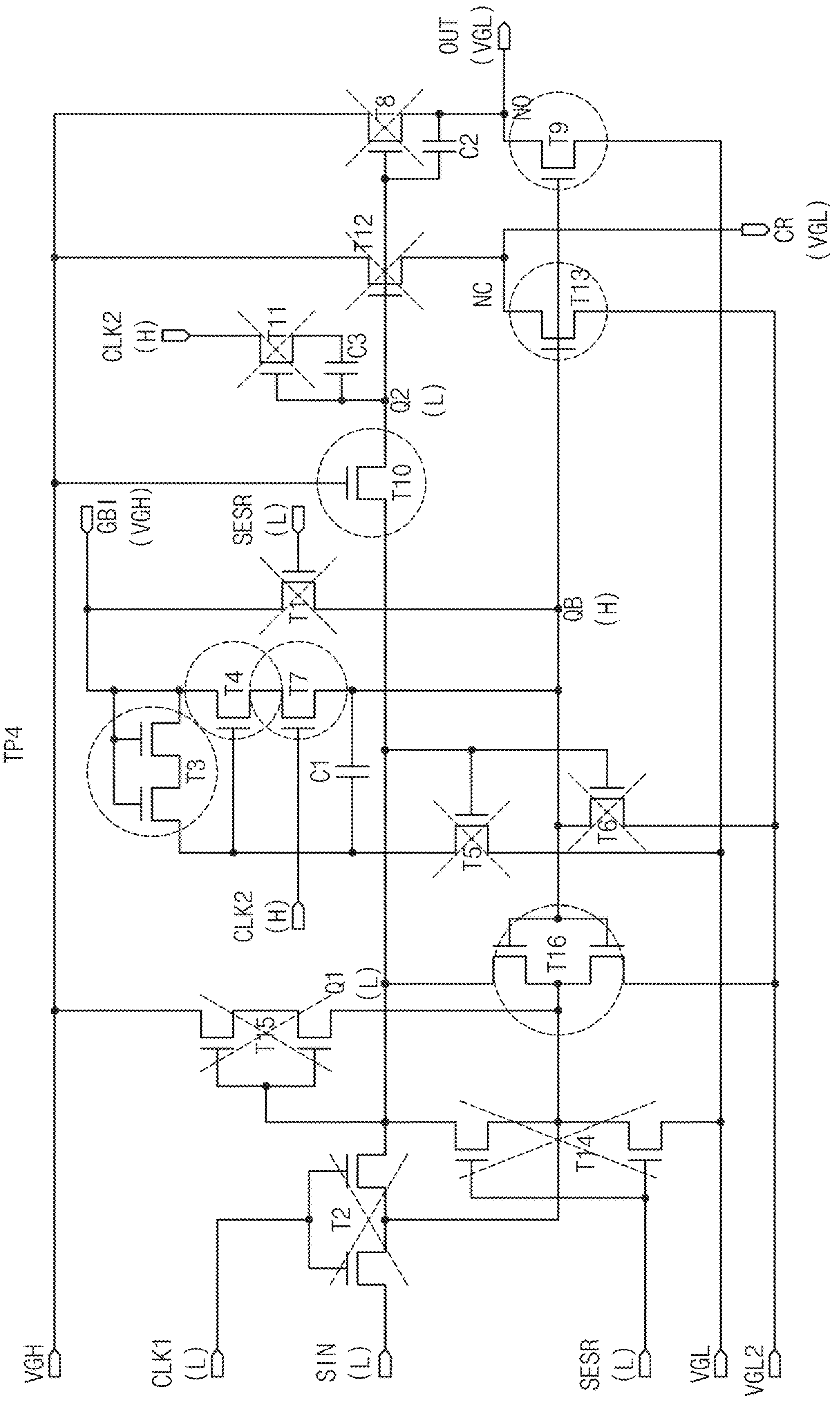
FIG. 8 is a circuit diagram for describing an example of an operation of a stage of FIG. 3 in a fourth time period.

FIG. 4 is a timing diagram for describing an example of an operation of a stage of FIG. 3, FIG. 5 is a circuit diagram for describing an example of an operation of a stage of FIG. 3 in a first time period, FIG. 6 is a circuit diagram for describing an example of an operation of a stage of FIG. 3 in a second time period, FIG. 7 is a circuit diagram for describing an example of an operation of a stage of FIG. 3 in a third time period, and FIG. 8 is a circuit diagram for describing an example of an operation of a stage of FIG. 3 in a fourth time period.

Referring to FIGS. 3 and 4, the stage 200 may receive the input signal SIN in response to the first clock signal CLK1. When the second clock signal CLK2 changes to a high level after the input signal SIN has a high level, the stage 200 may output the carry signal CR having the high gate voltage VGH and the output signal OUT having the high gate voltage VGH. Further, when the second clock signal CLK2 changes to a high level after the input signal SIN has a low level, the stage 200 may output the carry signal CR having the second low gate voltage VGL2 and the output signal OUT having the low gate voltage VGL.

For example, in a first time period TP1 in which the input signal SIN has a high level H and the first clock signal CLK1 has a high level H, as illustrated in FIG. 5, the second transistor T2 may be turned on in response to the first clock signal CLK1 having a high level H, and may transfer the first clock signal CLK1 having a high level H to the first Q node Q1. Thus, the voltage of the first Q node Q1 may have a high level H. The fifteenth transistor T15 may be turned on in response to the voltage of the first Q node Q1 having a high level H, and may transfer the high gate voltage VGH to a node between two sub-transistors of each of the second, fourteenth and sixteenth transistors T2, T14 and T16. The tenth transistor T10 may be turned on in response to the high gate voltage VGH, and may transfer the voltage of the first Q node Q1 to the second Q node Q2. Thus, the voltage of the second Q node Q2 may have a high level H. The eleventh transistor T11 may be turned on in response to the voltage of the second Q node Q2 having a high level H, and may transfer the second clock signal CLK2 having a low level L to the second electrode of the third capacitor C3. The voltage of the second Q node Q2 having a high level H may be applied to the gates of the eighth and twelfth transistors T8 and T12, and voltage levels of the output signal OUT and the carry signal CR may be increased. However, since the voltage of the second Q node Q2 is not higher than the high gate voltage VGH applied to the first terminals (e.g., sources) of the eighth and twelfth transistors T8 and T12, the eighth and twelfth transistors T8 and T12 may not be fully (or completely) turned on, and the high gate voltage VGH may not be output as the output signal OUT and the carry signal CR.

Further, in the first time period TP1, the sixth transistor T6 may be turned on in response to the voltage of the first Q node Q1 having a high level H, and may transfer the second low gate voltage VGL2 to the QB node QB. Thus, the voltage of the QB node QB may have a low level L. The ninth, thirteenth and sixteenth transistors T9, T13 and T16 may be turned off in response to the voltage of the QB node QB having a low level L. The third transistor T3 may transfer the QB control signal GBI having the high gate voltage VGH to the gate of the fourth transistor T4, but the fifth transistor T5 may transfer the low gate voltage VGL to the gate of the fourth transistor T4 in response to the voltage of the first Q node Q1 having a high level H. Thus, a voltage between the high gate voltage VGH and the low gate voltage VGL may be applied to the gate of the fourth transistor T4, and the fourth transistor T4 may be turned off. Further, the seventh transistor T7 may be turned off in response to the second clock signal CLK2 having a low level L, and the QB control signal GBI may not be transferred to the QB node QB.

In a second time period TP2 in which the input signal SIN has a high level H, and the second clock signal CLK2 has a high level H, as illustrated in FIG. 6, the eleventh transistor T11 may transfer the second clock signal CLK2 to the second electrode of the third capacitor C3. When the second clock signal CLK2 applied to the second electrode of the third capacitor C3 increases from a low level L to a high level H, the voltage of the second Q node Q2 connected to the first electrode of the third capacitor C3 also may be increased from a high level H to a boosted high level BH. Since the high gate voltage VGH applied to the gate of the tenth transistor T10 is lower than the voltage of the second Q node Q2 having a boosted high level BH, the tenth transistor T10 may be turned off, and the voltage of the second Q node Q2 having a boosted high level BH may be prevented from being transferred to the first Q node Q1. The eighth transistor T8 may be fully turned on in response to the voltage of the second Q node Q2 having a boosted high level BH, and may output the high gate voltage VGH as the output signal OUT. Further, the twelfth transistor T12 may be fully turned on in response to the voltage of the second Q node Q2 having a boosted high level BH, and may output the high gate voltage VGH as the carry signal CR.

Further, in the second time period TP2, the sixth transistor T6 may transfer the second low gate voltage VGL2 to the QB node QB, and the ninth, thirteenth and sixteenth transistors T9, T13 and T16 may be turned off. Although the seventh transistor T7 is turned on in response to the second clock signal CLK2 having a high level H, since the fourth transistor T4 is turned off, the QB control signal GBI may not be transferred to the QB node QB.

In a third time period TP3 in which the input signal SIN has a low level L and the first clock signal CLK1 has a high level H, as illustrated in FIG. 7, the second transistor T2 may transfer the first clock signal CLK1 having a low level L to the first Q node Q1, and the tenth transistor T10 may transfer the voltage of the first Q node Q1 to the second Q node Q2. Thus, the voltages of the first and second Q nodes Q1 and Q2 may have a low level L. The fifth, sixth and fifteenth transistors T5, T6 and T15 may be turned off in response to the voltage of the first Q node Q1 having a low level L, and the eighth, eleventh and twelfth transistors T8, T11 and T12 may be turned off in response to the voltage of the second Q node Q2 having a low level L.

Further, in the third time period TP3, although the fourth transistor T4 is turned on in response to the QB control signal GBI transferred through the third transistor T3, since the seventh transistor T7 is turned off in response to the second clock signal CLK2 having a low level L, the QB control signal GBI may not be transferred to the QB node QB. Thus, the voltage of the QB node QB may be maintained at a low level L. Accordingly, the ninth, thirteenth and sixteenth transistors T9, T13 and T16 may be turned off in response to the voltage of the QB node QB having a low level L. In the third time period TP3, the eighth and ninth transistors T8 and T9 may be turned off, and the output signal OUT may be maintained at a previous voltage, or the high gate voltage VGH. Further, in the third time period TP3, the twelfth and thirteenth transistors T12 and T13 may be turned off, and the carry signal CR may be maintained at a previous voltage, or the high gate voltage VGH.

In a fourth time period TP4 in which the input signal SIN has a low level L and the second clock signal CLK2 has a high level H, as illustrated in FIG. 8, the first clock signal CLK1, the voltage of the first Q node Q1 and the voltage of the second Q node Q2 may have a low level L, and the second, fifth, sixth, eighth, eleventh, twelfth and fifteenth transistors T2, T5, T6, T8, T11, T12 and T15 may be turned off.

Further, in the fourth time period TP4, the fourth transistor T4 may be turned on in response to the QB control signal GBI transferred through the third transistor T3, and the seventh transistor T7 may be turned on in response to the second clock signal CLK2 having a high level H. Thus, the QB control signal GBI having the high gate voltage VGH may be transferred to the QB node QB through the fourth and seventh transistors T4 and T7. Accordingly, the voltage of the QB node QB may have a high level H. The sixteenth transistor T16 may provide the second low gate voltage VGL2 to the first Q node Q1 in response to the voltage of the QB node QB having a high level H. The ninth transistor T9 may be turned on in response to the voltage of the QB node QB having a high level H, and may output the low gate voltage VGL as the output signal OUT. Further, the thirteenth transistor T13 may be turned on in response to the voltage of the QB node QB having a high level H, and may output the second low gate voltage VGL2 as the carry signal CR.

Further, as illustrated in FIGS. 5 through 8, in the first through fourth time periods TP1 through TP4, the reset signal SESR may have a low level L, for example, the second low gate voltage VGL2. The first and fourteenth transistors T1 and T14 may be turned off in response to the reset signal SESR having the second low gate voltage VGL2. Although it is not illustrated in FIGS. 3 through 8, the reset signal SESR may have a high level H, or the high gate voltage VGH in the initial power-on period. Thus, in the initial power-on period, the fourteenth transistor T14 may reset the first Q node Q1 and/or the second Q node Q2 to the low gate voltage VGL, and the first transistor T1 may reset the QB node QB to the high gate voltage VGH of the QB control signal GBI. Further, in the initial power-on period, the high gate voltage VGH of the QB control signal GBI may be transmitted to the QB node QB not only through the first transistor T1, but also through the fourth and seventh transistors T4 and T7.

In a period other than the initial power-on period, in which the display device performs a normal operation, the first transistor T1 may be maintained in a turned-off state. Thus, the threshold voltage of the first transistor T1 may not be shifted while the display device performs the normal operation. Accordingly, the first transistor T1 of which the threshold voltage is not shifted can be used to discharge the QB node QB in the power-off period.

Hereinafter, an example of an operation of the stage 200 of FIG. 3 when a power-off sequence of the display device is performed will be described with reference to FIGS. 3, 9 and 10.

Figure 9:
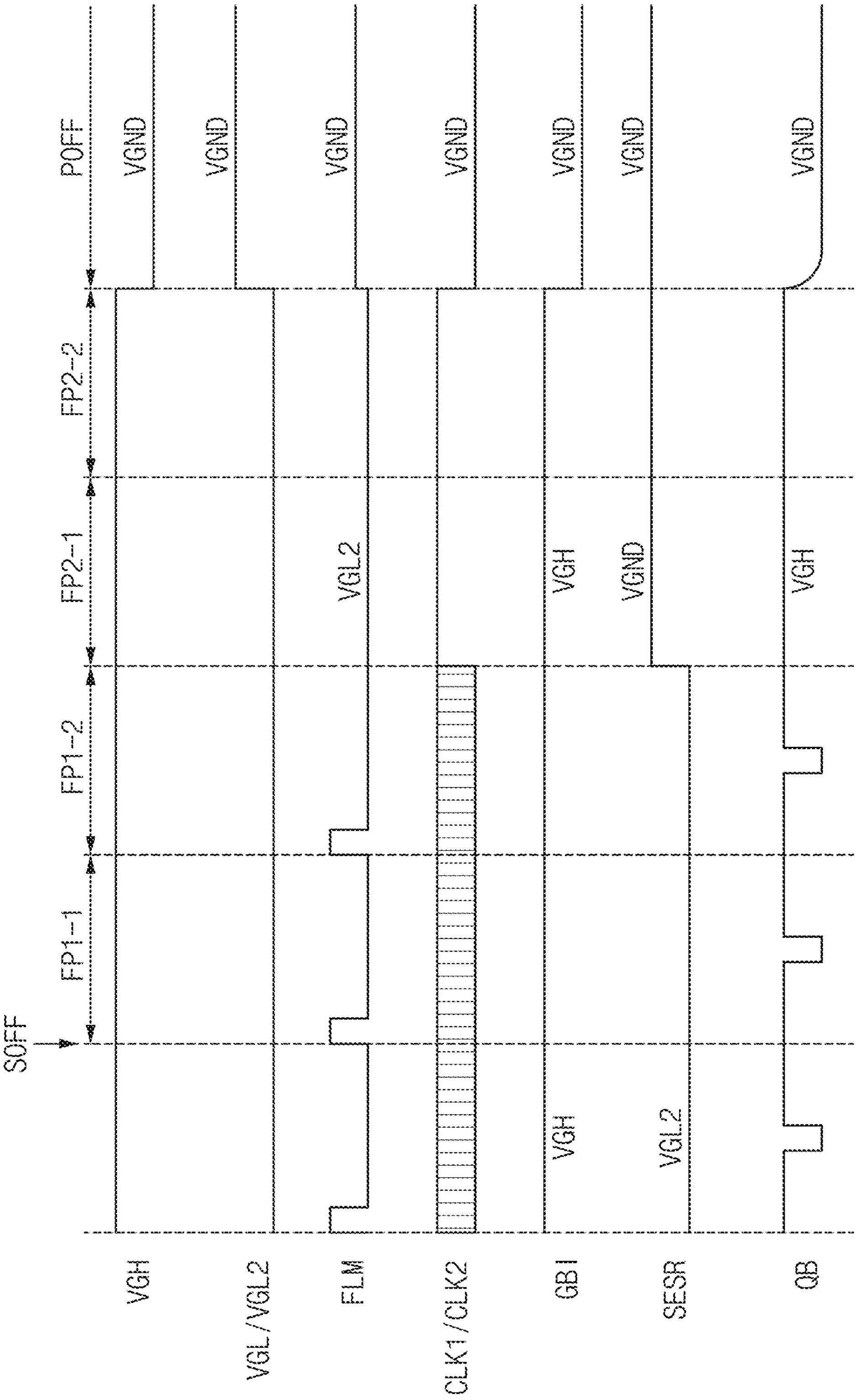
FIG. 9 is a timing diagram for describing an example of an operation of a stage of FIG. 3 when a power-off sequence is performed.
Figure 10:
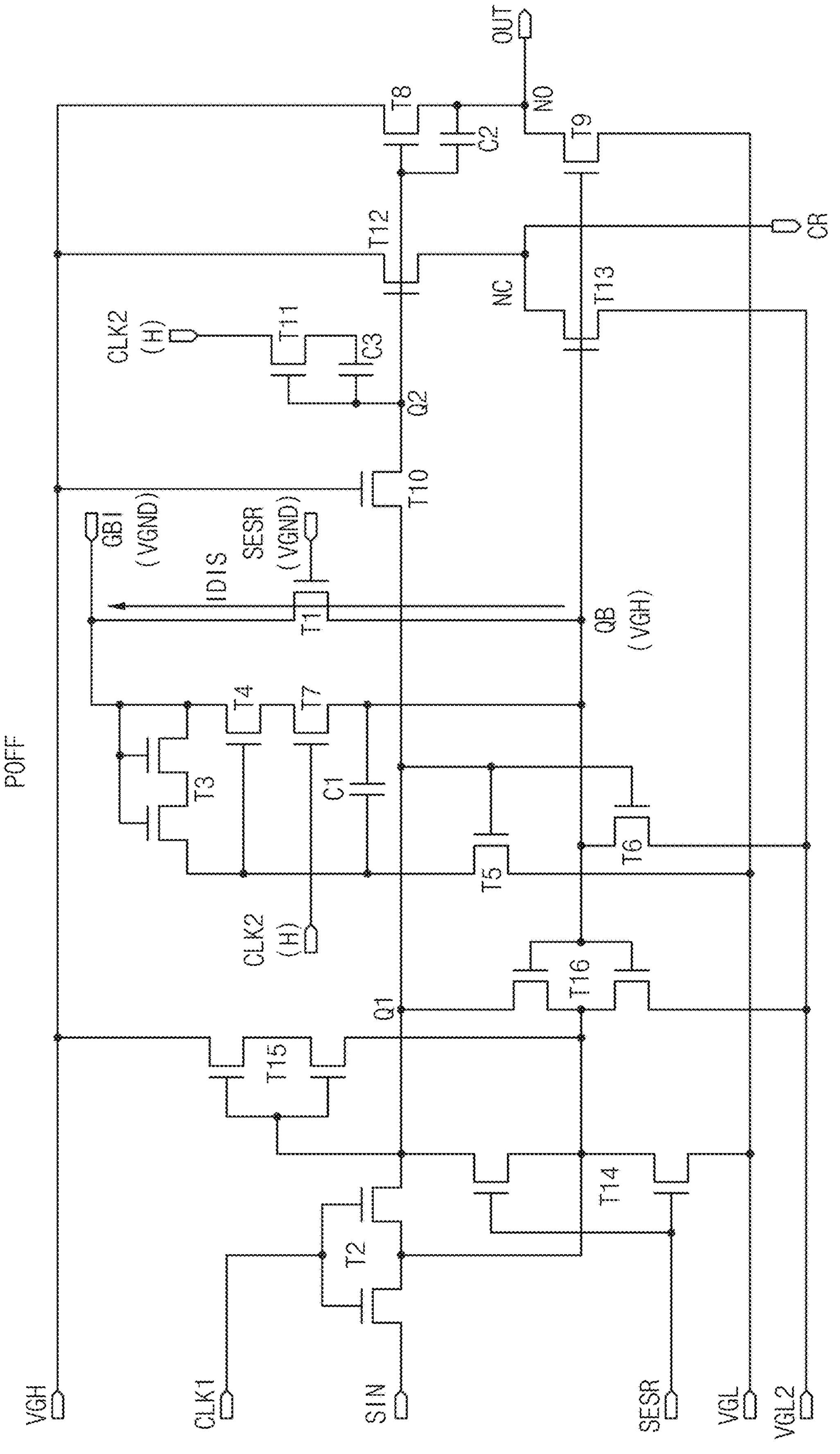
FIG. 10 is a circuit diagram for describing an example in which a QB node of a stage of FIG. 3 is discharged in a power-off period.

FIG. 9 is a timing diagram for describing an example of an operation of a stage of FIG. 3 when a power-off sequence is performed, and FIG. 10 is a circuit diagram for describing an example in which a QB node of a stage of FIG. 3 is discharged in a power-off period.

Referring to FIGS. 3 and 9, in at least one first frame period FP1-1 and FP1-2 after the display device receives a power-off signal SOFF, the high gate voltage VGH, the low gate voltage VGL, the second low gate voltage VGL2, the start signal FLM, the first clock signal CLK1, the second clock signal CLK2, the QB control signal GBI and the reset signal ESR may be provided to each stage 200 in the same way as in a frame period in which the normal operation is performed. Thus, the driver according to embodiments may perform the normal operation in the first frame period FP1-1 and FP1-2. However, in the first frame period FP1-1 and FP1-2, as will be described below with reference to FIG. 27, a black data voltage corresponding to the lowest gray level (e.g., a 0-gray level) may be provided as data signals are sent to a plurality of pixels. Thus, in the first frame period FP1-1 and FP1-2, the plurality of pixels may display a black image, or may not emit light.

In at least one second frame period FP2-1 and FP2-2 after the first frame period FP1-1 and FP1-2, the high gate voltage VGH, the low gate voltage VGL and the second low gate voltage VGL2 may be maintained in an active state. Further, the start signal FLM may be maintained at the second low gate voltage VGL2, and the first and second clock signals CLK1 and CLK2 and the QB control signal GBI may be maintained at the high gate voltage VGH. Thus, in the second frame period FP2-1 and FP2-2, based on the start signal FLM having the second low gate voltage VGL2 and the first and second clock signals CLK1 and CLK2 having the high gate voltage VGH, the Q nodes Q1 and Q2 of all stages 200 of the driver may be reset to the second low gate voltage VGL2, and the QB nodes QB of all stages 200 of the driver may be reset to the high gate voltage VGH. Further, in some embodiments, in the second frame period FP2-1 and FP2-2, the reset signal SESR may be deactivated to the ground voltage VGND.

In a power-off period POFF after the second frame period FP2-1 and FP2-2, the high gate voltage VGH, the low gate voltage VGL, the second low gate voltage VGL2, the start signal FLM, the first and second clock signals CLK1 and CLK2 and the QB control signal GBI may be deactivated to the ground voltage VGND. Further, by currents through transistors (e.g., the sixteenth transistor T16) of each stage 200, the Q nodes Q1 and Q2 of all stages 200 of the driver may have the ground voltage VGND.

However, in a case where the stage 200 does not include the QB node discharging circuit 240, or the first transistor T1, in the power-off period POFF, the QB node QB may not be discharged to the ground voltage VGH, and may be maintained at the high gate voltage VGH for at least a certain time. In particular, when the threshold voltages of the fourth, sixth and/or seventh transistors T4, T6 and T7 connected to the QB node QB are shifted (e.g., positively shifted), the QB node QB may not be discharged to the ground voltage VGND. However, in the stage 200 of the driver according to embodiments, the first transistor T1 may not be turned on during the normal operation of the driver, and thus the threshold voltage of the first transistor T1 may not be shifted. Thus, as illustrated in FIG. 10, the first transistor T1 receiving the reset signal SESR having the ground voltage VGND may form the path for the discharge current IDIS (or a leakage current) from the QB node QB having the high gate voltage VGH to the line which transfers the QB control signal GBI having the ground voltage VGND. Accordingly, in the stage 200 of the driver according to embodiments, the QB node QB may be discharged to the ground voltage VGND by the first transistor T1.

Figure 11:
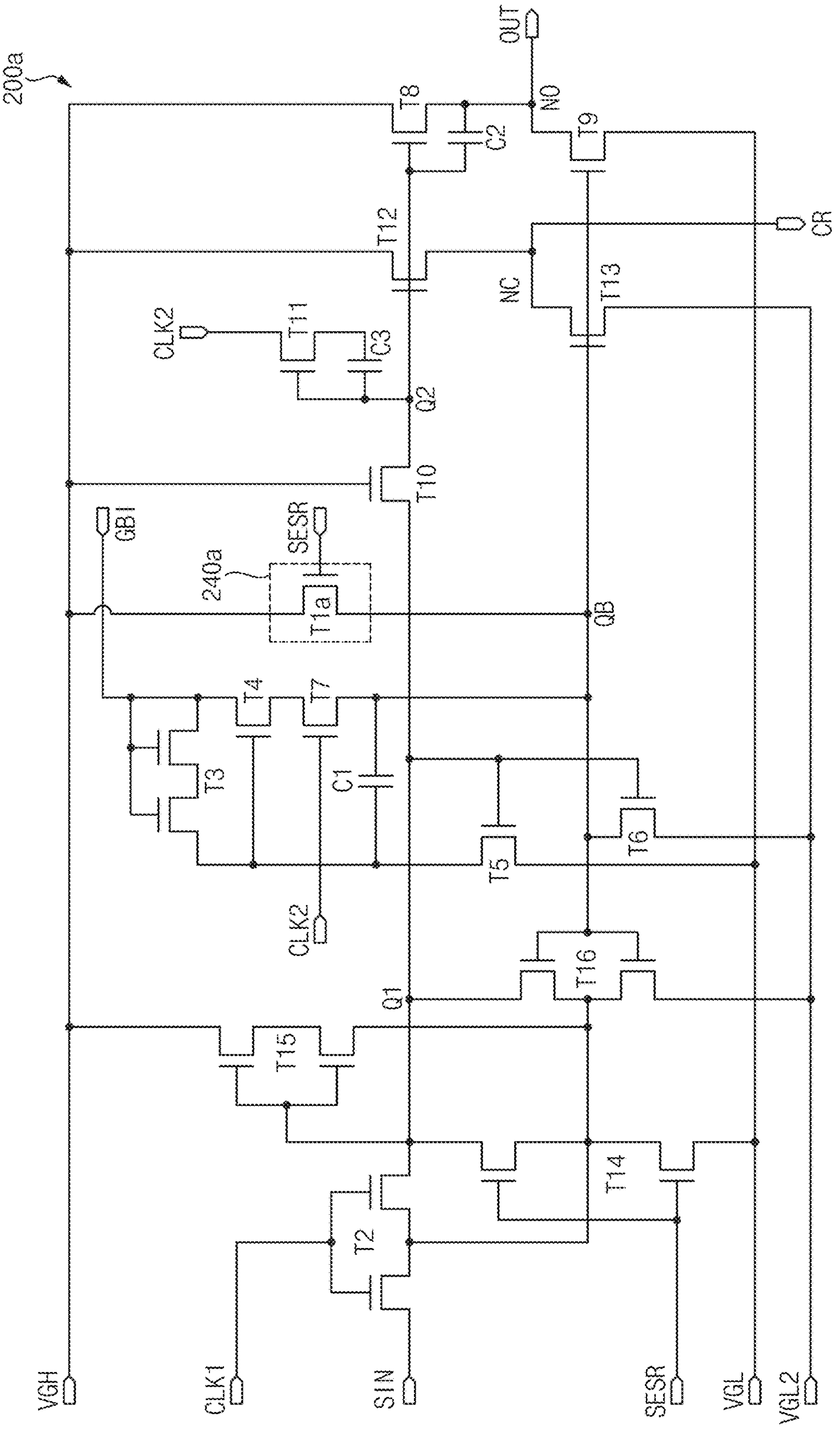
FIG. 11 is a circuit diagram illustrating a stage of a driver according to embodiments.

FIG. 11 is a circuit diagram illustrating a stage of a driver according to embodiments.

Referring to FIG. 11, at least one stage 200*a* of a driver according to embodiments may include a first transistor T1*a*, a second transistor T2, a third transistor T3, and a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a first capacitor C1, a second capacitor C2 and a third capacitor C3. The stage 200*a* of FIG. 11 may have a similar configuration and a similar operation to a stage 200 of FIG. 3, except that a QB node discharging circuit 240*a* may be connected to a line which transfers a high gate voltage VGH instead of a line which transfers a QB control signal GBI.

The QB node discharging circuit 240*a* may form a path for a discharge current from a QB node QB to the line which transfers the high gate voltage VGH in response to a reset signal SESR having a ground voltage in a power-off period. In some embodiments, the QB node discharging circuit 240*a* may include the first transistor T1*a* including a gate which receives the reset signal SESR, a first terminal connected to the line which transfers the high gate voltage VGH, and a second terminal connected to the QB node QB. Accordingly, the QB node QB of the stage 200*a* may be normally discharged during the power-off period.

Figure 12:
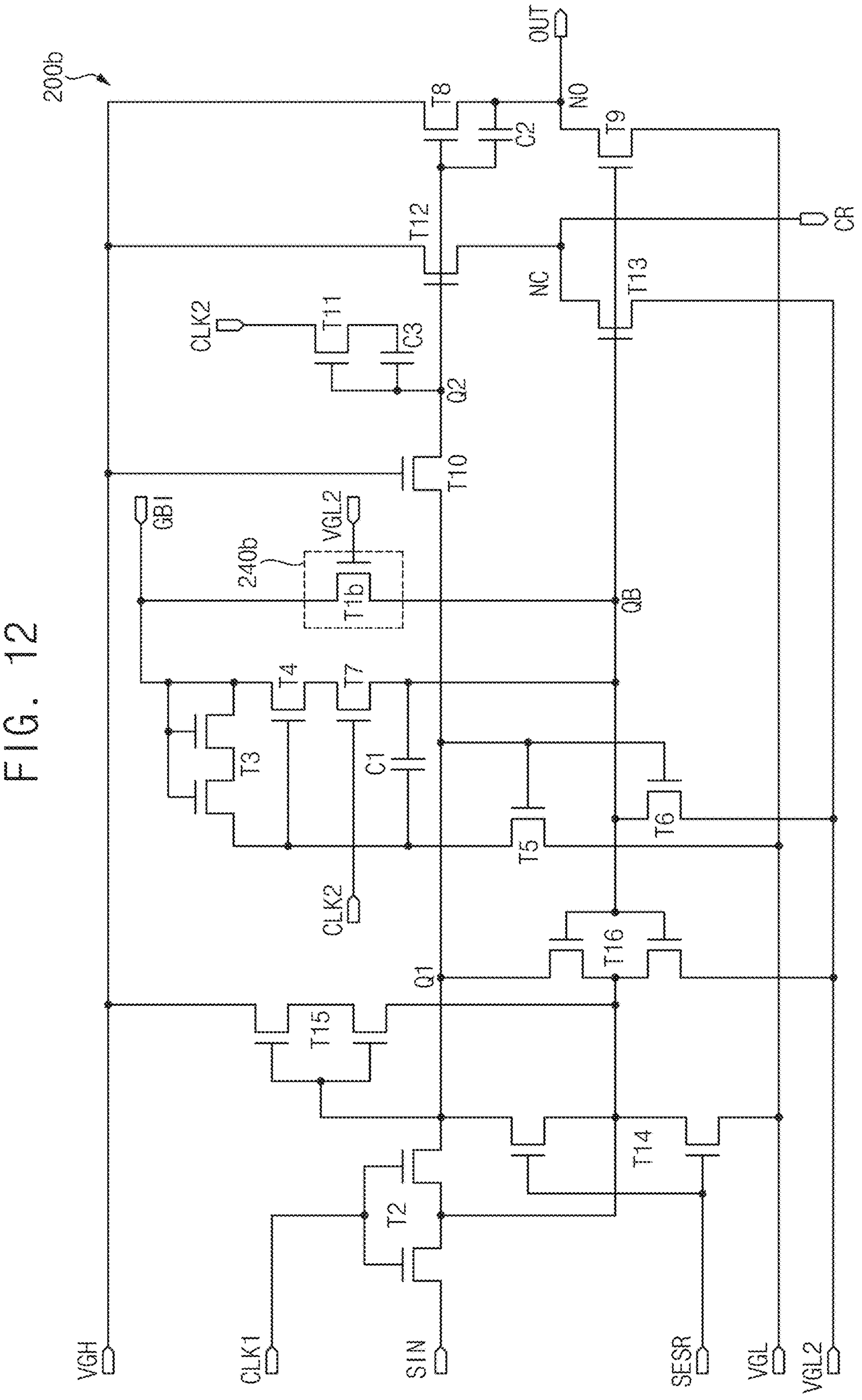
FIG. 12 is a circuit diagram illustrating a stage of a driver according to embodiments.

FIG. 12 is a circuit diagram illustrating a stage of a driver according to embodiments.

Referring to FIG. 12, at least one stage 200*b* of a driver according to embodiments may include a first transistor T1*b*, a second transistor T2, a third transistor T3, and a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a first capacitor C1, a second capacitor C2 and a third capacitor C3. The stage 200*b* of FIG. 12 may have a similar configuration and a similar operation to a stage 200 of FIG. 3, except that a QB node discharging circuit 240*b* may receive a second low gate voltage VGL2 instead of a reset signal SESR.

The QB node discharging circuit 240*b* may form a path for a discharge current from a QB node QB to a line which transfers a QB control signal GBI in response to the second low gate voltage VGL2 that is deactivated to a ground voltage in a power-off period. In some embodiments, the QB node discharging circuit 240*b* may include the first transistor T1*b* including a gate connected to a line which transfers the second low gate voltage VGL2, a first terminal connected to the line which transfers the QB control signal GBI, and a second terminal connected to the QB node QB. During a normal operation of the driver, the first transistor T1*b* may be turned off in response to the second low gate voltage VGL2, and thus a threshold voltage of the first transistor T1*b* may not be shifted. Accordingly, the QB node QB of the stage 200*b* may be normally discharged during the power-off period.

Figure 13:
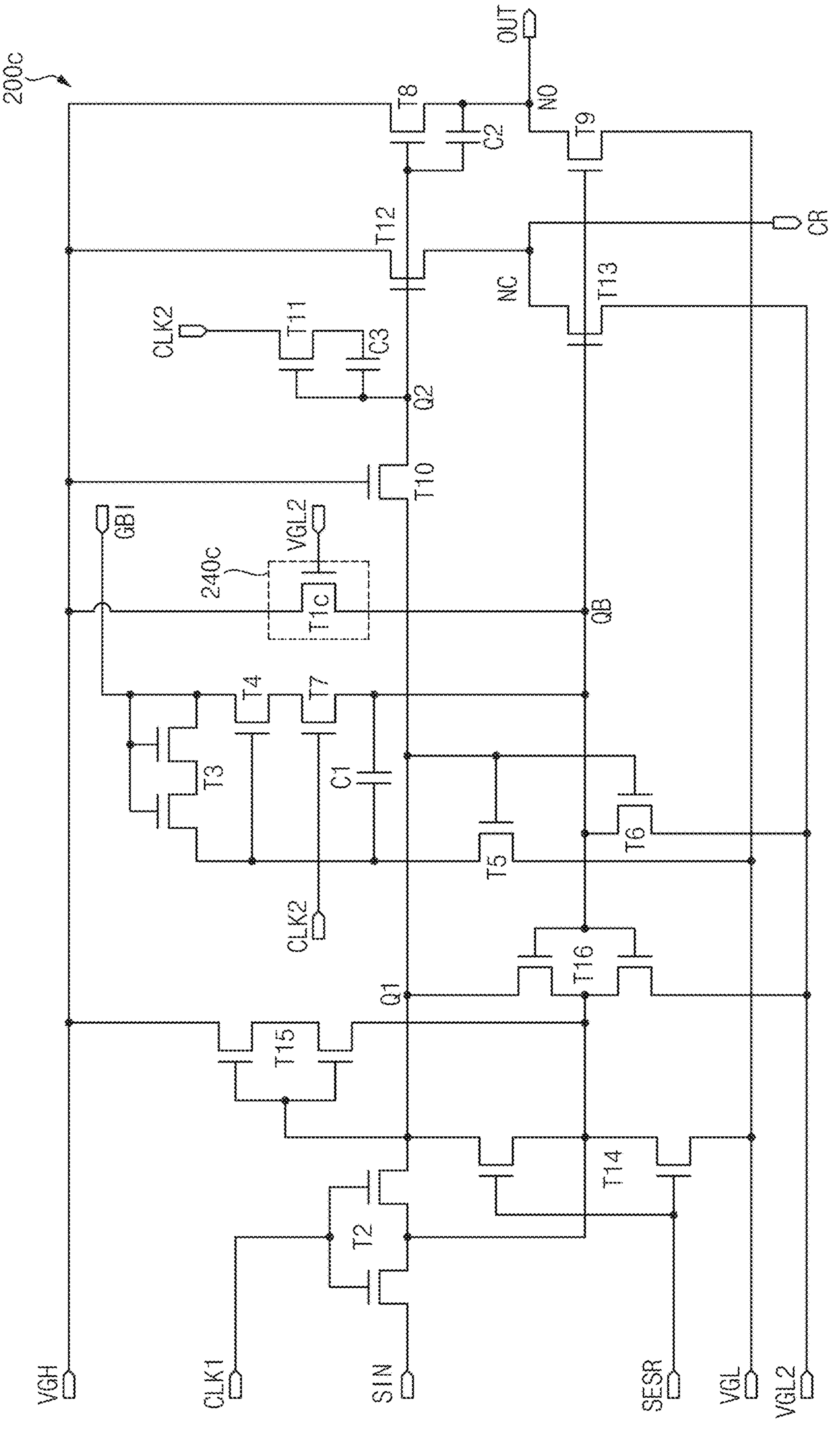
FIG. 13 is a circuit diagram illustrating a stage of a driver according to embodiments.

FIG. 13 is a circuit diagram illustrating a stage of a driver according to embodiments.

Referring to FIG. 13, at least one stage 200*c* of a driver according to embodiments may include a first transistor T1*c*, a second transistor T2, a third transistor T3, and a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a first capacitor C1, a second capacitor C2 and a third capacitor C3. The stage 200*c* of FIG. 13 may have a similar configuration and a similar operation to a stage 200 of FIG. 3, except that a QB node discharging circuit 240*c* may be connected to a line which transfers a high gate voltage VGH instead of a line which transfers a QB control signal GBI, and may receive a second low gate voltage VGL2 instead of a reset signal SESR.

The QB node discharging circuit 240*c* may form a path for a discharge current from a QB node QB to the line which transfers the high gate voltage VGH in response to the reset signal SESR having a ground voltage in a power-off period. In some embodiments, the QB node discharging circuit 240*c* may include the first transistor T1*c* including a gate connected to a line which transfers the second low gate voltage VGL2, a first terminal connected to the line which transfers the high gate voltage VGH, and a second terminal connected to the QB node QB. Accordingly, the QB node QB of the stage 200*c* may be normally discharged during the power-off period.

Figure 14:
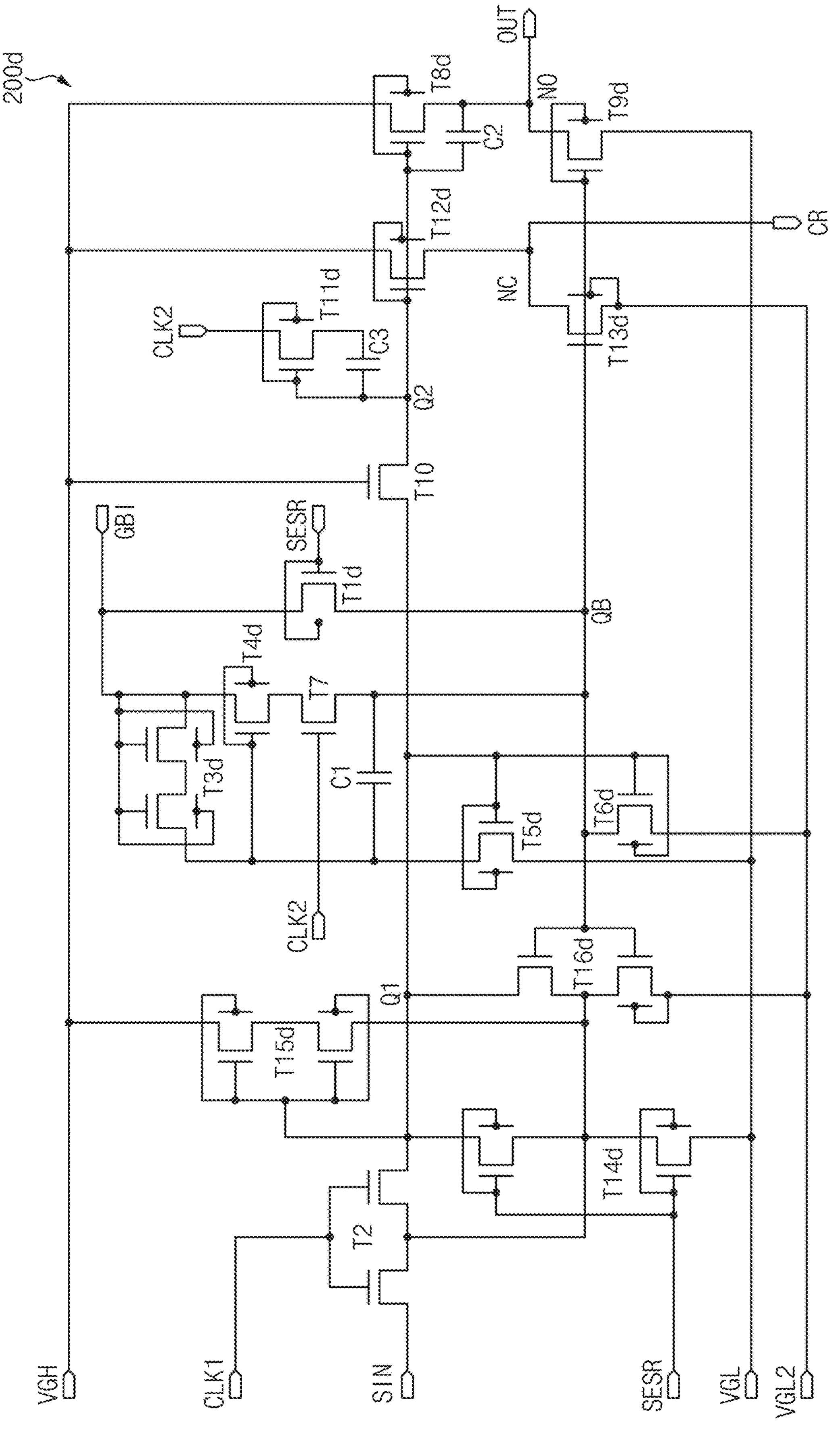
FIG. 14 is a circuit diagram illustrating a stage of a driver according to embodiments.

FIG. 14 is a circuit diagram illustrating a stage of a driver according to embodiments.

Referring to FIG. 14, at least one stage 200*d* of a driver according to embodiments may include a first transistor T1*d*, a second transistor T2, a third transistor T3*d*, a fourth transistor T4*d*, a fifth transistor T5*d*, a sixth transistor T6*d*, a seventh transistor T7, an eighth transistor T8*d*, a ninth transistor T9*d*, a tenth transistor T10, an eleventh transistor T11*d*, a twelfth transistor T12*d*, a thirteenth transistor T13*d*, a fourteenth transistor T14*d*, a fifteenth transistor T15*d*, a sixteenth transistor T16*d*, a first capacitor C1, a second capacitor C2 and a third capacitor C3. The stage 200*d* of FIG. 14 may have a similar configuration and a similar operation to a stage 200 of FIG. 3, except that some transistors T1*d*, T3*d*, T4*d*, T5*d*, T6*d*, T8*d*, T9*d*, T11*d*, T12*d*, T13*d*, T14*d*, T15*d* and T16*d* of the stage 200*d* may have a double gate structure including a top gate and a bottom gate.

In some embodiments, the first, third, fourth, fifth, sixth, eighth, ninth, eleventh, twelfth, thirteenth, fourteenth, fifteenth and sixteenth transistors T1*d*, T3*d*, T4*d*, T5*d*, T6*d*, T8*d*, T9*d*, T11*d*, T12*d*, T13*d*, T14*d*, T15*d* and T16*d* may have the double gate structure. Further, in each of the first, third, fourth, fifth, sixth, eighth, ninth, eleventh, twelfth, fourteenth and fifteenth transistors T1*d*, T3*d*, T4*d*, T5*d*, T6*d*, T8*d*, T9*d*, T11*d*, T12*d*, T14*d* and T15*d*, the bottom gate may be connected to the top gate. In some embodiments, these transistors T1*d*, T3*d*, T4*d*, T5*d*, T6*d*, T8*d*, T9*d*, T11*d*, T12*d*, T14*d* and T15*d* may be referred to as gate-sync transistors. Further, the bottom gate of each of the thirteenth and sixteenth transistors T13*d* and T16*d* may be connected to its one terminal.

Further, in some embodiments, each of the second, third, fourteenth, fifteenth and sixteenth transistors T2, T3*d*, T14*d*, T15*d* and T16*d* may be implemented as a dual transistor including two sub-transistors connected in series. Each sub-transistor of the third, fourteenth and fifteenth transistors T3*d*, T14*d* and T15*d* may include a top gate, and a bottom gate connected to the top gate. Further, one of the two sub-transistors of the sixteenth transistor T16*d* may include a top gate, and a bottom gate connected to its one terminal.

Figure 15:
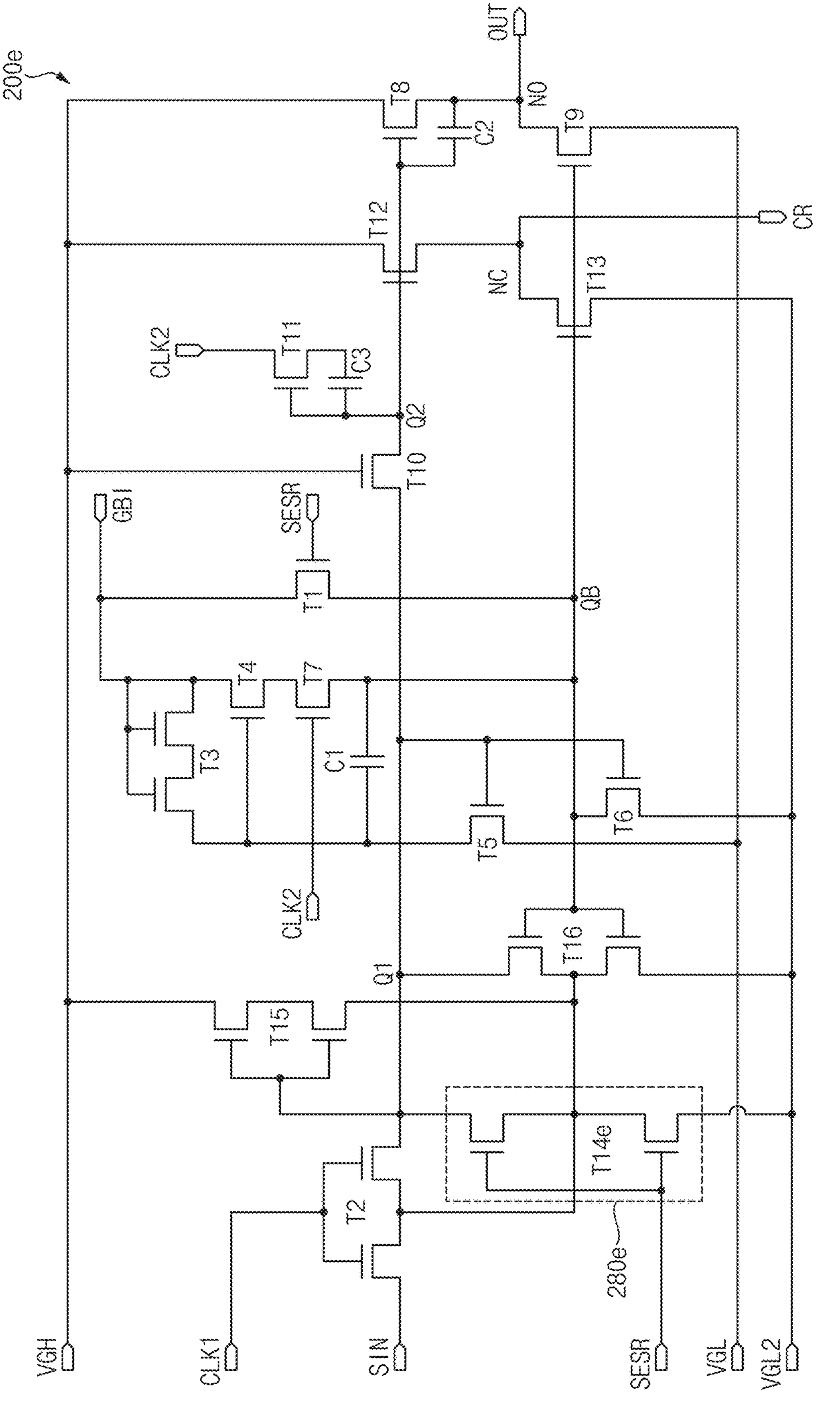
FIG. 15 is a circuit diagram illustrating a stage of a driver according to embodiments.

FIG. 15 is a circuit diagram illustrating a stage of a driver according to embodiments.

Referring to FIG. 15, at least one stage 200*e* of a driver according to embodiments may include a first transistor T1, a second transistor T2, a third transistor T3, and a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14*e*, a fifteenth transistor T15, a sixteenth transistor T16, a first capacitor C1, a second capacitor C2 and a third capacitor C3. The stage 200*e* of FIG. 15 may have a similar configuration and a similar operation to a stage 200 of FIG. 3, except that a reset circuit 280*e* may be connected to a line which transfers a second low gate voltage VGL2 instead of a line which transfers a low gate voltage VGL.

The reset circuit 280*e* may provide the second low gate voltage VGL2 to a first Q node Q1 in response to a reset signal SESR during an initial power-on period. In the initial power-on period, an input signal SIN may have the second low gate voltage VGL2, the first Q node Q1 may be reset to the second low gate voltage VGL2, and thus a short defect between a line which transfers the input signal SIN and the first Q node Q1 may be prevented. In some embodiments, the reset circuit 280*e* may include the fourteenth transistor T14*e* including a gate which receives the reset signal SESR, a first terminal connected to the first Q node Q1, and a second terminal connected to the line which transfers the second low gate voltage VGL2.

Figure 16:
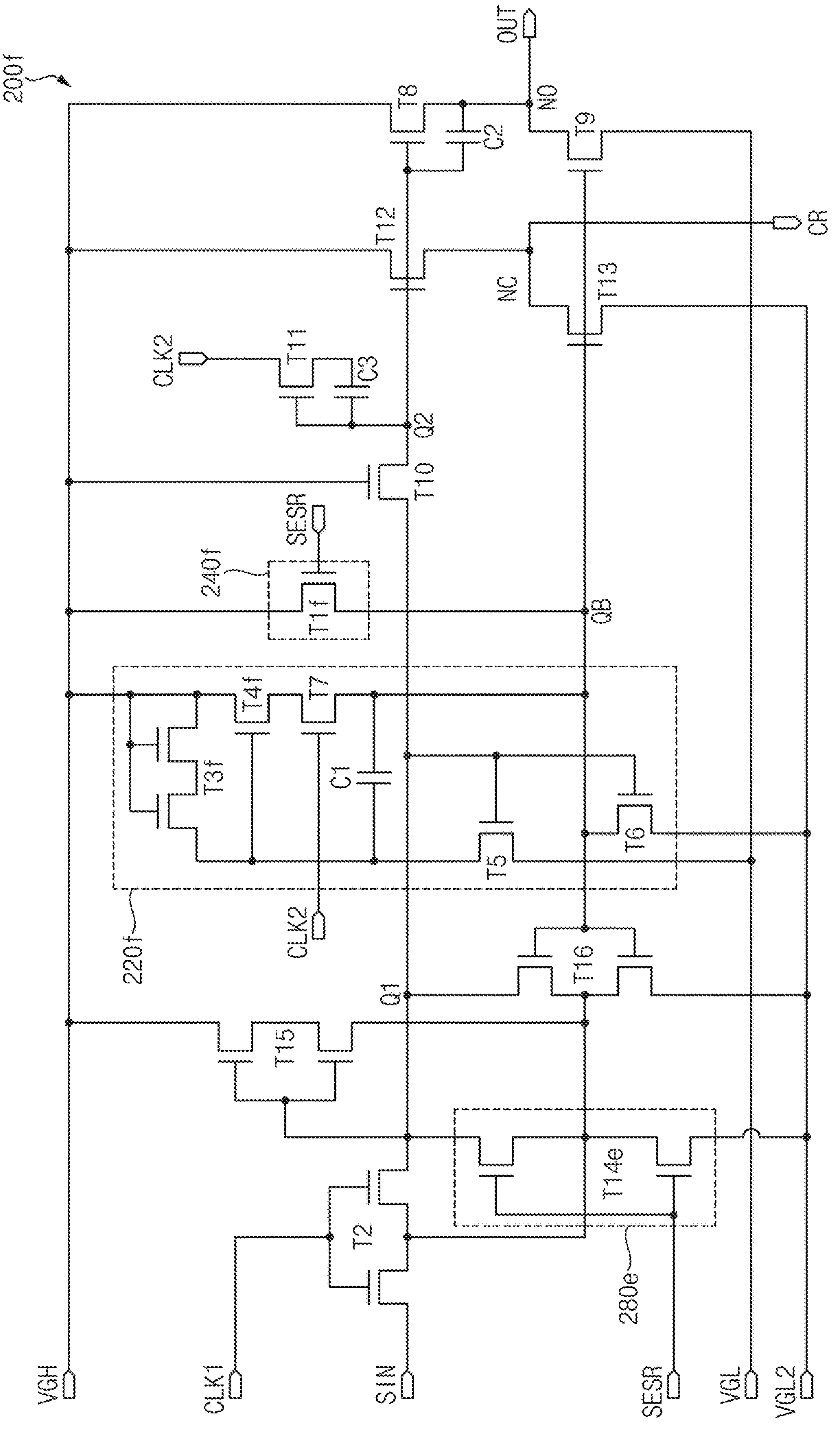
FIG. 16 is a circuit diagram illustrating a stage of a driver according to embodiments.

FIG. 16 is a circuit diagram illustrating a stage of a driver according to embodiments.

Referring to FIG. 16, at least one stage 200*f* of a driver according to embodiments may include a first transistor T1*f*, a second transistor T2, a third transistor T3*f*, and a fourth transistor T4*f*, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a first capacitor C1, a second capacitor C2 and a third capacitor C3. The stage 200*f* of FIG. 16 may have a similar configuration and a similar operation to a stage 200 of FIG. 3, except that a high gate voltage VGH may be used instead of a QB control signal GBI illustrated in FIG. 3.

In the stage 200*f*, a QB node controlling circuit 220*f* and a QB node discharging circuit 240*f* may be connected to a line which transfers the high gate voltage VGH instead of a line which transfers the QB control signal GBI illustrated in FIG. 3. That is, the third and fourth transistors T3*f* and T4*f* of the QB node controlling circuit 220*f* and the first transistor T1*f* of the QB node discharging circuit 240*f* may not be connected to the line which transfers the QB control signal GBI illustrated in FIG. 3, but may be connected to the line which transfers the high gate voltage VGH.

Figure 17:
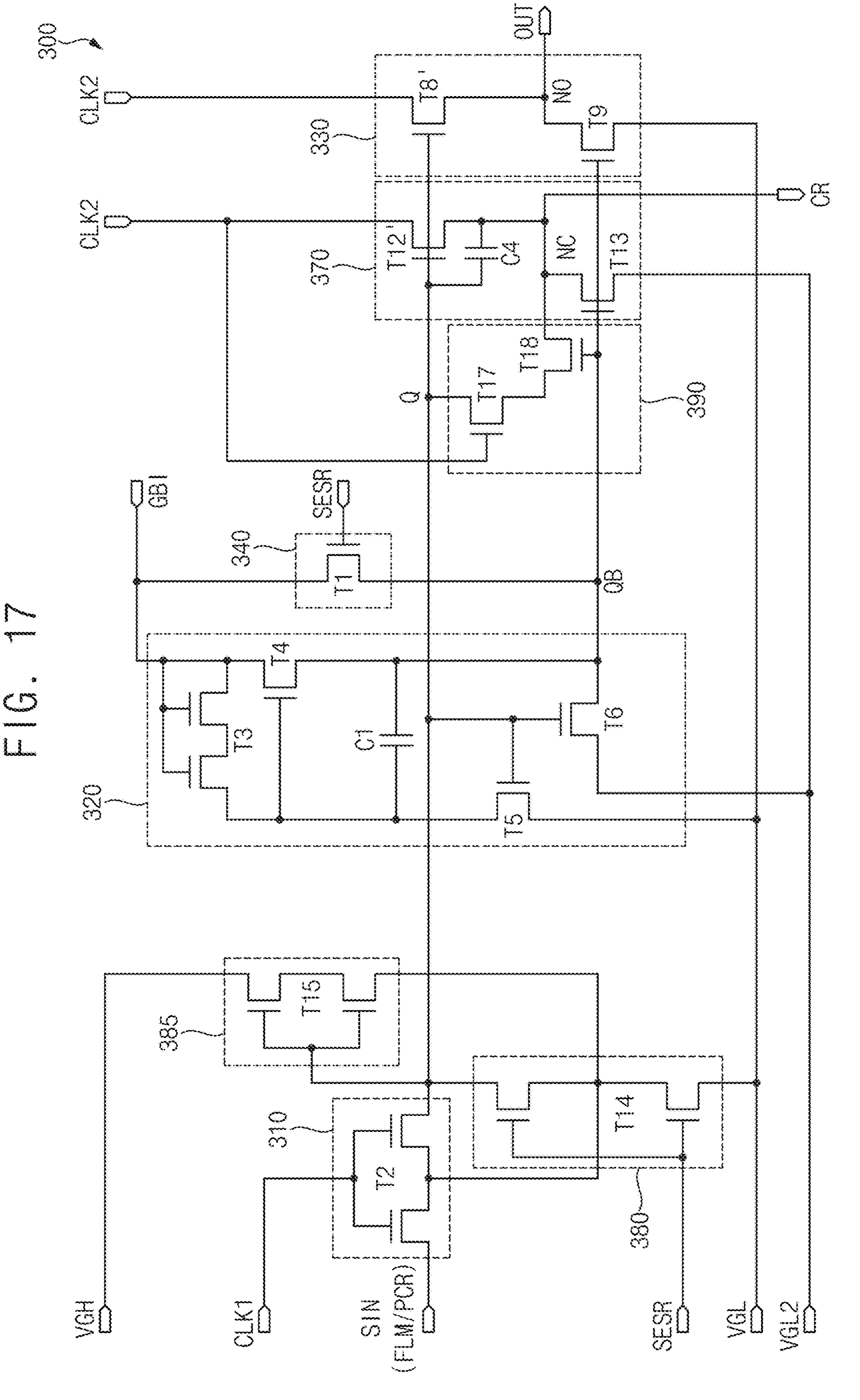
FIG. 17 is a circuit diagram illustrating a stage of a driver according to embodiments.

FIG. 17 is a circuit diagram illustrating a stage of a driver according to embodiments.

Referring to FIG. 17, at least one stage 300 of a driver according to embodiments may include an input circuit 310, a QB node controlling circuit 320, an output circuit 330, a QB node discharging circuit 340, a carry circuit 370, a reset circuit 380, a leakage preventing circuit 385 and a stabilizing circuit 390. The stage 300 of FIG. 17 may have a similar configuration and a similar operation to a stage 200 of FIG. 3, except that the stage 300 may not include a node separating circuit 250 and a boosting circuit 260 illustrated in FIG. 3, the QB node controlling circuit 320 may not include a seventh transistor T7 illustrated in FIG. 3, the output circuit 330 and the carry circuit 370 may receive a second clock signal CLK2 instead of a high gate voltage VGH, the output circuit 330 may not include a second capacitor C2 illustrated in FIG. 3, the carry circuit 370 may further include a fourth capacitor C4, and the stabilizing circuit 390 may include seventeenth and eighteenth transistors T17 and T18.

The stage 300 may not include the node separating circuit 250 illustrated in FIG. 3, and a gate of an eighth transistor T8' of the output circuit 330 and gate of a twelfth transistor T12' of the carry circuit 370 may be connected to a Q node Q. Further, the stage 300 may not include the boosting circuit 260 illustrated in FIG. 3, and a voltage of the Q node Q may be boosted using the second clock signal CLK2 and the fourth capacitor C4 of the carry circuit 370. For example, when the voltage of the Q node Q has a high level, and the second clock signal CLK2 changes from a low level to a high level, by the fourth capacitor C4, the voltage of the Q node Q may be boosted from a high level to a boosted high level.

The QB node controlling circuit 320 may provide a second low gate voltage VGL2 to a QB node QB when the voltage of the Q node Q has a high level, and may provide a QB control signal GBI to the QB node QB when the voltage of the Q node Q has a low level. The QB node controlling circuit 320 may not include the seventh transistor T7 illustrated in FIG. 3. Thus, the QB node controlling circuit 320 may not receive the second clock signal CLK2.

The output circuit 330 may receive the second clock signal CLK2 instead of the high gate voltage VGH, and may not include the second capacitor C2 illustrated in FIG. 3. In some embodiments, the output circuit 330 may include the eighth transistor T8' including the gate connected to the Q node Q, a first terminal which receives the second clock signal CLK2, and a second terminal connected to an output node NO at which an output signal OUT is output, and a ninth transistor T9 including a gate connected to the QB node QB, a first terminal connected to the output node NO, and a second terminal connected to a line which transfers a low gate voltage VGL.

The carry circuit 370 may receive the second clock signal CLK2 instead of the high gate voltage VGH, and may include the fourth capacitor C4 for boosting the voltage of the Q node Q. In some embodiments, the carry circuit 370 may include the twelfth transistor T12' including the gate connected to the Q node Q, a first terminal which receives the second clock signal CLK2, and a second terminal connected to a carry node NC at which a carry signal CR is output, the fourth capacitor C4 including a first electrode connected to the Q node Q, and a second electrode connected to the carry node NC, and a thirteenth transistor T13 including a gate connected to the QB node QB, a first terminal connected to the carry node NC, and a second terminal connected to a line which transfers the second low gate voltage VGL2.

The stabilizing circuit 390 may include the seventeenth transistor T17 and the eighteenth transistor T18, and may provide the second low gate voltage VGL2 to the Q node Q through the thirteenth transistor T13, the eighteenth transistor T18 and the seventeenth transistor T17 when the voltage of the QB node QB has a high level. In some embodiments, the seventeenth transistor T17 may include a gate which receives the second clock signal CLK2, a first terminal connected to the Q node Q, and a second terminal, and the eighteenth transistor T18 may include a gate connected to the QB node QB, a first terminal connected to the second terminal of the seventeenth transistor T17, and a second terminal connected to the carry node NC.

Those skilled in the art will understand that any embodiment may be combined with any other embodiment. For example, in the stage 300, a first transistor T1 may be connected to a line which transfers the high gate voltage VGH instead of a line which transfers the QB control signal GBI as in a stage 200*a* illustrated in FIG. 11. the first transistor T1 may receive the second low gate voltage VGL2 instead of a reset signal SESR as in a stage 200*b* illustrated in FIG. 12, some transistors may have a double gate structure as in a stage 200*d* illustrated in FIG. 14, a fourteenth transistor T14 is connected to the line which transfers the second low gate voltage VGL2 instead of the line which transfers the low gate voltage VGL as in a stage 200*e* illustrated in FIG. 15, or the high gate voltage VGH may be used instead of the QB control signal GBI as in a stage 200*f* illustrated in FIG. 16.

Figure 18:
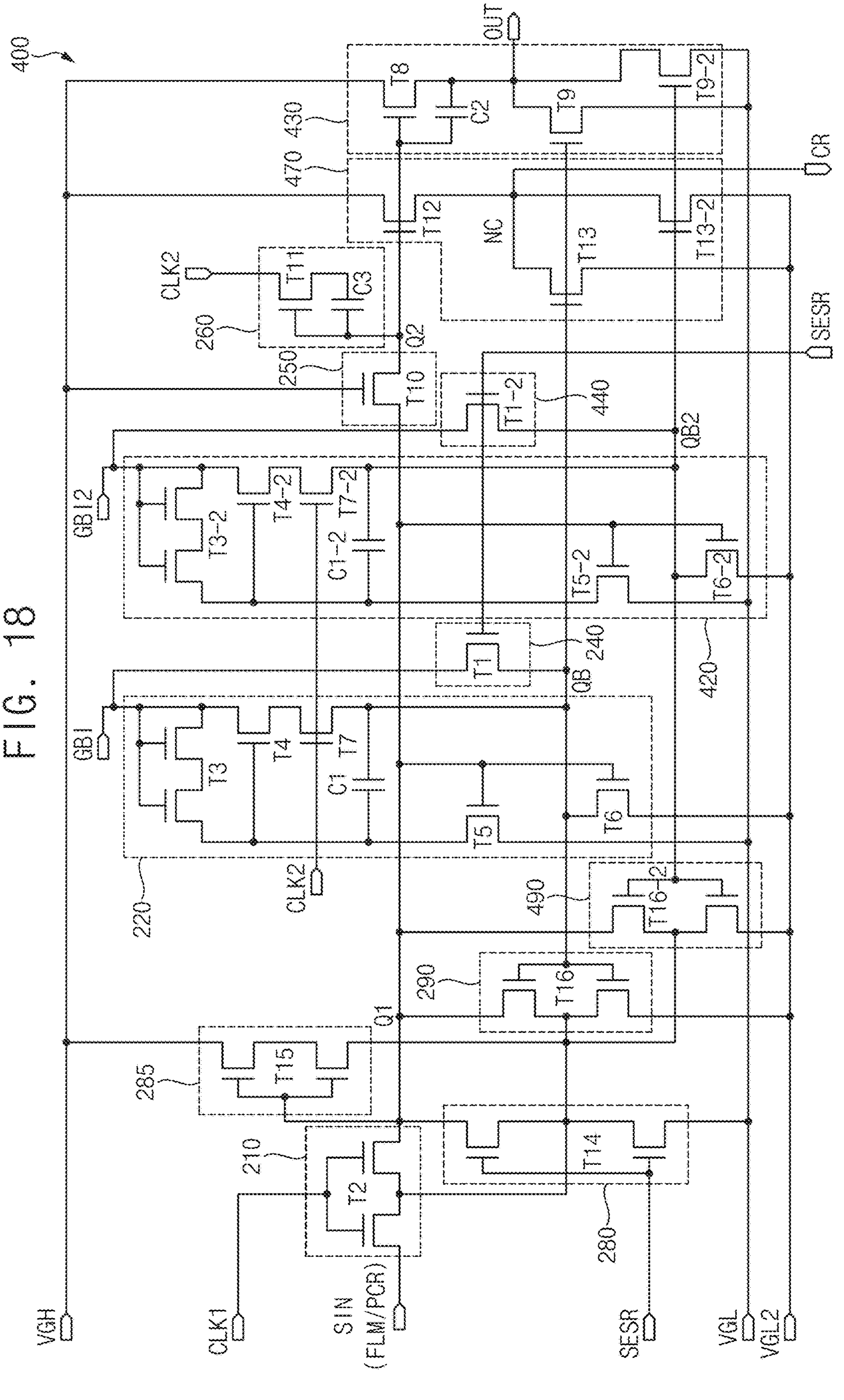
FIG. 18 is a circuit diagram illustrating a stage of a driver according to embodiments.
Figure 19:
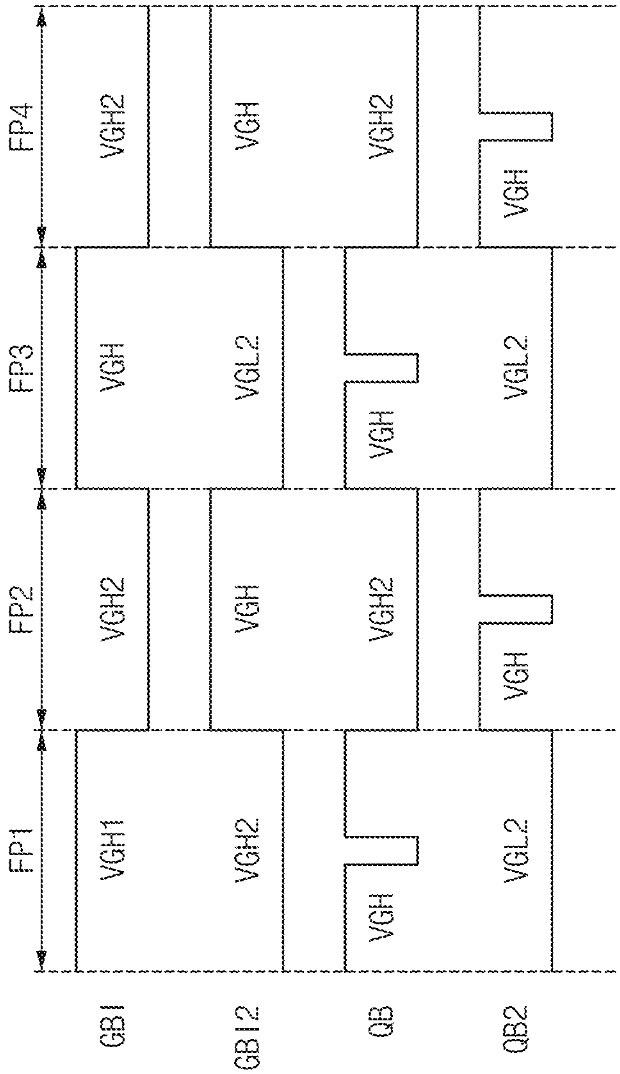
FIG. 19 is a timing diagram illustrating an example of a QB control signal and a second QB control signal.

FIG. 18 is a circuit diagram illustrating a stage of a driver according to embodiments, and FIG. 19 is a timing diagram illustrating an example of a QB control signal and a second QB control signal.

Referring to FIG. 18, at least one stage 400 of a driver according to embodiments may include an input circuit 210, a QB node controlling circuit (or a first QB node controlling circuit) 220, a second QB node controlling circuit 420, an output circuit 430, a QB node discharging circuit (or a first QB node discharging circuit) 240, a second QB node discharging circuit 440, a node separating circuit 250, a boosting circuit 260, a carry circuit 470, a reset circuit 280, a leakage preventing circuit 285, a stabilizing circuit (or a first stabilizing circuit) 290 and a second stabilizing circuit 490. The stage 400 of FIG. 18 may have a similar configuration and a similar operation to as a stage 200 of FIG. 3, except that the stage 400 may further include the second QB node controlling circuit 420, the second QB node discharging circuit 440 and the second stabilizing circuit 490 associated with a second QB node QB2, that the output circuit 430 may further include a ninth-second transistor T9-2 which operates based on a voltage of the second QB node QB2, and that the carry circuit 470 may further include a thirteenth-second transistor T13-2 which operates based on the voltage of the second QB node QB2.

The QB node controlling circuit 220 may control a voltage of a QB node QB based on a voltage of a first Q node Q1 and a QB control signal GBI, and the second QB node controlling circuit 420 may control the voltage of the second QB node QB2 based on the voltage of the first Q node Q1 and a second QB control signal GBI2. For example, the second QB node controlling circuit 420 may include a third-second transistor T3-2, a fourth-second transistor T4-2, a fifth-second transistor T5-2, a sixth-second transistor T6-2, a seventh-second transistor T7-2 and a first-second capacitor C1-2 corresponding to a third transistor T3, a fourth transistor T4, a fifth transistor T5, a sixth transistor T6, a seventh transistor T7 and a first capacitor C1 of the QB node controlling circuit 220, respectively.

In some embodiments, as illustrated in FIG. 19, in odd-numbered frame periods FP1 and FP3, the QB control signal GBI may have a high gate voltage VGH, and the second QB control signal GBI2 may have a second low gate voltage VGL2. Thus, in the odd frame periods FP1 and FP3, the QB node controlling circuit 220 may control the voltage of the QB node QB to the high gate voltage VGH or the second low gate voltage VGL2 according to the voltage of the first Q node Q1 and/or a second clock signal CLK2, but the second QB node controlling circuit 420 may control the voltage of the second QB node QB2 to the second low gate voltage VGL2 regardless of the voltage of the first Q node Q1 and the second clock signal CLK2. Further, in even-numbered frame periods FP2 and FP4, the QB control signal GBI may have the second low gate voltage VGL2, and the second QB control signal GBI2 may have the high gate voltage VGH. Thus, in the even-numbered frame periods FP2 and FP4, the second QB node controlling circuit 420 may control the second QB node QB2 to the high gate voltage VGH or the second low gate voltage VGL2 according to the voltage of the first Q node Q1 and/or a second clock signal CLK2, but the QB node controlling circuit 220 may control the voltage of the QB node QB to the second low gate voltage VGL2 regardless of the voltage of the first Q node Q1 and the second clock signal CLK2.

The output circuit 430 may output an output signal OUT having the high gate voltage VGH when a voltage of a second Q node Q2 has a boosted high level, and may output the output signal OUT having the low gate voltage VGL when the voltage of the QB node QB has a high level or when the voltage of the second QB node QB2 has a high level. To perform this operation, the output circuit 430 may include not only an eighth transistor T8, a second capacitor C2 and a ninth transistor T9, but also the ninth-second transistor T9-2 including a gate connected to the second QB node QB2, a first terminal connected to an output node at which the output signal OUT is output, and a second terminal connected to a line which transfers the low gate voltage VGL.

For example, as illustrated in FIG. 19, in the odd-numbered frame periods FP1 and FP3, the QB node QB may have the high gate voltage VGH or the second low gate voltage VGL2, the second QB node QB2 may have the second low gate voltage VGL2, the ninth-second transistor T9-2 may be turned off, and the ninth transistor T9 may output the output signal OUT having the low gate voltage VGL when the voltage of the QB node QB has a high level, or the high gate voltage VGH. Further, in the even-numbered frame periods FP2 and FP4, the QB node QB may have the second low gate voltage VGL2, the second QB node QB2 may have the high gate voltage VGH or the second low gate voltage VGL2, the ninth transistor T9 may be turned off, and the ninth-second transistor T9-2 may output the output signal OUT having the low gate voltage VGL when the voltage of the second QB node QB2 has a high level, or the high gate voltage VGH. Accordingly, since the ninth-second transistor T9-2 is turned off in the odd-numbered frame periods FP1 and FP3, and the ninth transistor T9 is turned off in the even-numbered frame periods FP2 and FP4, deterioration and/or a threshold voltage shift of the ninth and ninth-second transistors T9 and T9-2 may be reduced.

The carry circuit 470 may output a carry signal CR having the high gate voltage VGH when the voltage of the second Q node Q2 has a boosted high level, and may output the carry signal CR having the second low gate voltage VGL2 when the voltage of the QB node QB has a high level or when the voltage of the second QB node QB2 has a high level. To perform this operation, the carry circuit 470 may include not only a twelfth transistor T12 and a thirteenth transistor T13, but also the thirteenth-second transistor T13-2 including a gate connected to the second QB node QB2, a first terminal connected to a carry node at which the carry signal CR is output, and a second terminal connected to a line which transfers the second low gate voltage VGL2.

For example, as illustrated in FIG. 19, in the odd-numbered frame periods FP1 and FP3, the QB node QB may have the high gate voltage VGH or the second low gate voltage VGL2, the second QB node QB2 may have the second low gate voltage VGL2, the thirteenth-second transistor T13-2 may be turned off, and the thirteenth transistor T13 may output the carry signal CR having the second low gate voltage VGL2 when the voltage of the QB node QB has a high level, or the high gate voltage VGH. Further, in the even-numbered frame periods FP2 and FP4, the QB node QB may have the second low gate voltage VGL2, the second QB node QB2 may have the high gate voltage VGH or the second low gate voltage VGL2, the thirteenth transistor T13 may be turned off, and the thirteenth-second transistor T13-2 may output the carry signal CR having the second low gate voltage VGL2 when the voltage of the second QB node QB2 has a high level, or the high gate voltage VGH. Accordingly, in the stage 400, since the thirteenth-second transistor T13-2 is turned off in the odd-numbered frame periods FP1 and FP3, and the thirteenth transistor T13 is turned off in the even-numbered frame periods FP2 and FP4, deterioration and/or a threshold voltage shift of the thirteenth and thirteenth-second transistors T13 and T13-2 may be reduced.

The stabilizing circuit 290 may provide the second low gate voltage VGL2 to the first Q node Q1 when the voltage of the QB node QB has a high level, and the second stabilizing circuit 490 may provide the second low gate voltage VGL2 to the first Q node Q1 when the voltage of the second QB node QB2 has a high level. For example, the second stabilizing circuit 490 may include a sixteenth-second transistor T16-2 corresponding to a sixteenth transistor T16.

In a power-off period in which the high gate voltage VGH and the low gate voltage VGL are deactivated, the QB node discharging circuit 240 may discharge the QB node QB, and the second QB node discharging circuit 440 may discharge the second QB node QB2. In some embodiments, the QB node discharging circuit 240 may include a first transistor T1 for forming a path for a discharge current from the QB node QB to a line which transfers the QB control signal GBI in response to a reset signal SESR that is deactivated to a ground voltage, and the second QB node discharging circuit 440 may include a first-second transistor T1-2 for forming a path for a discharge current from the second QB node QB2 to a line which transfers the second QB control signal GBI2 in response to the reset signal SESR that is deactivated to the ground voltage. Accordingly, the QB node QB and the second QB node QB2 of the stage 400 may be normally discharged in the power-off period.

Figure 20:
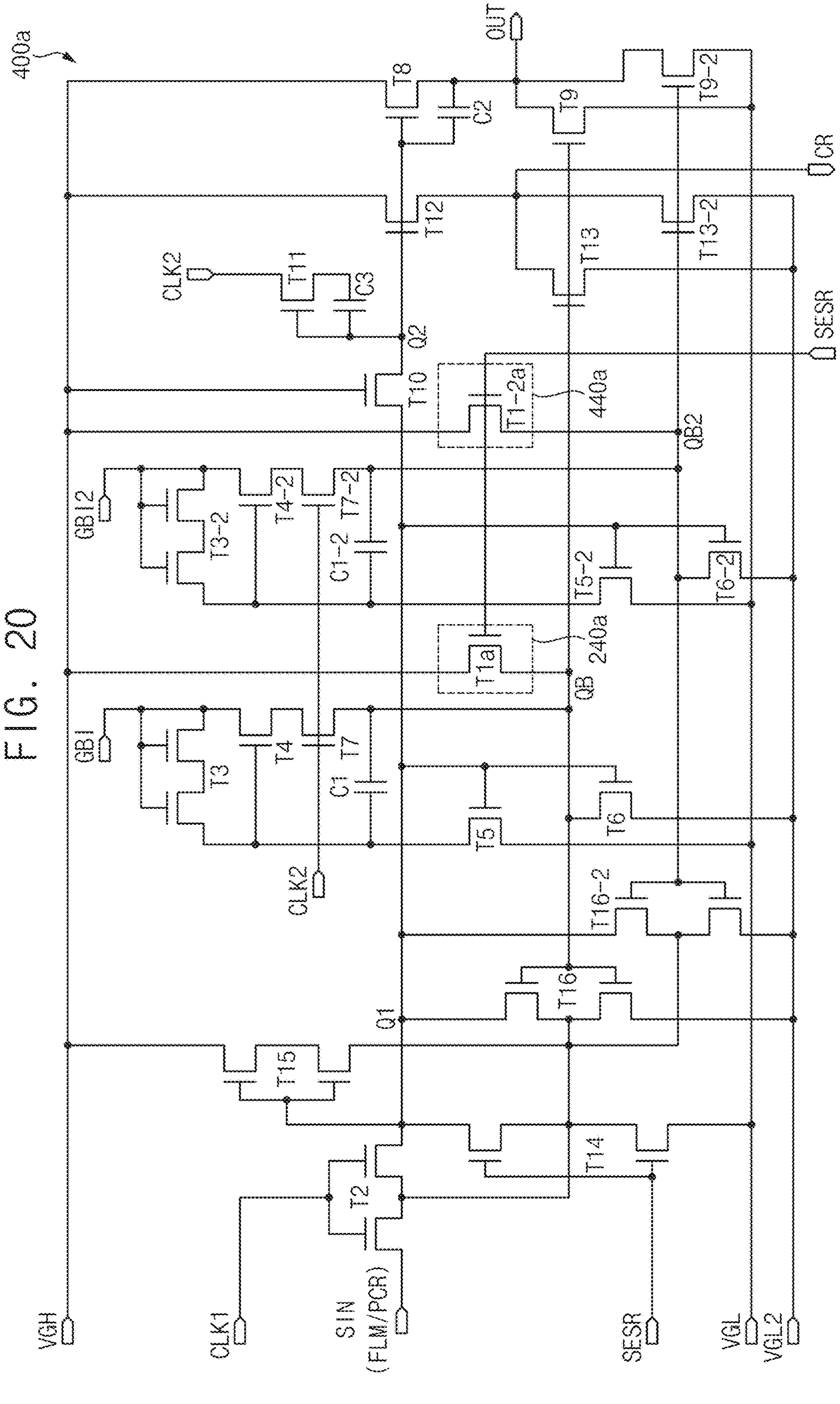
FIG. 20 is a circuit diagram illustrating a stage of a driver according to embodiments.

FIG. 20 is a circuit diagram illustrating a stage of a driver according to embodiments.

Referring to FIG. 20, at least one stage 400*a* of a driver according to embodiments may include a first transistor T1*a*, a first-second transistor T1-2*a*, a second transistor T2, a third transistor T3, a third-second transistor T3-2, a fourth transistor T4, a fourth-second transistor T4-2, a fifth transistor T5, a fifth-second transistor T5-2, a sixth transistor T6, a sixth-second transistor T6-2, a seventh transistor T7, a seventh-second transistor T7-2, an eighth transistor T8, a ninth transistor T9, a ninth-second transistor T9-2, a tenth transistor T10, an eleventh transistor T11, a twelfth transistor T12, a thirteenth transistor T13, a thirteenth-second transistor T13-2, a fourteenth transistor T14, a fifteenth transistor T15, a sixteenth transistor T16, a sixteenth-second transistor T16-2, a first capacitor C1, a first-second capacitor C1-2, a second capacitor C2 and a third capacitor C3. The stage 400*a* of FIG. 20 may have a similar configuration and a similar operation to a stage 400 of FIG. 19, except that a QB node discharging circuit 240*a* may be connected to a line which transfers a high gate voltage VGH instead of a line which transfers a QB control signal GBI, and that a second QB node discharging circuit 440*a* may be connected to the line which transfers the high gate voltage VGH instead of a line which transfers a second QB control signal GBI2.

In a power-off period, the first transistor T1*a* of the QB node discharging circuit 240*a* may form a path for a discharge current from a QB node QB to the line which transfers the high gate voltage VGH in response to a reset signal SESR having a ground voltage, and the first-second transistor T1-2*a* of the second QB node discharging circuit 440*a* may form a path for a discharge current from a second QB node QB2 to the line which transfers the high gate voltage VGH in response to the reset signal SESR having the ground voltage. Accordingly, the QB node QB and the second QB node QB2 of the stage 400*a* may be normally discharged during the power-off period.

Figure 21:
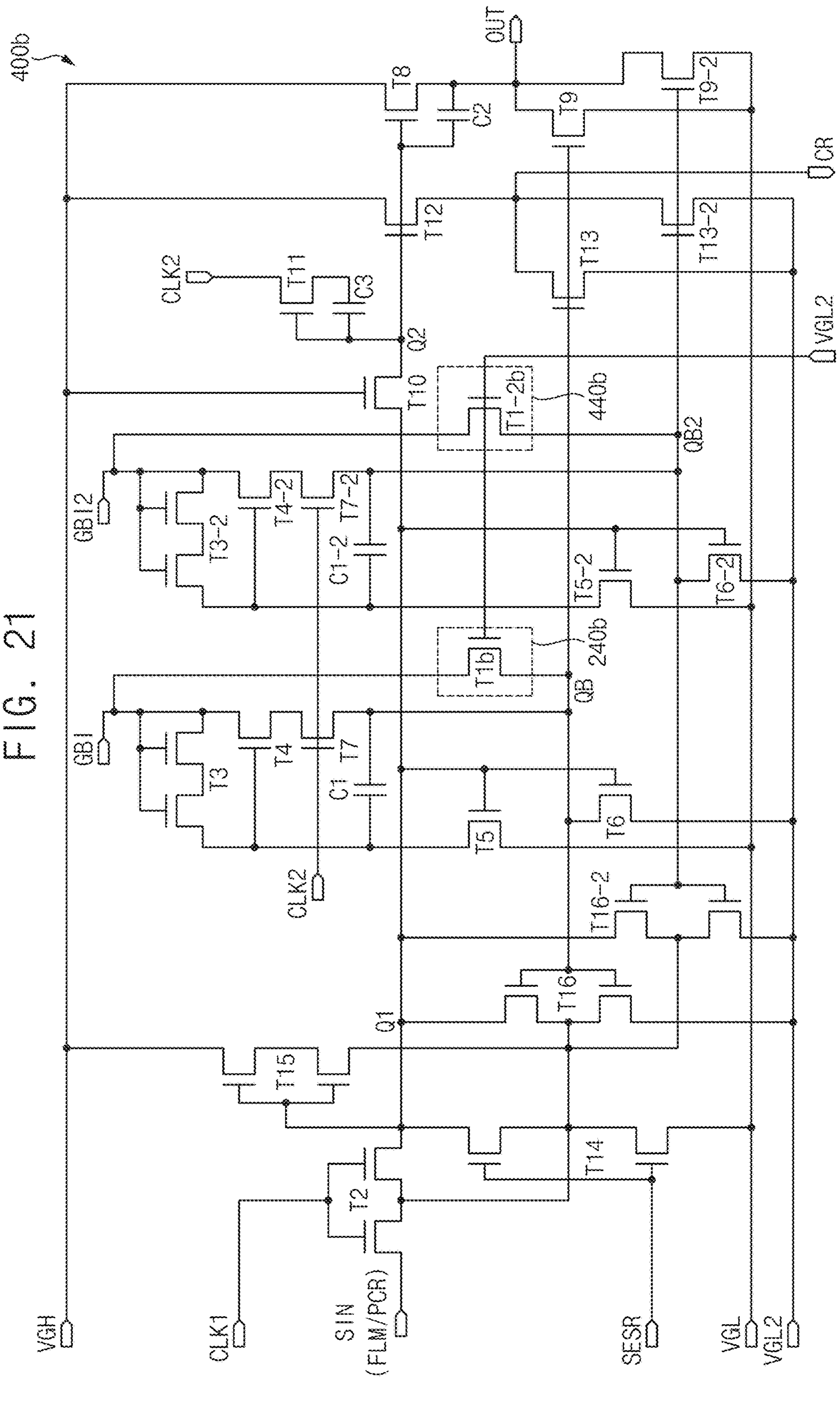
FIG. 21 is a circuit diagram illustrating a stage of a driver according to embodiments.

FIG. 21 is a circuit diagram illustrating a stage of a driver according to embodiments.

Referring to FIG. 21, at least one stage 400*b* of a driver according to embodiments may include a first transistor T1*b*, a first-second transistor T1-2*b*, a second transistor T2, a third transistor T3, a third-second transistor T3-2, a fourth transistor T4, a fourth-second transistor T4-2, a fifth transistor T5, a fifth-second transistor T5-2, a sixth transistor T6, a sixth-second transistor T6-2, a seventh transistor T7, a seventh-second transistor T7-2, an eighth transistor T8, a ninth transistor T9, a ninth-second transistor T9-2, a tenth transistor T10, an eleventh transistor T11, a twelfth transistor T12, a thirteenth transistor T13, a thirteenth-second transistor T13-2, a fourteenth transistor T14, a fifteenth transistor T15, a sixteenth transistor T16, a sixteenth-second transistor T16-2, a first capacitor C1, a first-second capacitor C1-2, a second capacitor C2 and a third capacitor C3. The stage 400*b* of FIG. 21 may have a similar configuration and a similar operation to a stage 400 of FIG. 19, except that a QB node discharging circuit 240*b* and a second QB node discharging circuit 440*b* may receive a second low gate voltage VGL2 instead of a reset signal SESR.

In a power-off period, the first transistor T1*b* of the QB node discharging circuit 240*b* may form a path for a discharge current from a QB node QB to a line which transfers a QB control signal GBI in response to the second low gate voltage VGL2 that is deactivated to a ground voltage, and the first-second transistor T1-2*b* of the second QB node discharging circuit 440*b* may form a path for a discharge current from a second QB node QB2 to a line which transfers a second QB control signal GBI2 in response to the second low gate voltage VGL2 that is deactivated to the ground voltage. Accordingly, the QB node QB and the second QB node QB2 of the stage 400*b* may be normally discharged during the power-off period.

Figure 22:
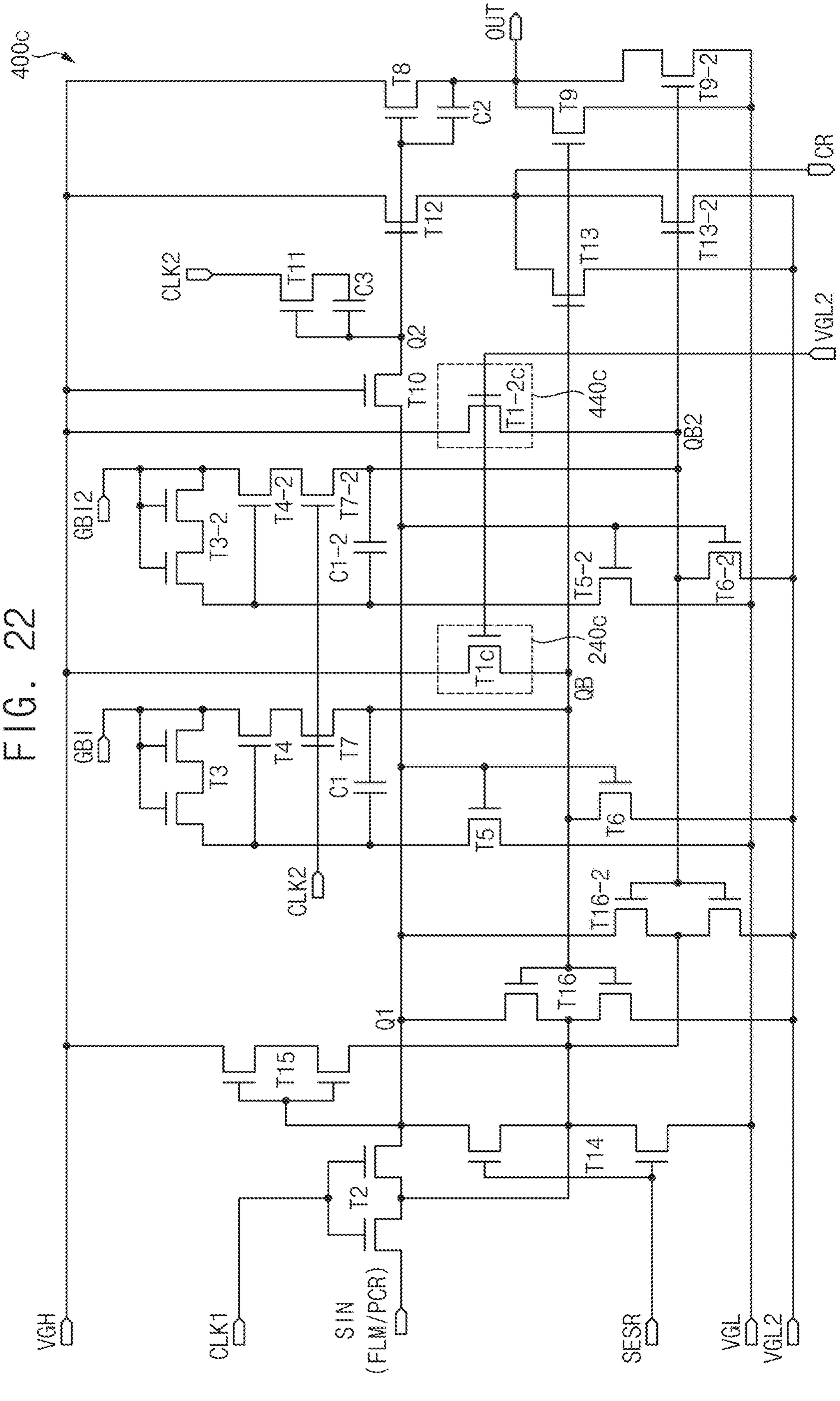
FIG. 22 is a circuit diagram illustrating a stage of a driver according to embodiments.

FIG. 22 is a circuit diagram illustrating a stage of a driver according to embodiments.

Referring to FIG. 22, at least one stage 400*c* of a driver according to embodiments may include a first transistor T1*c*, a first-second transistor T1-2*c*, a second transistor T2, a third transistor T3, a third-second transistor T3-2, a fourth transistor T4, a fourth-second transistor T4-2, a fifth transistor T5, a fifth-second transistor T5-2, a sixth transistor T6, a sixth-second transistor T6-2, a seventh transistor T7, a seventh-second transistor T7-2, an eighth transistor T8, a ninth transistor T9, a ninth-second transistor T9-2, a tenth transistor T10, an eleventh transistor T11, a twelfth transistor T12, a thirteenth transistor T13, a thirteenth-second transistor T13-2, a fourteenth transistor T14, a fifteenth transistor T15, a sixteenth transistor T16, a sixteenth-second transistor T16-2, a first capacitor C1, a first-second capacitor C1-2, a second capacitor C2 and a third capacitor C3. The stage 400*c* of FIG. 22 may have a similar configuration and a similar operation to a stage 400 of FIG. 19, except that a QB node discharging circuit 240*c* may be connected to a line which transfers a high gate voltage VGH instead of a line which transfers a QB control signal GBI, that a second QB node discharging circuit 440*c* may be connected to the line which transfers the high gate voltage VGH instead of a line which transfers a second QB control signal GBI2, and that the QB node discharging circuit 240*c* and the second QB node discharging circuit 440*c* may receive a second low gate voltage VGL2 instead of a reset signal SESR.

In a power-off period, the first transistor T1*c* of the QB node discharging circuit 240*c* may form a path for a discharge current from a QB node QB to the line which transfers the high gate voltage VGH in response to the second low gate voltage VGL2 that is deactivated to a ground voltage, and the first-second transistor T1-2*c* of the second QB node discharging circuit 440*c* may form a path for a discharge current from a second QB node QB2 to the line which transfers the high gate voltage VGH in response to the second low gate voltage VGL2 that is deactivated to the ground voltage. Accordingly, the QB node QB and the second QB node QB2 of the stage 400*c* may be normally discharged during the power-off period.

Figure 23:
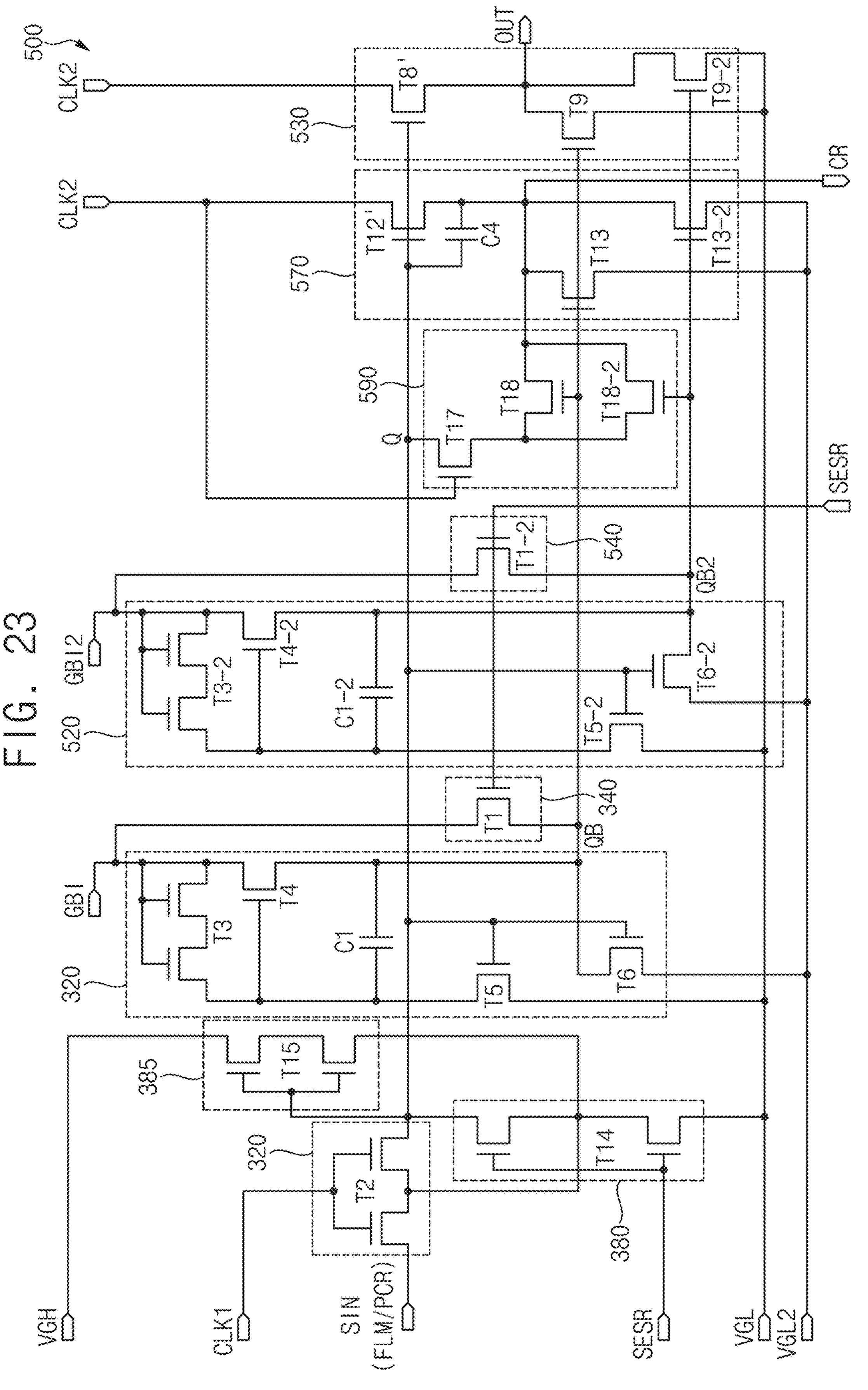
FIG. 23 is a circuit diagram illustrating a stage of a driver according to embodiments.

FIG. 23 is a circuit diagram illustrating a stage of a driver according to embodiments.

Referring to FIG. 23, at least one stage 500 of a driver according to embodiments may include an input circuit 310, a QB node controlling circuit (or a first QB node controlling circuit) 320, a second QB node controlling circuit 520, an output circuit 530, a QB node discharging circuit (or a first QB node discharging circuit) 340, a second QB node discharging circuit 540, a carry circuit 570, a reset circuit 380, a leakage preventing circuit 385 and a stabilizing circuit 590. The stage 500 of FIG. 23 may have a similar configuration and a similar operation to a stage 300 of FIG. 17, except that the stage 500 may further include the second QB node controlling circuit 520 and the second QB node discharging circuit 540 associated with a second QB node QB2, that the output circuit 530 may further include a ninth-second transistor T9-2 which operates based on a voltage of the second QB node QB2, that the carry circuit 570 may further include a thirteenth-second transistor T13-2 which operates based on the voltage of the second QB node QB2, and that the stabilizing circuit 590 may further include an eighteenth-second transistor T18-2 which operates based on the voltage of the second QB node QB2.

The QB node controlling circuit 320 may control a voltage of a QB node QB based on a voltage of a Q node Q and a QB control signal GBI, and the second QB node controlling circuit 520 may control the voltage of the second QB node QB2 based on the voltage of the Q node Q and a second QB control signal GBI2. For example, the second QB node controlling circuit 520 may include a third-second transistor T3-2, a fourth-second transistor T4-2, a fifth-second transistor T5-2, a sixth-second transistor T6-2 and a first-second capacitor C1-2 corresponding to a third transistor T3, a fourth transistor T4, a fifth transistor T5, a sixth transistor T6 and a first capacitor C1 of the QB node controlling circuit 320, respectively.

The output circuit 530 may output an output signal OUT having a high gate voltage VGH when the voltage of the Q node Q has a high level (or a boosted high level), and may output the output signal OUT having a low gate voltage VGL when the voltage of the QB node QB has a high level or when the voltage of the second QB node QB2 has a high level. To perform this operation, the output circuit 530 may include not only an eighth transistor T8, a second capacitor C2 and a ninth transistor T9, but also the ninth-second transistor T9-2 including a gate connected to the second QB node QB2. Accordingly, deterioration and/or a threshold voltage shift of the ninth and ninth-second transistors T9 and T9-2 may be reduced.

The carry circuit 570 may output a carry signal CR having the high gate voltage VGH when the voltage of the Q node Q has a high level (or a boosted high level), and may output the carry signal CR having a second low gate voltage VGL2 when the voltage of the QB node QB has a high level or when the voltage of the second QB node QB2 has a high level. To perform this operation, the carry circuit 570 may include not only a twelfth transistor T12 and a thirteenth transistor T13, but also the thirteenth-second transistor T13-2 including a gate connected to the second QB node QB2. Accordingly, deterioration and/or a threshold voltage shift of the thirteenth and thirteenth-second transistors T13 and T13-2 may be reduced.

The stabilizing circuit 590 may provide the second low gate voltage VGL2 to the Q node Q when the voltage of the QB node QB has a high level or when the voltage of the second QB node QB2 has a high level. The stabilizing circuit 590 may include not only a seventeenth transistor T17 and an eighteenth transistor T18, but also the eighteenth-second transistor T18-2 including a gate connected to the second QB node QB2. For example, the stabilizing circuit 590 may provide the second low gate voltage VGL2 to the Q node Q through the thirteenth transistor T13, the eighteenth transistor T18 and the seventeenth transistor T17 when the voltage of the QB node QB has a high level, and may provide the second low gate voltage VGL2 to the Q node Q through the thirteenth-second transistor T13-2, the eighteenth-second transistor T18-2 and the seventeenth transistor T17 when the voltage of the second QB node QB2 has a high level.

In a power-off period in which the high gate voltage VGH and the low gate voltage VGL are deactivated, the QB node discharging circuit 340 may discharge the QB node QB, and the second QB node discharging circuit 540 may discharge the second QB node QB2. In some embodiments, the QB node discharging circuit 340 may include a first transistor T1 for forming a path for a discharge current from the QB node QB to a line which transfers the QB control signal GBI in response to a reset signal SESR that is deactivated to a ground voltage, and the second QB node discharging circuit 540 may include a first-second transistor T1-2 for forming a path for a discharge current from the second QB node QB2 to a line which transfers the second QB control signal GBI2 in response to the reset signal SESR that is deactivated to the ground voltage. Accordingly, the QB node QB and the second QB node QB2 of the stage 500 may be normally discharged in the power-off period.

Figure 24:
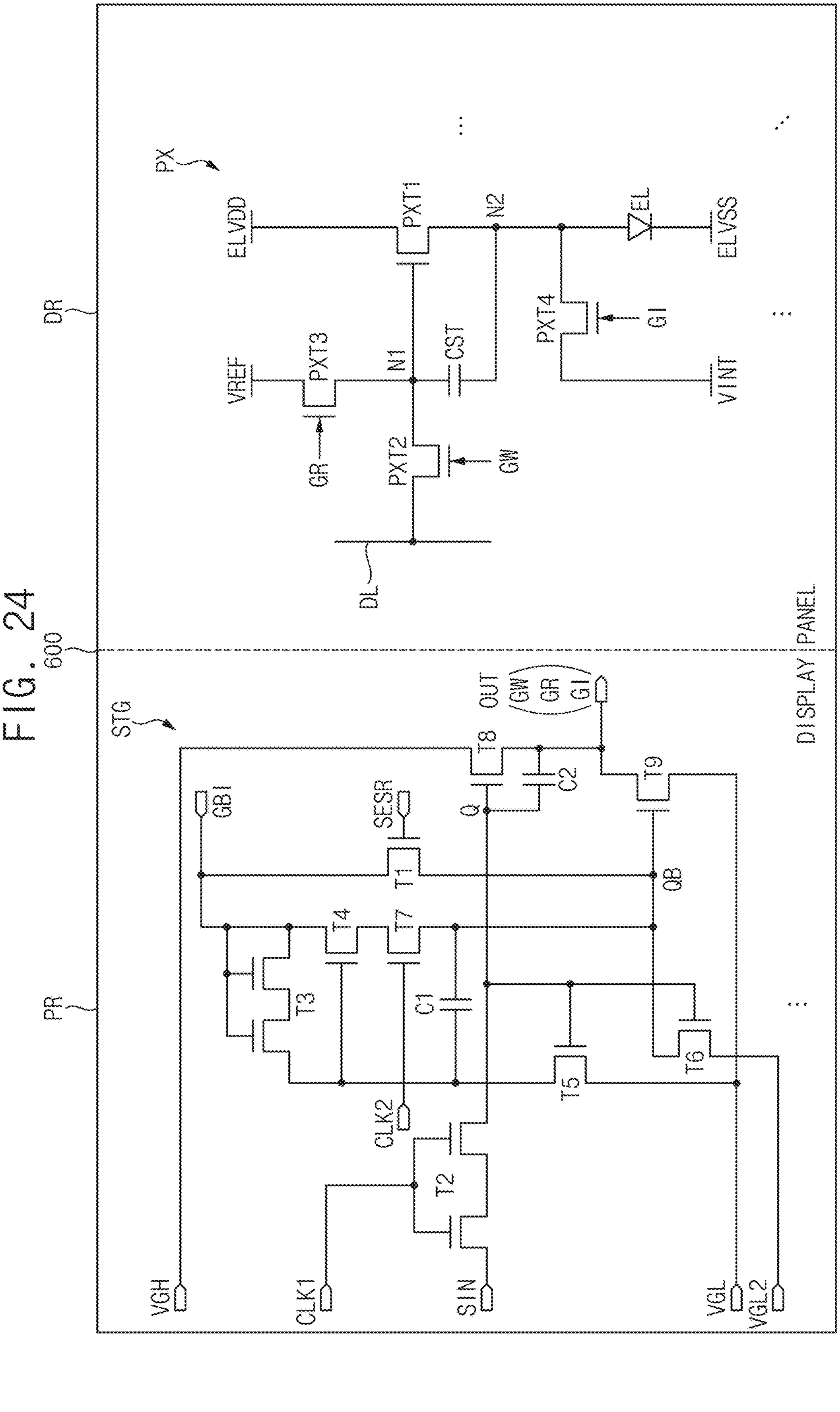
FIG. 24 is a circuit diagram illustrating a display panel including a pixel and a stage of a driver according to embodiments.

FIG. 24 is a circuit diagram illustrating a display panel including a pixel and a stage of a driver according to embodiments.

Referring to FIG. 24, a display panel 600 according to embodiments may include a plurality of pixels PX in a display region DR, and may include a plurality of stages STG of a driver in a peripheral region PR adjacent to the display region DR.

Each pixel PX may include a first pixel transistor PXT1 including a gate connected to a first node N1, a first terminal connected to a line which transfers a first power supply voltage ELVDD (e.g., a high power supply voltage), and a second terminal connected to a second node N2, a storage capacitor CST connected between the first node N1 and the second node N2, a second pixel transistor PXT2 including a gate which receives a write signal GW, a first terminal connected to a data line DL, and a second terminal connected to the first node N1, a third pixel transistor PXT3 including a gate which receives a reference signal GR, a first terminal which receives a reference voltage VREF, and a second terminal connected to the first node N1, a fourth pixel transistor PXT4 including a gate which receives an initialization signal GI, a first terminal connected to an anode of a light emitting element EL, and a second terminal which receives an initialization voltage VINT, and the light emitting element EL including the anode, and a cathode connected to a line which transfers a second power supply voltage ELVSS (e.g., a low power supply voltage). Although FIG. 24 illustrates an example in which the pixel PX has a 4T1C structure (four transistors and one capacitor), the pixel PX of the display panel 600 according to embodiments is not limited to the example of FIG. 24.

Each stage STG may include a first transistor T1 including a gate which receives a reset signal SESR, a first terminal connected to a line which transfers a QB control signal GBI, and a second terminal connected to a QB node, a second transistor T2 including a gate which receives a clock signal CLK1, a first terminal which receives an input signal SIN, and a second terminal connected to a Q node, a third transistor T3 including a gate which receives the QB control signal GBI, a first terminal which receives the QB control signal GBI, and a second terminal, a fourth transistor T4 including a gate connected to the second terminal of the third transistor T3, a first terminal which receives the QB control signal GBI, and a second terminal connected to the QB node, a first capacitor C1 including a first electrode connected to the gate of the fourth transistor T4, and a second electrode connected to the QB node, a fifth transistor T5 including a gate connected to the Q node, a first terminal connected to the gate of the fourth transistor T4, and a second terminal connected to a line which transfers a low gate voltage VGL, a sixth transistor T6 including a gate connected to the Q node, a first terminal connected to the QB node, and a second terminal connected to a line which transfers a second low gate voltage VGL2 lower than the low gate voltage VGL, a seventh transistor T7 including a gate which receives a second clock signal CLK2 different from the first clock signal CLK1, a first terminal connected to the second terminal of the fourth transistor T4, and a second terminal connected to the QB node, an eighth transistor T8 including a gate connected to the Q node, a first terminal connected to a line which transfers a high gate voltage VGH, and a second terminal connected to an output node at which an output signal OUT is output, a second capacitor C2 including a first electrode connected to the Q node, and a second electrode connected to the output node, and a ninth transistor T9 including a gate connected to the QB node, a first terminal connected to the output node, and a second terminal connected to the line which transfers the low gate voltage VGL. The stage STG may output, as the output signal OUT, the write signal GW, the reference signal GR or the initialization signal GI. For example, the output signal OUT may be the write signal GW, and the output node of the stage STG may be connected to the gate of the second pixel transistor PXT2 of the pixel PX through a gate line. In another example, the output signal OUT may be the reference signal GR, and the output node of the stage STG may be connected to the gate of the third pixel transistor PXT3 of the pixel PX through a gate line. In still another example, the output signal OUT may be the initialization signal GI, and the output node of the stage STG may be connected to the gate of the fourth pixel transistor PXT4 of the pixel PX through a gate line. Although FIG. 24 illustrates an example in which the stage STG has a 9T2C structure (nine transistors and two capacitors), the stage STG of the driver formed in the display panel 600 according to embodiments is not limited to the example of FIG. 24. For example, the stage STG may be a stage 200 of FIG. 3, a stage 200*a* of FIG. 11, a stage 200*b* of FIG. 12, a stage 200*c* of FIG. 13, a stage 200*d* of FIG. 14, a stage 200*e* of FIG. 15, a stage 200*f* of FIG. 16, a stage 300 of FIG. 17, a stage 400 of FIG. 18, a stage 400*a* of FIG. 20, a stage 400*b* of FIG. 21, a stage 400*c* of FIG. 22, a stage 500 of FIG. 23, or a stage having a similar configuration.

Figure 25:
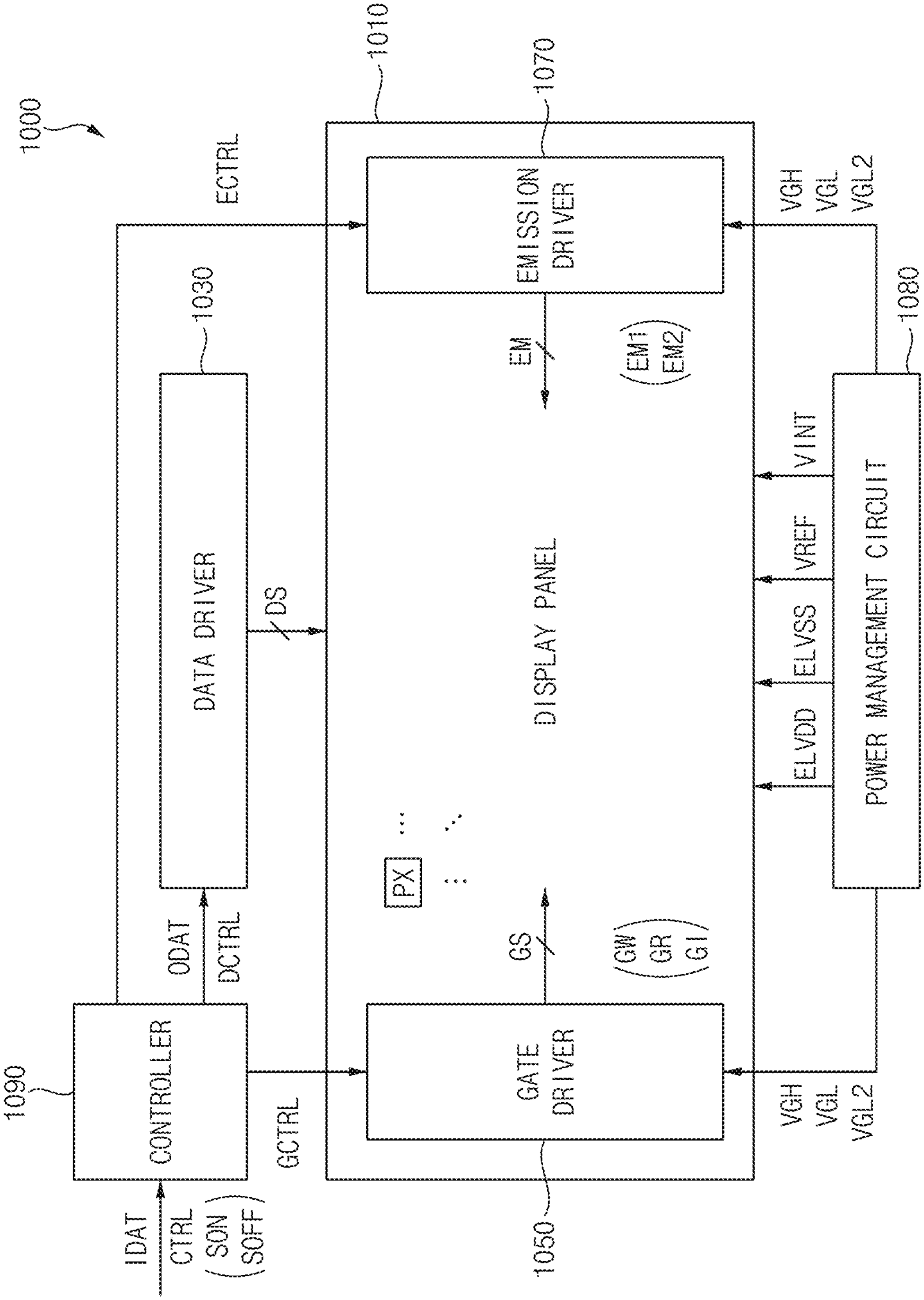
FIG. 25 is a block diagram illustrating a display device according to embodiments.
Figure 26:
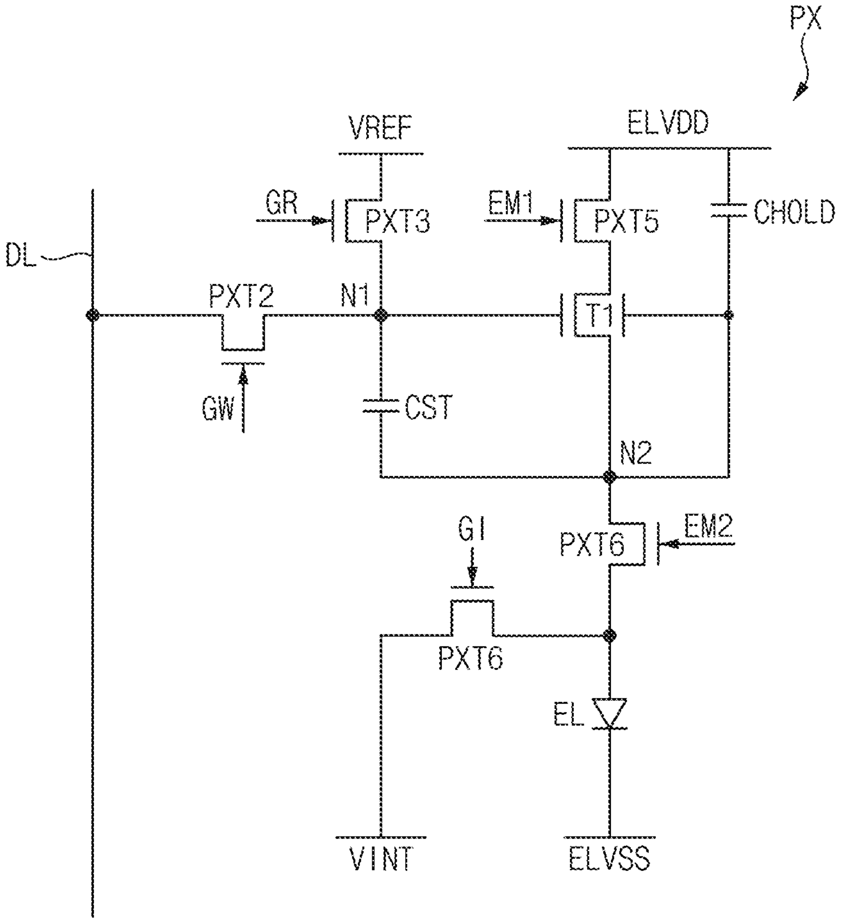
FIG. 26 is a circuit diagram illustrating an example of a pixel included in a display device according to embodiments.
Figure 27:
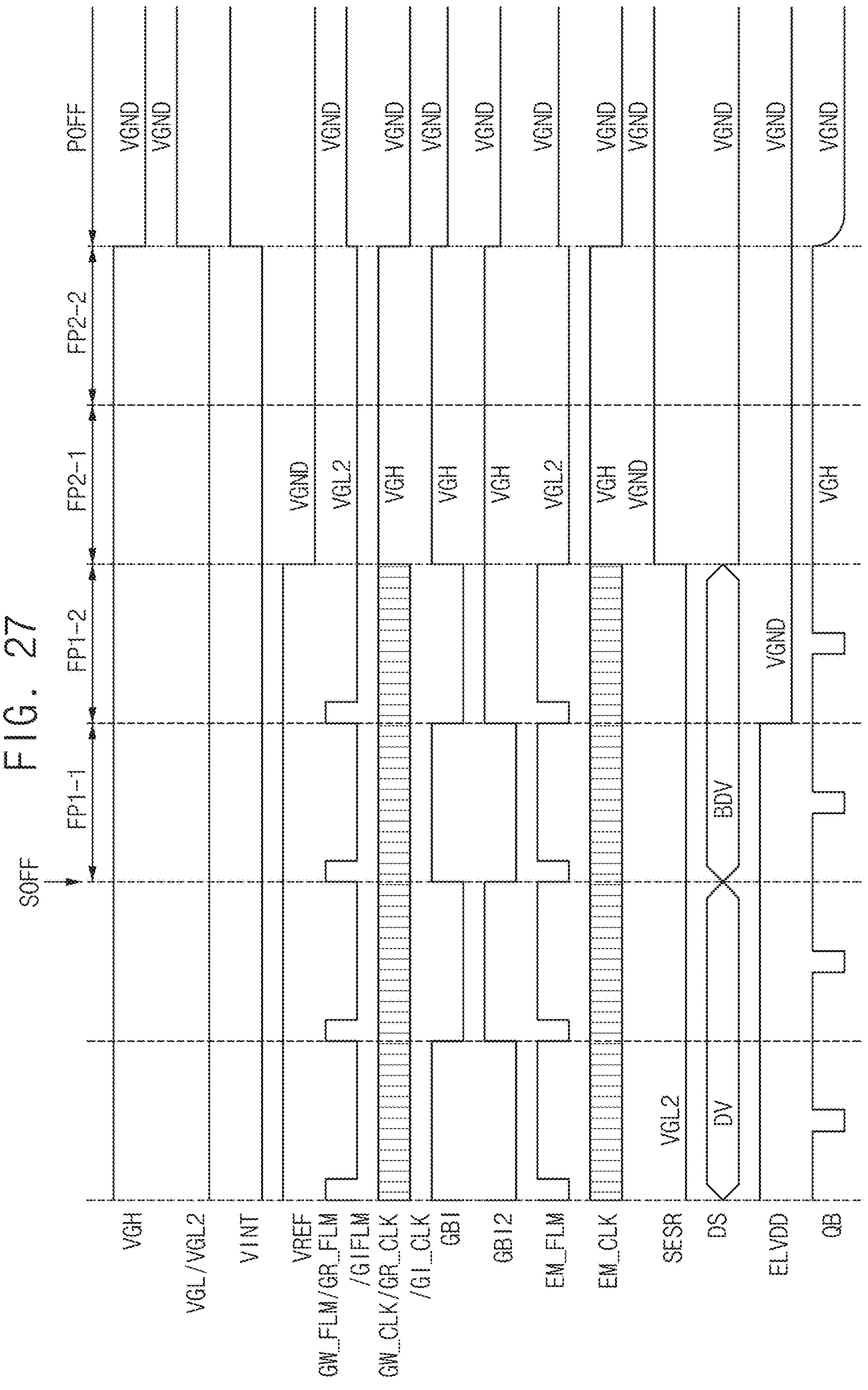
FIG. 27 is a timing diagram illustrating an example of a power-off sequence of a display device according to embodiments.
Figure 28:
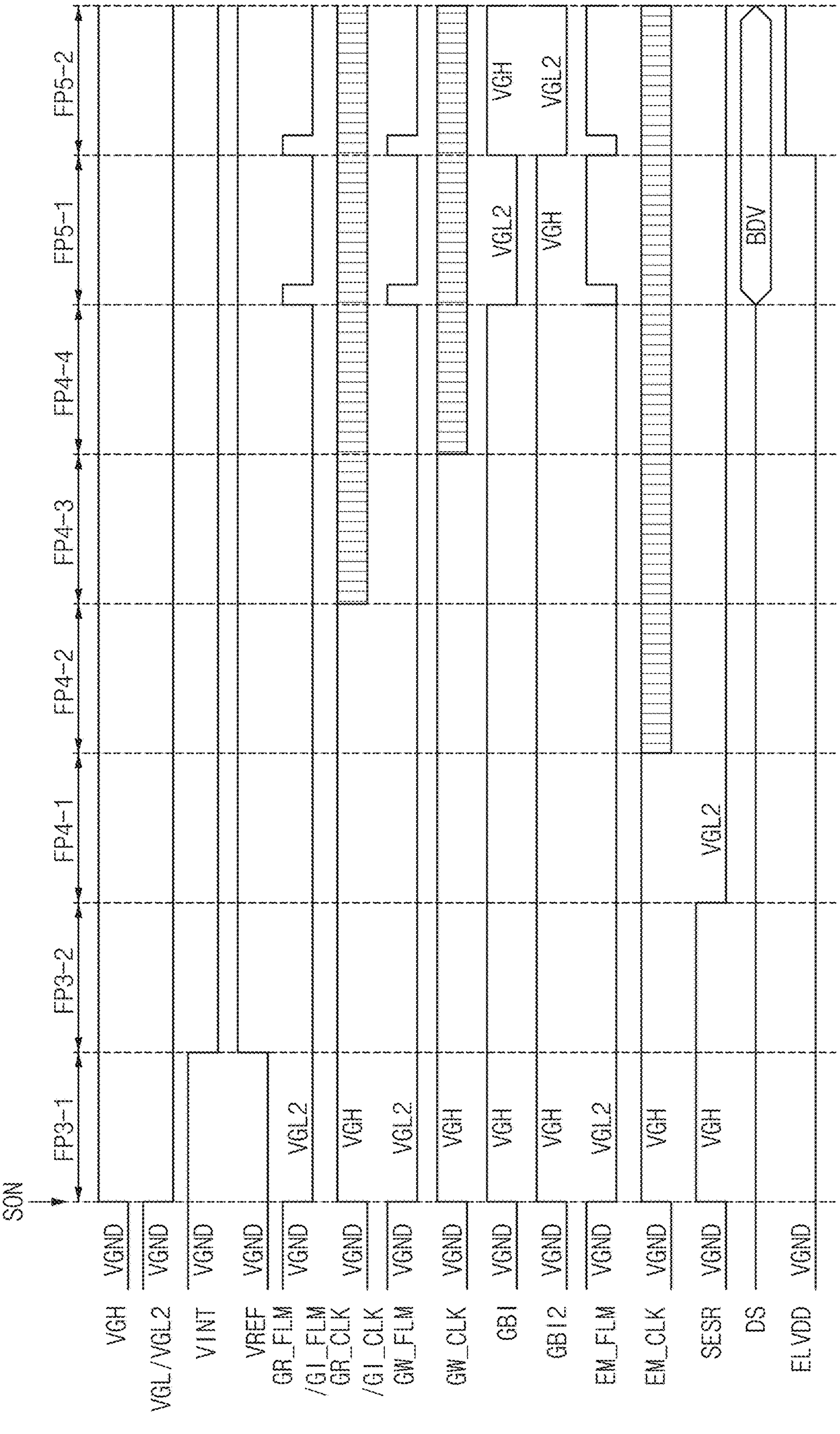
FIG. 28 is a timing diagram illustrating an example of a power-on sequence of a display device according to embodiments.

FIG. 25 is a block diagram illustrating a display device according to embodiments, FIG. 26 is a circuit diagram illustrating an example of a pixel included in a display device according to embodiments, FIG. 27 is a timing diagram illustrating an example of a power-off sequence of a display device according to embodiments, and FIG. 28 is a timing diagram illustrating an example of a power-on sequence of a display device according to embodiments.

Referring to FIG. 25, a display device 1000 according to embodiments may include a display panel 1010 that includes a plurality of pixels PX, a data driver 1030 that provides data signals DS to the plurality of pixels PX, a gate driver 1050 that provides gate signals GS to the plurality of pixels PX, an emission driver 1070 that provides emission signals EM to the plurality of pixels PX, a power management circuit 1080 that provides a high gate voltage VGH, a low gate voltage VGL and a second low gate voltage VGL2 to the gate driver 1050 and/or the emission driver 1070, and a controller 1090 that controls the data driver 1030, the gate driver 1050, the emission driver 1070 and the power management circuit 1080.

The display panel 1010 may include data lines, gate lines, emission lines, and the plurality of pixels PX connected thereto. In some embodiments, each pixel PX may include a light emitting element, and the display panel 1010 may be a light emitting display panel.

For example, as illustrated in FIG. 26, each pixel PX may include a first pixel transistor PXT1 including a gate connected to a first node N1, a first terminal connected to a line which transfers a first power supply voltage ELVDD (e.g., a high power supply voltage), and a second terminal connected to a second node N2, a storage capacitor CST connected between the first node N1 and the second node N2, a second pixel transistor PXT2 including a gate which receives a write signal GW, a first terminal connected to a data line DL, and a second terminal connected to the first node N1, a third pixel transistor PXT3 including a gate which receives a reference signal GR, a first terminal which receives a reference voltage VREF, and a second terminal connected to the first node N1, a fourth pixel transistor PXT4 including a gate which receives an initialization signal GI, a first terminal connected to an anode of a light emitting element EL, and a second terminal which receives an initialization voltage VINT, and the light emitting element EL including the anode, and a cathode connected to a line which transfers a second power supply voltage ELVSS (e.g., a low power supply voltage).

In some embodiments, each pixel PX may further include a fifth pixel transistor PXT5 connected between the line which transfers the first power supply voltage ELVDD and the first pixel transistor PXT1, a sixth pixel transistor PXT6 connected between the second node N2 and the anode of the light emitting element EL, and a hold capacitor CHOLD connected between the line which transfers the first power supply voltage ELVDD and the second node N2. For example, the fifth pixel transistor PXT5 may include a gate which receives a first emission signal EM1, a first terminal connected to the line which transfers the first power supply voltage ELVDD, and a second terminal connected to the first terminal of the first pixel transistor PXT1, the sixth pixel transistor PXT6 may include a gate which receives a second emission signal EM2, a first terminal connected to the second node N2, and a second terminal connected to the anode of the light emitting element EL, and the hold capacitor CHOLD may include a first electrode connected to the line which transfers the first power supply voltage ELVDD, and a second electrode connected to the second node N2. Further, in some embodiments, the first pixel transistor PXT1 may further include a bottom gate connected to the second node N2.

In some embodiments, the light emitting element EL may be an organic light emitting diode (OLED). In other embodiments, the light emitting element EL may be a nano light emitting diode (NED), a quantum dot (QD) light emitting diode, a micro light emitting diode, an inorganic light emitting diode, or any other suitable light emitting element.

Although FIG. 26 illustrates an example in which the pixel PX has a 6T2C structure (six transistors and two capacitors), the pixel PX of the display device 1000 according to embodiments is not limited to the example of FIG. 26.

The data driver 1030 may generate the data signals DS based on a data control signal DCTRL and output image data ODAT received from the controller 1090, and may provide the data signals DS to the plurality of pixels PX through the data lines. In some embodiments, the data control signal DCTRL may include, but is not limited to, an output data enable signal, a horizontal start signal, and a load signal. In some embodiments, the data driver 1030 and the controller 1090 may be implemented as a single integrated circuit, and the single integrated circuit may be referred to as a timing controller embedded data driver (TED) integrated circuit. In other embodiments, the data driver 1030 and the controller 1090 may be implemented as separate integrated circuits.

The gate driver 1050 may generate the gate signals GS based on a gate control signals GCTRL received from the controller 1090, and may sequentially provide the gate signals GS to the plurality of pixels PX through the gate lines on a row-by-row basis. In some embodiments, the gate control signal GCTRL may include, but is not limited to, a start signal FLM (e.g., a write start signal, a reference start signal and an initialization start signal), a first clock signal (CLK1) (e.g. a first write clock signal, a first reference clock signal and a first initialization clock signal), a second clock signal CLK2 (e.g. a second write clock signal, a second reference clock signal and a second initialization clock signal), a reset signal SESR, a QB control signal GBI and a second QB control signal GBI2 illustrated in FIG. 18. Further, in some embodiments, the gate signal GS provided to each pixel PX may include, but is not limited to, the write signal GW, the reference signal GR and the initialization signal GI. According to embodiments, the gate driver 1050 may include a plurality of stages, and each stage may be a stage 200 of FIG. 3, a stage 200*a* of FIG. 11, a stage 200*b* of FIG. 12, a stage 200*c* of FIG. 13, a stage 200*d* of FIG. 14, a stage 200*e* of FIG. 15, a stage 200*f* of FIG. 16, a stage 300 of FIG. 17, a stage 400 of FIG. 18, a stage 400*a* of FIG. 20, a stage 400*b* of FIG. 21, a stage 400*c* of FIG. 22, a stage 500 of FIG. 23, or a stage having a similar configuration. In some embodiments, as illustrated in FIG. 25, the gate driver 1050 may be integrated or formed in the display panel 1010. In other embodiments, the gate driver 1050 may be implemented as one or more integrated circuits.

The emission driver 1070 may generate the emission signals EM based on an emission control signal ECTRL received from the controller 1090, and may sequentially provide the emission signals EM to the plurality of pixels PX through the emission lines on a row-by-row basis. In some embodiments, the emission control signal ECTRL may include, but is not limited to, a start signal FLM (e.g., an emission start signal), a first clock signal CLK1 (e.g., a first emission clock signal), a second clock signal CLK2 (e.g., a second emitting clock signal), a reset signal SESR, a QB control signal GBI and a second QB control signal GBI2 illustrated in FIG. 18. Further, in some embodiments, the emission signal EM provided to each pixel PX may include, but is not limited to, the first emission signal EM1 and the second emission signal EM2 illustrated in FIG. 26. According to embodiments, the emission driver 1070 may include a plurality of stages, and each stage may be a stage 200 of FIG. 3, a stage 200*a* of FIG. 11, a stage 200*b* of FIG. 12, a stage 200*c* of FIG. 13, a stage 200*d* of FIG. 14, a stage 200*e* of FIG. 15, a stage 200*f* of FIG. 16, a stage 300 of FIG. 17, a stage 400 of FIG. 18, a stage 400*a* of FIG. 20, a stage 400*b* of FIG. 21, a stage 400*c* of FIG. 22, a stage 500 of FIG. 23, or a stage having a similar configuration. In some embodiments, as illustrated in FIG. 25, the emission driver 1070 may be integrated or formed in the display panel 1010. In other embodiments, the emission driver 1070 may be implemented as one or more integrated circuits.

The power management circuit 1080 may provide voltages for an operation of the display device 1000. In some embodiments, the power management circuit 1080 may provide the high gate voltage VGH, the low gate voltage VGL and the second low gate voltage VGL2 to the gate driver 1050 and/or the emission driver 1070, and may provide the first power supply voltage ELVDD, the second power supply voltage ELVSS, the reference voltage VREF and the initialization voltage VINT to the plurality of pixels PX of the display panel 1010. In some embodiments, the power management circuit 1080 may be implemented as an integrated circuit, which may be referred to as a power management integrated circuit (PMIC). In other embodiments, the power management circuit 1080 may be included in the controller 1090 or the data driver 1030.

The controller 1090 (e.g., a timing controller) may receive input image data IDAT and a control signal CTRL from an external host processor (e.g., a graphics processing unit (GPU), an application processor (AP) or a graphics card). In some embodiments, the input image data IDAT may be RGB image data including red image data, green image data and blue image data. The control signal CTRL may include a power-on signal (SON) indicating a power-on of the display device 1000, and a power-off signal SOFF indicating a power-off of the display device 1000. In some embodiments, the control signal CTRL may further include, but is not limited to, a vertical synchronization signal, a horizontal synchronization signal, an input data enable signal and a master clock signal. The controller 1090 may generate the output image data ODAT, the data control signal DCTRL, the gate control signal GCTRL and the emission control signal ECTRL based on the input image data IDAT and the control signal CTRL. The controller 1090 may control an operation of the data driver 1030 by providing the output image data ODAT and the data control signal DCTRL to the data driver 1030, may control an operation of the gate driver 1050 by providing the gate control signal GCTRL to the gate driver 1050, and may control an operation of the emission driver 1070 by providing the emission control signal ECTRL to the emission driver 1070.

The display device 1000 according to embodiments may perform a power-off sequence in response to the power-off signal SOFF. For example, as illustrated in FIG. 27, in at least one first frame period FP1-1 and FP1-2 after the power-off signal SOFF is received, the data driver 1030 may provide, as the data signals DS, a black data voltage BDV corresponding to the lowest gray level (e.g., a 0-gray level) instead of data voltages DV corresponding to the input image data IDAT (or the output image data ODAT) to the plurality of pixels PX. Further, the power management circuit 1080 may deactivate the first power supply voltage ELVDD and the second power supply voltage ELVSS to a ground voltage VGND. Accordingly, the plurality of pixels PX may not emit light.

In at least one second frame period FP2-1 and FP2-2 after the first frame period FP1-1 and FP1-2, the reference voltage VREF, the reset signal SESR and the data signal DS may be deactivated to the ground voltage VGND. The write start signal GW_FLM, the reference start signal GR_FLM, the initialization start signal GI_FLM and the emission start signal EM_FLM may be maintained at the second low gate voltage VGL2. The first and second write clock signals GW_CLK, the first and second reference clock signals GR_CLK, the first and second initialization clock signals GI_CLK and the first and second emission clock signals EM_CLK, the QB control signal GBI and the second QB control signal GBI2 may be maintained at the high gate voltage VGH. Accordingly, Q nodes of the stages of the gate driver 1050 and/or the emission driver 1070 may be reset to the second low gate voltage VGL2, and QB nodes QB of the stages may be reset to the high gate voltage VGH.

In a power-off period POFF after the second frame period FP2-1 and FP2-2, the high gate voltage VGH, the low gate voltage VGL, the second low gate voltage VGL2, the initialization voltage VINT, the write start signal GW_FLM, the reference start signal GR_FLM, the initialization start signal GI_FLM, the emission start signal EM_FLM, the first and second write clock signals GW_CLK, the first and second reference clock signals GR_CLK, the first and second initialization clock signals GI_CLK, the first and second emission clock signals EM_CLK, the QB control signal GBI and the second QB control signal GBI2 may be deactivated to the ground voltage VGND. Further, the QB nodes QB of the stages of the gate driver 1050 and/or the emission driver 1070 may be discharged to the ground voltage VGND through a QB node discharging circuit of each stage.

Further, the display device 1000 according to embodiments may perform a power-on sequence in response to the power-on signal SON. For example, as illustrated in FIG. 28, in at least one third frame period FP3-1 and FP3-2 after the power-on signal SON is received, the high gate voltage VGH, the low gate voltage VGL and the second low gate voltage VGL2 may be activated, and the reset signal SESR may have the high gate voltage VGH. Accordingly, the Q nodes of the stages of the gate driver 1050 and/or the emission driver 1070 may be reset to the low gate voltage VGL (or the second low gate voltage VGL2), and the QB nodes QB of the stages may be reset to the high gate voltage VGH. Further, the write start signal GW_FLM, the reference start signal GR_FLM, the initialization start signal GI_FLM and the emission start signal EM_FLM may be maintained at the second low gate voltage VGL2. In addition, the first and second write clock signals GW_CLK, the first and second reference clock signals GR_CLK, the first and second initialization clock signals GI_CLK, the first and second emission clock signals EM_CLK, the QB control signal GBI and the second QB control signal GBI2 may be maintained at the high gate voltage VGH. Further, the initialization voltage VINT and the reference voltage VREF may be activated.

In at least one fourth frame period FP4-1, FP4-2, FP4-3 and FP4-4 after the third frame period FP3-1 and FP3-2, the reset signal SESR may be changed to the second low gate voltage VGL2, the write start signal GW_FLM, the reference start signal GR_FLM, the initialization start signal GI_FLM and the emission start signal EM_FLM may be maintained at the second low gate voltage VGL2, but the first and second write clock signals GW_CLK, the first and second reference clock signals GR_CLK, the first and second initialization clock signals GI_CLK and the first and second emission clock signals EM_CLK may periodically toggle. For example, in a fourth-second frame period FP4-2, the first and second emission clock signals EM_CLK may start to toggle periodically, and the emission driver 1070 may output the emission signals EM having the low gate voltage VGL. In a fourth-third frame period FP4-3, the first and second reference clock signals GR_CLK and the first and second initialization clock signals GI_CLK may start to toggle periodically, and the gate driver 1050 may output the reference signals GR having the low gate voltage VGL and the initialization signals GI having the low gate voltage VGL. In a fourth-fourth frame period FP4-4, the first and second write clock signals GW_CLK may start to toggle periodically, and the gate driver 1050 may output the write signals GW having the low gate voltage VGL.

In at least one fifth frame period FP5-1 and FP5-2 after the fourth frame period FP4-1, FP4-2, FP4-3 and FP4-4, the write start signal GW_FLM, the reference start signal GR_FLM, the initialization start signal GI_FLM and the emission start signal EM_FLM having the high gate voltage VGH may be provided, the first and second write clock signals GW_CLK, the first and second reference clock signals GR_CLK, the first and second initialization clock signals GI_CLK and the first and second emission clock signals EM_CLK may periodically toggle, and the QB control signal GBI and the second QB control signal GBI2 may alternately have the high gate voltage VGH or the second low gate voltage VGL2. Accordingly, the gate driver 1050 and the emission driver 1070 may perform normal operations. Further, the first power supply voltage ELVDD and the second power supply voltage ELVSS may be activated. However, the data driver 1030 may provide the black data voltage BDV as the data signals DS to the plurality of pixels PX, and the plurality of pixels PX may display a black image, or may not emit light. After the fifth frame period FP5-1 and FP5-2, the display device 1000 may perform a normal operation that displays an image corresponding to the input image data IDAT.

As described above, in the display device 1000 according to embodiments, at least one stage of the gate driver 1050 and/or the emission driver 1070 may include the QB node discharging circuit that discharges the QB node QB in the power-off period POFF. Accordingly, the QB node QB of the stage of the gate driver 1050 and/or the emission driver 1070 may be normally discharged in the power-off period POFF.

Figure 29:
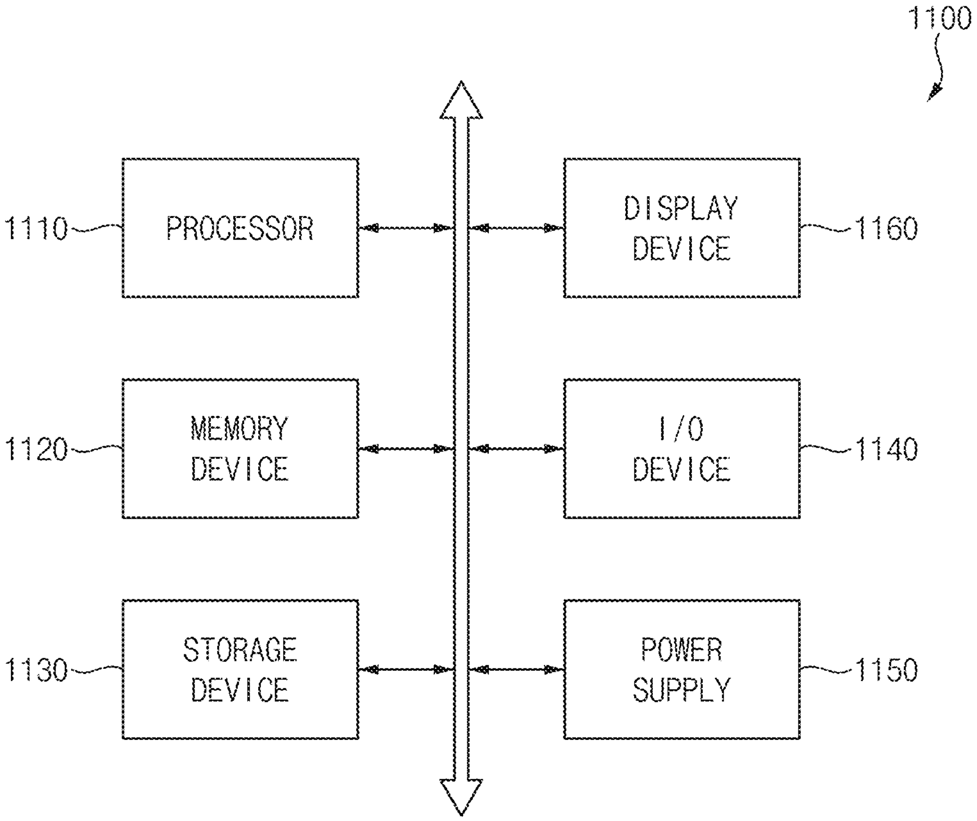
FIG. 29 is a block diagram illustrating an electronic device including a display device according to embodiments.

FIG. 29 is a block diagram illustrating an electronic device including a display device according to embodiments.

Referring to FIG. 29, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, at least one stage of a driver (e.g., a gate driver and/or an emission driver) may include a QB node discharging circuit that discharges a QB node when a high gate voltage and a low gate voltage are deactivated. Accordingly, an internal node, or the QB node of the stage of the driver may be normally discharged in a power-off period.

The inventions may be applied to any display device 1160, and any electronic device 1100 including the display device 1160. For example, the inventions may be applied to a smart phone, a wearable electronic device, a tablet computer, a mobile phone, a television (TV) (e.g., a digital TV, a 3D TV, etc.), a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A driver including a plurality of stages, at least one stage of the plurality of stages comprising:

an input circuit configured to transfer an input signal to a Q node in response to a first clock signal, wherein the Q node includes a first Q node and a second Q node;

a first QB node controlling circuit configured to control a voltage of a first QB node based on a voltage of the first Q node and a first QB control signal;

an output circuit configured to output an output signal, which has a high gate voltage, based on a voltage of the second Q node, and configured to output the output signal, which has a first low gate voltage, based on the voltage of the first QB node; and a first QB node discharging circuit configured to discharge the first QB node when the high gate voltage and the first low gate voltage are deactivated, wherein the first QB node controlling circuit provides a second low gate voltage lower than the first low gate voltage to the first QB node when the voltage of the first Q node has a high level, and provides the first QB control signal to the first QB node when the voltage of the first Q node has a low level.

2. The driver of claim 1, wherein, when a display device including the driver is powered off, the high gate voltage and the first low gate voltage are deactivated to a ground voltage, and the first QB node discharging circuit discharges the first QB node to the ground voltage.

3. The driver of claim 1, wherein the at least one stage further includes:

a reset circuit configured to reset the first Q node in response to a reset signal, and wherein the first QB node discharging circuit includes:

a first transistor including a gate, which receives the reset signal, a first terminal connected to a line, which transfers the first QB control signal, and a second terminal connected to the first QB node.

4. The driver of claim 1, wherein the at least one stage further includes:

a reset circuit configured to reset the first Q node in response to a reset signal, and wherein the first QB node discharging circuit includes:

a first transistor including a gate, which receives the reset signal, a first terminal connected to a line, which transfers the high gate voltage, and a second terminal connected to the first QB node.

5. The driver of claim 1, wherein the first QB node discharging circuit includes:

a first transistor including a gate connected to a line, which transfers the second low gate voltage lower than the first low gate voltage, a first terminal connected to a line, which transfers the first QB control signal, and a second terminal connected to the first QB node.

6. The driver of claim 1, wherein the first QB node discharging circuit includes:

a first transistor including a gate connected to a line, which transfers the second low gate voltage lower than the first low gate voltage, a first terminal connected to a line, which transfers the high gate voltage, and a second terminal connected to the first QB node.

7. The driver of claim 1, wherein the input circuit includes:

a second transistor including a gate, which receives the first clock signal, a first terminal, which receives the input signal, and a second terminal connected to the first Q node.

8. The driver of claim 1, wherein the first QB node controlling circuit includes:

a third transistor including a gate, which receives the first QB control signal, a first terminal, which receives the first QB control signal, and a second terminal;

a fourth transistor including a gate connected to the second terminal of the third transistor, a first terminal, which receives the first QB control signal, and a second terminal connected to the first QB node;

a first capacitor including a first electrode connected to the gate of the fourth transistor, and a second electrode connected to the first QB node;

a fifth transistor including a gate connected to the first Q node, a first terminal connected to the gate of the fourth transistor, and a second terminal connected to a line, which transfers the first low gate voltage; and a sixth transistor including a gate connected to the first Q node, a first terminal connected to the first QB node, and a second terminal connected to a line, which transfers the second low gate voltage lower than the first low gate voltage.

9. The driver of claim 8, wherein the first QB node controlling circuit further includes a seventh transistor connected between the second terminal of the fourth transistor and the first QB node, and wherein the seventh transistor includes a gate, which receives a second clock signal different from the first clock signal, a first terminal connected to the second terminal of the fourth transistor, and a second terminal connected to the first QB node.

10. The driver of claim 1, wherein the output circuit includes:

an eighth transistor including a gate connected to the second Q node, a first terminal connected to a line, which transfers the high gate voltage, and a second terminal connected to an output node at which the output signal is output;

a second capacitor including a first electrode connected to the second Q node, and a second electrode connected to the output node; and a ninth transistor including a gate connected to the first QB node, a first terminal connected to the output node, and a second terminal connected to a line, which transfers the first low gate voltage.

11. The driver of claim 1, wherein the output circuit includes:

an eighth transistor including a gate connected to the Q node, a first terminal, which receives a second clock signal different from the first clock signal, and a second terminal connected to an output node at which the output signal is output; and a ninth transistor including a gate connected to the first QB node, a first terminal connected to the output node, and a second terminal connected to a line, which transfers the first low gate voltage.

12. The driver of claim 1, wherein the at least one stage further includes:

a node separating circuit disposed at the Q node, and configured to divide the Q node into the first Q node and the second Q node.

13. The driver of claim 12, wherein the node separating circuit includes:

a tenth transistor including a gate connected to a line, which transfers the high gate voltage, a first terminal connected to the first Q node, and a second terminal connected to the second Q node.

14. The driver of claim 12, wherein the at least one stage further includes:

a boosting circuit configured to boost a voltage of the second Q node in response to a second clock signal different from the first clock signal.

15. The driver of claim 14, wherein the boosting circuit includes:

an eleventh transistor including a gate connected to the second Q node, a first terminal, which receives the second clock signal, and a second terminal; and a third capacitor including a first electrode connected to the second Q node, and a second electrode connected to the second terminal of the eleventh transistor.

16. The driver of claim 1, wherein the at least one stage further includes:

a carry circuit configured to output a carry signal, which has the high gate voltage, based on the voltage of the second Q node, and to output the carry signal, which has the second low gate voltage lower than the first low gate voltage, based on the voltage of the first QB node.

17. The driver of claim 16, wherein the carry circuit includes:

a twelfth transistor including a gate connected to the second Q node, a first terminal connected to a line, which transfers the high gate voltage, and a second terminal connected to a carry node at which the carry signal is output; and a thirteenth transistor including a gate connected to the first QB node, a first terminal connected to the carry node, and a second terminal connected to a line, which transfers the second low gate voltage.

18. The driver of claim 16, wherein the carry circuit includes:

a twelfth transistor including a gate connected to the Q node, a first terminal, which receives a second clock signal different from the first clock signal, and a second terminal connected to a carry node at which the carry signal is output;

a fourth capacitor including a first electrode connected to the Q node, and a second electrode connected to the carry node; and a thirteenth transistor including a gate connected to the first QB node, a first terminal connected to the carry node, and a second terminal connected to a line, which transfers the second low gate voltage.

19. The driver of claim 1, wherein the at least one stage further includes:

a reset circuit configured to provide the first low gate voltage to the first Q node in response to a reset signal.

20. The driver of claim 19, wherein the reset circuit includes:

a fourteenth transistor including a gate, which receives the reset signal, a first terminal connected to the first Q node, and a second terminal connected to a line, which transfers the first low gate voltage.

21. The driver of claim 1, wherein the at least one stage further includes:

a reset circuit configured to provide the second low gate voltage lower than the first low gate voltage to the first Q node in response to a reset signal.

22. The driver of claim 21, wherein the reset circuit includes:

a fourteenth transistor including a gate, which receives the reset signal, a first terminal connected to the first Q node, and a second terminal connected to a line, which transfers the second low gate voltage.

23. The driver of claim 1, wherein a second transistor included in the input circuit includes a first sub-transistor and a second sub-transistor connected in series, and wherein the at least one stage further includes:

a leakage preventing circuit configured to provide the high gate voltage to a node between the first sub-transistor and the second sub-transistor in response to the voltage of the first Q node.

24. The driver of claim 23, wherein the leakage preventing circuit includes:

a fifteenth transistor including a gate connected to the first Q node, a first terminal connected to a line, which transfers the high gate voltage, and a second terminal connected to the node between the first sub-transistor and the second sub-transistor.

25. The driver of claim 1, wherein the at least one stage further includes:

a first stabilizing circuit configured to provide the second low gate voltage lower than the first low gate voltage to the first Q node when the voltage of the first QB node has a high level.

26. The driver of claim 25, wherein the first stabilizing circuit includes:

a sixteenth transistor including a gate connected to the first QB node, a first terminal connected to the first Q node, and a second terminal connected to a line, which transfers the second low gate voltage.

27. The driver of claim 25, wherein the first stabilizing circuit includes:

a seventeenth transistor including a gate, which receives a second clock signal different from the first clock signal, a first terminal connected to the Q node, and a second terminal; and an eighteenth transistor including a gate connected to the first QB node, a first terminal connected to the second terminal of the seventeenth transistor, and a second terminal connected to a carry node at which a carry signal is output.

28. The driver of claim 1, wherein transistors included in the at least one stage are n-type metal oxide semiconductor (NMOS) transistors.

29. The driver of claim 1, wherein at least one of transistors included in the at least one stage has a double gate structure including a top gate and a bottom gate, and wherein the bottom gate is connected to the top gate.

30. The driver of claim 1, wherein the at least one stage further includes:

a second QB node controlling circuit configured to control the voltage of a second QB node based on the voltage of the first Q node and a second QB control signal; and a second QB node discharging circuit configured to discharge the second QB node when the high gate voltage and the first low gate voltage are deactivated, and wherein the output circuit outputs the output signal, which has the first low gate voltage when the voltage of the first QB node has a high level or when the voltage of the second QB node has a high level.

31. The driver of claim 30, wherein, in a first frame period, the first QB control signal has the high gate voltage, the second QB control signal has the second low gate voltage lower than the first low gate voltage, and the output circuit outputs the output signal, which has the first low gate voltage when the voltage of the first QB node has a high level, and wherein, in a second frame period, the first QB control signal has the second low gate voltage, the second QB control signal has the high gate voltage, and the output circuit outputs the output signal, which has the first low gate voltage when the voltage of the second QB node has a high level.

32. The driver of claim 30, wherein the at least one stage further includes:

a first stabilizing circuit configured to provide the second low gate voltage lower than the first low gate voltage to the first Q node when the voltage of the first QB node has a high level; and a second stabilizing circuit configured to provide the second low gate voltage to the first Q node when the voltage of the second QB node has a high level.

33. A display panel included in a display device, the display panel comprising:

a first pixel transistor including a gate connected to a first node, a first terminal connected to a line, which transfers a first power supply voltage, and a second terminal connected to a second node;

a storage capacitor connected between the first node and the second node;

a second pixel transistor including a gate, which receives a write signal, a first terminal connected to a data line, and a second terminal connected to the first node;

a third pixel transistor including a gate, which receives a reference signal, a first terminal, which receives a reference voltage, and a second terminal connected to the first node;

a fourth pixel transistor including a gate, which receives an initialization signal, a first terminal connected to an anode of a light emitting element, and a second terminal, which receives an initialization voltage;

a light emitting element including the anode, and a cathode connected to a line, which transfers a second power supply voltage;

a first transistor including a gate, which receives a reset signal, a first terminal connected to a line, which transfers a QB control signal, and a second terminal connected to a QB node;

a second transistor including a gate, which receives a first clock signal, a first terminal, which receives an input signal, and a second terminal connected to a Q node;

a third transistor including a gate, which receives the QB control signal, a first terminal, which receives the QB control signal, and a second terminal;

a fourth transistor including a gate connected to the second terminal of the third transistor, a first terminal, which receives the QB control signal, and a second terminal connected to the QB node;

a first capacitor including a first electrode connected to the gate of the fourth transistor, and a second electrode connected to the QB node;

a fifth transistor including a gate connected to the Q node, a first terminal connected to the gate of the fourth transistor, and a second terminal connected to a line, which transfers a first low gate voltage;

a sixth transistor including a gate connected to the Q node, a first terminal connected to the QB node, and a second terminal connected to a line, which transfers a second low gate voltage lower than the first low gate voltage;

a seventh transistor including a gate, which receives a second clock signal different from the first clock signal, a first terminal connected to the second terminal of the fourth transistor, and a second terminal connected to the QB node;

an eighth transistor including a gate connected to the Q node, a first terminal connected to a line, which transfers a high gate voltage, and a second terminal connected to an output node at which an output signal is output;

a second capacitor including a first electrode connected to the Q node, and a second electrode connected to the output node; and a ninth transistor including a gate connected to the QB node, a first terminal connected to the output node, and a second terminal connected to the line, which transfers the first low gate voltage, wherein the output signal is the write signal, the reference signal or the initialization signal.

34. The display panel of claim 33, wherein the first pixel transistor, the second pixel transistor, the third pixel transistor, the fourth pixel transistor and the light emitting element form a pixel, and wherein the first transistor, the second transistor, the third transistor, the fourth transistor, the first capacitor, the fifth transistor, the sixth transistor, the seventh transistor, the eighth transistor, the second capacitor and the ninth transistor form a stage of a driver.

35. A display device comprising:

a display panel including a plurality of pixels;

a data driver configured to provide data signals to the plurality of pixels;

a gate driver configured to provide gate signals to the plurality of pixels;

an emission driver configured to provide emission signals to the plurality of pixels; and a power management circuit configured to provide a high gate voltage, a first low gate voltage and a second low gate voltage to at least one driver of the gate driver and the emission driver, wherein the display device receives a power-off signal, wherein, in at least one first frame period after the power-off signal is received, a black data voltage is provided as the data signals to the plurality of pixels, wherein, in at least one second frame period after the first frame period, a start signal provided to the at least one driver is maintained at the second low gate voltage, first and second clock signals and a QB control signal are maintained at the high gate voltage, and a reset signal provided to the at least one driver is deactivated to a ground voltage, and wherein, in a power-off period after the second frame period, the high gate voltage, the first low gate voltage, the second low gate voltage, the start signal, the first and second clock signals and the QB control signal are deactivated to the ground voltage, and a stage of the at least one driver discharges a QB node through a path from the QB node of the stage to a line, which transfers the QB control signal in response to the reset signal.

36. The display device of claim 35, wherein the display device receives a power-on signal, wherein, in at least one third frame period after the power-on signal is received, the high gate voltage, the first low gate voltage and the second low gate voltage are activated, and the reset signal is maintained at the high gate voltage, wherein, in at least one fourth frame period after the third frame period, the start signal is maintained at the second low gate voltage, and the first and second clock signals toggle periodically, and wherein, in at least one fifth frame period after the fourth frame period, the start signal, which has the high gate voltage, is applied to the at least one driver, the first and second clock signals toggle periodically, and the black data voltage is provided as the data signals to the plurality of pixels.

37. An electronic device comprising:

a processor configured to provide input image data; and a display device configured to receive the input image data from the processor, and to display an image based on the input image data, the display device comprising:

a display panel including a plurality of pixels;

a data driver configured to provide data signals to the plurality of pixels;

a gate driver configured to provide gate signals to the plurality of pixels; and an emission driver configured to provide emission signals to the plurality of pixels, wherein at least one of the gate driver and the emission driver includes a plurality of stages, and at least one stage of the plurality of stages comprises:

an input circuit configured to transfer an input signal to a Q node in response to a first clock signal;

a QB node controlling circuit configured to control a voltage of a QB node based on a voltage of the Q node and a QB control signal;

an output circuit configured to output an output signal, which has a high gate voltage, based on the voltage of the Q node, and configured to output the output signal, which has a first low gate voltage, based on the voltage of the QB node; and a QB node discharging circuit configured to discharge the QB node when the high gate voltage and the first low gate voltage are deactivated, wherein the QB node controlling circuit provides a second low gate voltage lower than the first low gate voltage to the QB node when the voltage of the Q node has a high level, and provides the QB control signal to the QB node when the voltage of the Q node has a low level.

* * * * *